(12) United States Patent
Akihata

(10) Patent No.: US 8,245,311 B2
(45) Date of Patent: Aug. 14, 2012

(54) CONTENT DATA REPRODUCING APPARATUS

(75) Inventor: Makoto Akihata, Tokyo (JP)

(73) Assignee: Sony Corporation, Tokyo (JP)

( * ) Notice: Subject to any disclaimer, the term of this patent is extended or adjusted under 35 U.S.C. 154(b) by 1176 days.

(21) Appl. No.: 10/565,158

(22) PCT Filed: May 19, 2005

(86) PCT No.: PCT/JP2005/009591
§ 371 (c)(1),
(2), (4) Date: Jan. 19, 2006

(87) PCT Pub. No.: WO2005/111996
PCT Pub. Date: Nov. 24, 2005

(65) Prior Publication Data
US 2006/0293964 A1    Dec. 28, 2006

(30) Foreign Application Priority Data
May 19, 2004    (JP) ................. 2004-149492

(51) Int. Cl.
*G06F 21/00* (2006.01)
(52) U.S. Cl. ....................................... 726/29
(58) Field of Classification Search .............. 380/201, 380/203; 726/27, 28, 29; 713/193; 705/50, 705/57
See application file for complete search history.

(56) References Cited

U.S. PATENT DOCUMENTS

| | | | |
|---|---|---|---|
| 5,715,403 A * | 2/1998 | Stefik | 705/44 |
| 6,275,693 B1 * | 8/2001 | Lin et al. | 455/414.3 |
| 7,389,273 B2 * | 6/2008 | Irwin et al. | 705/59 |
| 2005/0071660 A1 * | 3/2005 | Shimizu et al. | 713/193 |

FOREIGN PATENT DOCUMENTS

| | | |
|---|---|---|
| JP | 8-204842 | 8/1996 |
| JP | 8-204858 | 8/1996 |
| JP | 9-34840 | 2/1997 |
| JP | 10-214092 | 8/1998 |
| JP | 10-268881 | 10/1998 |
| JP | 11-261625 | 9/1999 |
| JP | 11-265186 | 9/1999 |
| JP | 2001-184287 | 7/2001 |
| JP | 2001-258009 | 9/2001 |
| JP | 2001-312427 | 11/2001 |
| JP | 2001-344369 | 12/2001 |
| JP | 2002-100116 | 4/2002 |
| JP | 2002-164881 | 6/2002 |
| JP | 2002-203069 | 7/2002 |
| JP | 2002-359616 | 12/2002 |
| JP | 2003-67526 | 3/2003 |
| JP | 2003-99074 | 4/2003 |
| JP | 2004-21479 | 1/2004 |
| JP | 2004-54744 | 2/2004 |
| JP | 2004-86441 | 3/2004 |
| JP | 2004-102084 | 4/2004 |
| JP | 2004-110309 | 4/2004 |

* cited by examiner

*Primary Examiner* — Gilberto Barron, Jr.
*Assistant Examiner* — Simon Kanaan
(74) *Attorney, Agent, or Firm* — Oblon, Spivak, McClelland, Maier & Neustadt, L.L.P.

(57) ABSTRACT

The music data (output-prohibited music data) downloaded to the client terminal 2 cannot be output until it is formally purchased. In addition, this music data can be reproduced only while the user of the client terminal 2 is being registered to pay the predetermined fixed charges. Therefore, this prevents from hurting the interests of copyright owners or the like. And the client terminal 2 can acquire music data more efficiently, since it does not have to repeat a process of downloading music data.

14 Claims, 21 Drawing Sheets

CONTENT DATA REPRODUCING APPARATUS

TECHNICAL FIELD

The present invention relates to a content data reproduction apparatus, and is preferably applied to a music data provision system capable of providing various kinds of music data via a communication path such as the Internet to a reproduction device which can reproduce music data of MPEG Audio Layer-3 (MP3) format or the like, for example.

BACKGROUND ART

In late years, a music data provision system, which is capable of providing various kinds of music data via a communication path such as the Internet to a reproduction device which can reproduce music data of MP3 format or the like, is here to stay (see Patent Document 1 and 2, for example).

In the music data provision system, for example, a user operates his/her own reproduction device to access web pages of a music data provider, and then selects his/her desired music data from a large number of music data shown on the web page. As a result, the selected music data is downloaded from a music data distribution server of the music data provider via the Internet to the reproduction device.

Patent Document 1: International Publication No. WO99/42996

Patent Document 2: Japanese Patent Publication No. 2003-223569

DISCLOSURE OF THE INVENTION

However, the conventional music data provision system generally charges for each piece of music data. Accordingly, if a user downloads a lot of music data, it would cost him/her a lot of money. Therefore, it is difficult for him/her to freely download various kinds of music data for a trial listen.

To solve the problem, the conventional music data provision system allows the reproduction device to download only a part of music data (a climax portion of music, for example) or music data for streaming playback from the music data distribution server for free. Therefore, in the music data provision system, a user can freely obtain various kinds of music data for a trial listen without hurting the interests of the copyright owners of music data or the like.

In this case, for example, when the user performs formal purchase operation to formally purchase the music data after the trial listening of the music, the conventional reproduction device has to download a formal music data (which is a formal version of the part of music data or the music data for streaming playback) from the music data distribution server.

In this manner, the reproduction device has to download the formal music data in response to the formal purchase operation, even if it has already downloaded the part of music data or the music data for streaming playback for the user's trial listen. Therefore, there is a problem that the reproduction device cannot acquire music data efficiently.

The present invention has been made in view of the above points and is intended to provide a content data reproduction apparatus capable of acquiring content data more efficiently.

To solve the above problem, a content data reproduction apparatus for reproducing content data in accordance with the present invention, comprising: transmission means for transmitting to registration confirmation apparatus a confirmation request signal which requests the registration confirmation apparatus to confirm whether or not the content data reproduction apparatus or a user has been registered; reception means for receiving from the registration confirmation apparatus a registration confirmation signal which informs that the content data reproduction apparatus or the user has been registered; storage means for storing content data acquired from content data provision apparatus, the content data provision apparatus providing the content data which is prohibited from being stored in an external section; setting means for setting the content data stored in the storage means to reproducible if the reception means receives the registration confirmation signal; and reproduction means for reproducing the content data if a reproduction command for the content data is input via an input means while the content data is being set to reproducible by the setting means.

Also, registration confirmation apparatus in accordance with the present invention comprising: reception means for receiving from content data reproduction apparatus a confirmation request signal which requests the registration confirmation apparatus to confirm whether or not the content data reproduction apparatus or a user has been registered, the content data reproduction apparatus capable of reproducing content data; first storage means for storing apparatus identification information identifying the content data reproduction apparatus or user identification information identifying the user, along with payment status information showing payment status of the content data reproduction apparatus or the user; determination means for checking the first storage means based on the apparatus identification information or the user identification information shown by the received confirmation request signal to determine whether or not the content data reproduction apparatus or the user has been properly charged; and transmission means for transmitting to the content data reproduction apparatus a registration confirmation signal which informs that the content data reproduction apparatus or the user has been registered, in response to the determination result of the determination means.

Accordingly, the content data reproduction apparatus stores the content data which is prohibited from being stored in an external section. And then the content data reproduction apparatus can reproduce the content data only while it is being registered.

According to the present invention, the content data provided to the content data reproduction apparatus cannot be stored in an external section. In addition, the content data can be reproduced only while the content data reproduction apparatus is being registered. This prevents from hurting the interests of copyright owners or the like. Also, if once the content data is provided to the content data reproduction apparatus by a provision means, the content data reproduction apparatus continues to store the content data. Therefore, the content data reproduction apparatus does not have to repeat a process of downloading the content data. This allows the content data reproduction apparatus to acquire the content data more efficiently, without hurting the interests of copyright owners or the like.

BEST MODE FOR CARRYING OUT THE INVENTION

Figure 1:
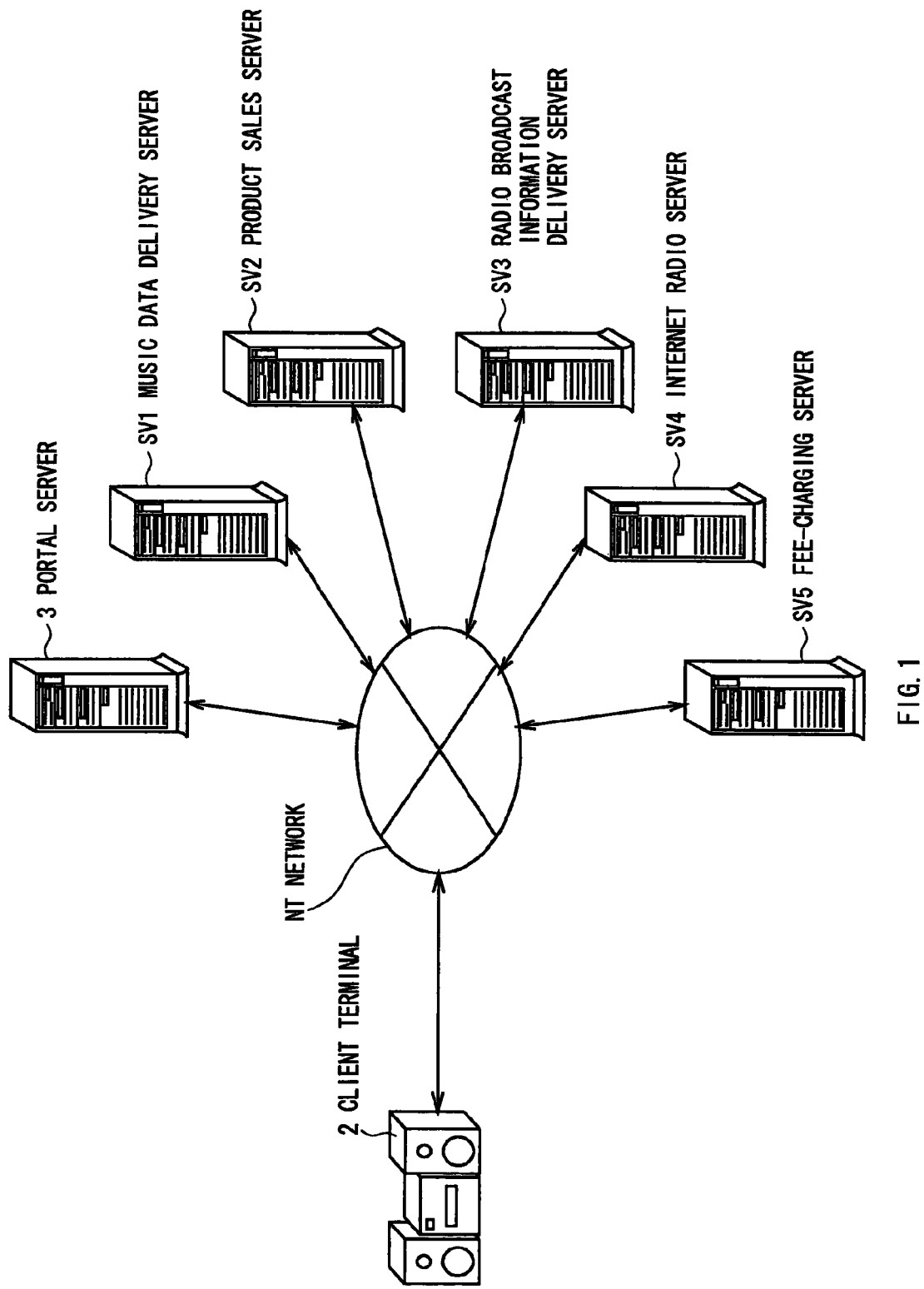
FIG. 1 is a schematic diagram showing the overall configuration of a music related service provision system in accordance with an embodiment of the present invention.

An embodiment of the present invention will be described in detail with reference to the accompanying drawings.
(1) Music Related Service Provision System
(1-1) Configuration of the System With reference to FIG. 1, the reference numeral 1 denotes a music related service provision system as a whole. The music related service provision system 1 includes a client terminal 2, a portal server 3, other various servers SV1 through SV5. A user of the client terminal 2 is under contract to a company operating the music related service provision system 1. The portal server 3 manages the client terminal 2. A plurality of servers SV1 through SV5 provides the client terminal 2 with various kinds of services relating to music.

In this embodiment, the music data delivery server SV1 provides distribution services for distributing music data to the client terminal 2. The music data is converted into such formats as ATRAC3 (Adaptive Transform Acoustic Coding 3), AAC (Advanced Audio Coding), WMA (Windows (Registered Trademark) Media Audio), RealAUDIO G2 Music Codec, MP3 (MPEG Audio Layer-3), and the like.

A product sales server SV2 provides sales services for selling Compact Discs (CDs), Digital Versatile Discs (DVDs), and the like to users through the client terminal 2.

A radio broadcast information delivery server SV3 provides radio broadcast information distribution services for distributing to the client terminal 2 radio broadcast information relating to music and radio program broadcast by radio stations.

A Internet radio server SV4 provides Internet radio broadcast services. In the radio broadcast services, the Internet radio server SV4 supplies radio broadcast data encoded into a streaming format to the client terminal 2 via a network NT. In this case, the network NT is equivalent to the Internet.

A fee-charging server SV5 performs fee-charging processes to charge users various fees in response to requests from the portal server 3 and the like.
(1-2) Configuration of Client Terminal 2
(1-2-1) Functional Circuit Block Configuration of Client Terminal 2

Figure 2:
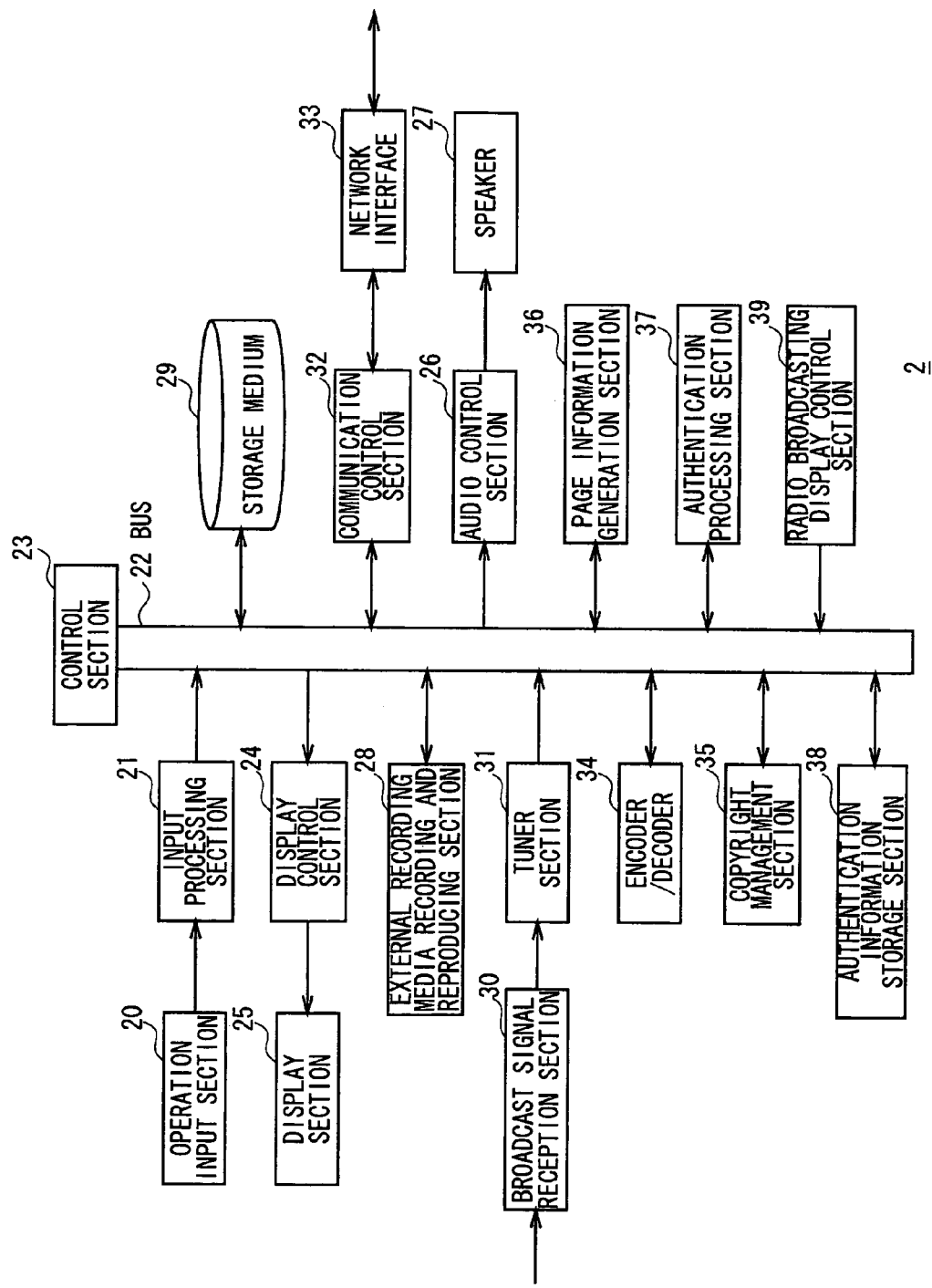
FIG. 2 is a block diagram showing the hardware configuration of a client terminal using functional circuit blocks.

The following describes the hardware configuration of the client terminal 2 using functional circuit blocks. As shown in FIG. 2, the client terminal 2 has an operation input section 20 which includes various kinds of buttons. The operation input section 20 is disposed on the surface of the cabinet of the client terminal 2 or remote control (not shown). If a user operates the operation input section 20, the operation input section 20 detects the operation, and supplies operation input signals corresponding to the operation to an input processing section 21.

The input processing section 21 converts the operation input signals provided by the operation input section 20 into specific operation commands, and transmits them via a bus 22 to a control section 23.

The control section 23 is connected to each circuit via the bus 22. The control section 23 controls operation of each circuit based on operation commands and control commands provided by each circuit.

A display control section 24 receives video data via the bus 22, and performs digital-to-analog conversion for the video data to generate analog video signals. The display control section 24 then supplies the analog video signals to the display section 25.

For example, the display section 25 is a display device such as a liquid crystal display. The display section 25 may be disposed on the surface of the cabinet directly or externally.

The display section 25 receives analog video signals from the display control section 24, and displays images based on the analog video signals. The analog video signals may be correspond to processing results of the control section 23 or various kinds of video data.

An audio control section 26 receives audio data via the bus 22, and performs digital-to-analog conversion for the audio data to generate analog audio signals. The audio control section 26 then transmits the analog audio signals to a speaker 27. The speaker 27 outputs audio based on the analog audio signals supplied from the audio control section 26.

For example, external storage media such as CDs and MEMORY STICK (Registered Trademark of Sony Corporation) store contents data. The MEMORY STICK consists of flash memories covered with exterior cases. An external recording media recording and reproducing section 28 reads content data from external storage media, and then reproduces them. Alternatively, the external recording media recording and reproducing section 28 records record-target content data on external storage media.

If the external recording media recording and reproducing section 28 obtains video data (content data) from an external storage medium, the external recording media recording and reproducing section 28 then transmits the video data via the bus 22 to the display control section 24.

The display control section 24 converts the video data to analog video signals, then transmits the analog video signals to the display section 25. By the way, the video data (content data) is read from the external storage medium by the external recording media recording and reproducing section 28.

If the external recording media recording and reproducing section 28 obtains audio data (content data) from an external storage medium, the external recording media recording and reproducing section 28 then transmits the audio data via the bus 22 to the audio control section 26.

The audio control section 26 converts the audio data to analog audio signals, then transmits the analog audio signals to the speaker 27. By the way, the audio data (content data) is read from the external storage medium by the external recording media recording and reproducing section 28.

A storage medium 29 is disposed in the client terminal 2. The control section 23 transmits content data read from external storage media by the external recording media recording and reproducing section 28 via the bus 22 to the storage medium 29 to store the content data in the storage medium 29 (storing content data in the storage medium 29 as described above is referred to as "ripping").

If the control section 23 obtains video data (content data) from the storage medium 29, the control section 23 then supplies the video data via the bus 22 to the display control section 24. The video data is for example equivalent to image data.

If the control section 23 obtains audio data (content data) from the storage medium 29, the control section 23 then supplies the audio data via the bus 22 to the audio control section 26.

The control section 23 also reads music data from the storage medium 29, and supplies the music data to the external recording media recording and reproducing section 28 to records the music data on external storage media.

A broadcast signal reception section 30 receives radio waves from each broadcast station, and then transmits radio waves to a tuner section 31.

For example, a user operates the operation input section 20 to specify a certain radio station. The tuner section 31 under the control of the control section 23 extracts radio broadcast signals of the frequency corresponding to the specified station from radio waves received by the broadcast signal reception section 30. The tuner section 31 then performs prescribed reception processes to generate audio data, and supplies the audio data via the bus 22 to the audio control section 26.

The audio control section 26 receives the audio data from the tuner section 31, and converts the audio data to analog audio signals. The audio control section 26 then transmits the analog audio signals to the speaker 27. The speaker 27 therefore outputs audio of a radio program broadcast from a radio station. As a result, a user can listen to audio of a radio program.

The control section 23 supplies audio data obtained by the tuner section 31 to the storage medium 29 to store it in the storage medium 29. In this manner, the control section 23 can record audio of a radio program.

The control section 23 also connects with the network NT through a communication control section 32 and a network interface 33 in order. The control section 23 therefore can access the portal server 3 and other servers SV1 through SV4 on the network NT. The control section 23 interchanges various kinds of information and data with the portal server 3 and other servers SV1 through SV4.

An encoder/decoder section 34 decodes compressed-coded content data, and transmits it to the display control section 24 or the audio control section 26. The compressed-coded content data is obtained from the network NT via the network interface 33 and the communication control section 32 in order, or the storage medium 29, or external storage media.

The encoder/decoder section 34 performs compression code processes for content data, audio data supplied from the tuner section 31 or the like to generate compressed-coded content data, and supplies it to the storage medium 29. For example, the content data which is neither compressed nor coded is read from external storage media.

The compressed-coded content data generated by the encoder/decoder section 34 therefore is stored in the storage medium 29 by the control of the control section 23.

The copyright management section 35 generates copyright management information for content data downloaded from the network NT via the network interface 33 and the communication control section 32 in order. The copyright management section 35 also generates copyright management information for content data read from external storage media by the external recording media recording and reproducing section 28.

The copyright management information generated by the copyright management section 35 is to be associated with corresponding content data, and to be stored in the storage medium 29 by the control of the control section 23.

The copyright management section 35 properly updates copyright management information associated with content data, when performing check-out processes of the content data between the storage medium 29 and a specific external storage medium, or when performing check-in processes of the content data between the storage medium 29 and a specific external storage medium. In this manner, the copyright management section 35 protects copyright of the content data.

A page information generation section 36 interprets page information to generate video data which is to be displayed on the display section 25. The page information includes extensible Markup Language (XML) files or Hyper Text Markup Language (HTML) files obtained from the network NT via the network interface 33 and the communication control section 32 in order. The page information generation section 36 then supplies the video data to the display control section 24.

An authentication processing section 37 connects with the portal server 3 and other servers SV1 through SV4 on the network NT via the network interface 33. The authentication processing section 37 performs authentication processes such as transmitting authentication information to the portal server 3 and other servers SV1 through SV4 via the communication control section 32 and the network interface 33 in order.

An authentication information storage section 38 stores authentication information. The authentication processing section 37 requires the authentication information when accessing the portal server 3 and other servers SV1 through SV4.

A radio broadcasting display control section 39, when receiving a radio program to let users listen to it, transmits request signals for requesting radio broadcast information relating to the radio program to the radio broadcast information delivery server SV3 corresponding to a radio station which broadcasts the received radio program via the communication control section 32 and the network interface 33 in order.

As a result, the radio broadcasting display control section 39 receives radio information transmitted from the radio information delivery server SV3 on the network NT via the network interface 33 and the communication control section 32 in order, and supplies the radio information to the display control section 24. The display section 25 therefore displays radio information which includes a title of the received radio program, a title of received music, and an artist name of the music.

(1-2-2) Directory Management

Figure 3:
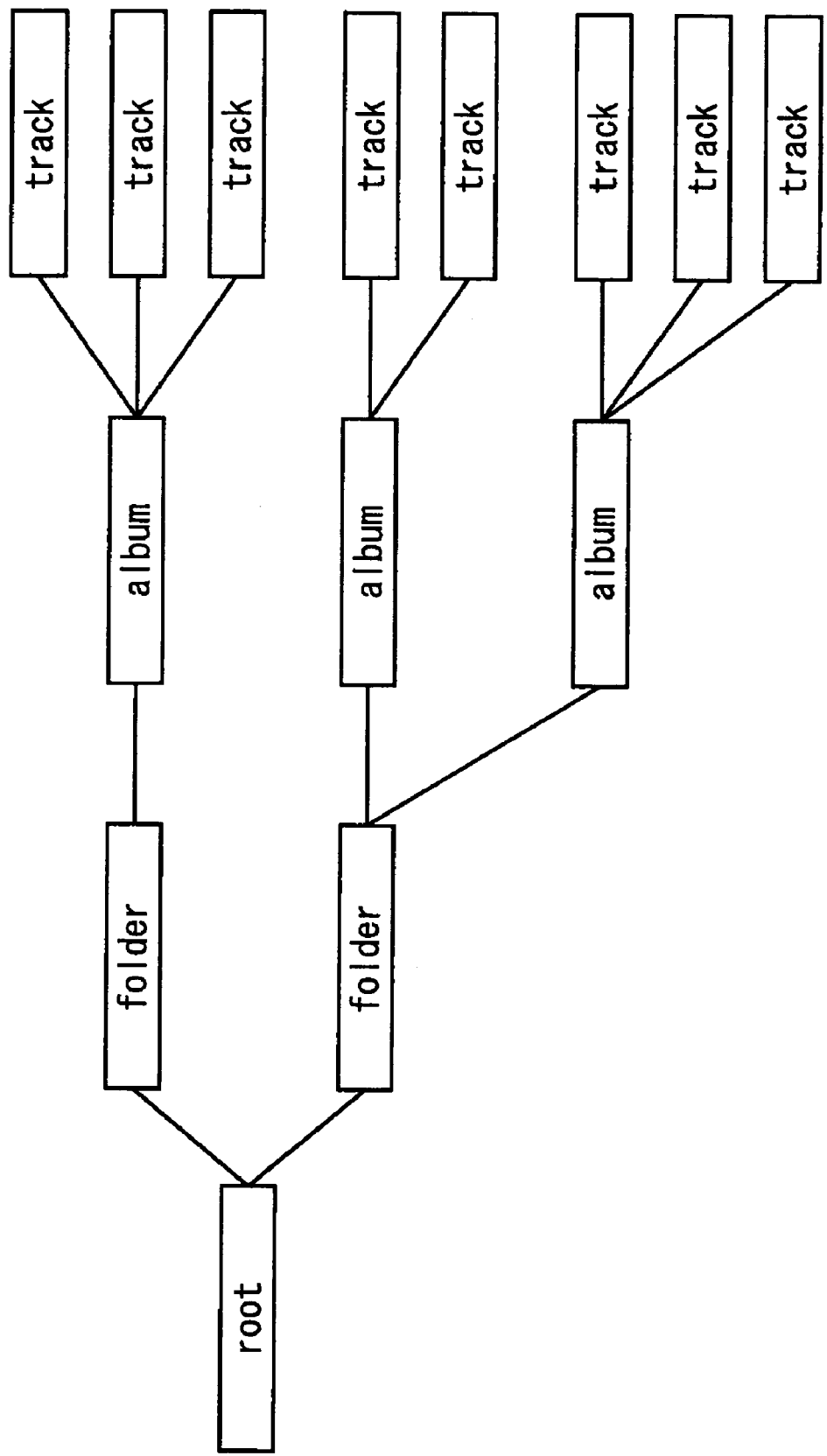
FIG. 3 is a schematic diagram showing a directory structure.

The control section 23 of the client terminal 2 manages content data stored in the storage medium 29 using a directory structure as shown in FIG. 3. One or more "folder" directories are created under a "root" directory. Specifically, the number of the "folder" directories created under the "root" directory is limited. The created "folder" directories for example correspond to genres of content data, or users who own the client terminal 2.

One or more "album" directories are created under a "folder" directory. Specifically, the number of the "album" directories created under a "folder" directory is limited. Each "album" directory for example corresponds to an album title. One or more "track" files are disposed under an "album" directory, so as to belong to the "album". Each "track" file corresponds to a piece of music, i.e., a content data.

The directory management of content data is performed based on data base files stored in the storage medium 29.

(1-3) Functional Circuit Block Configuration of Portal Server 3

Figure 4:
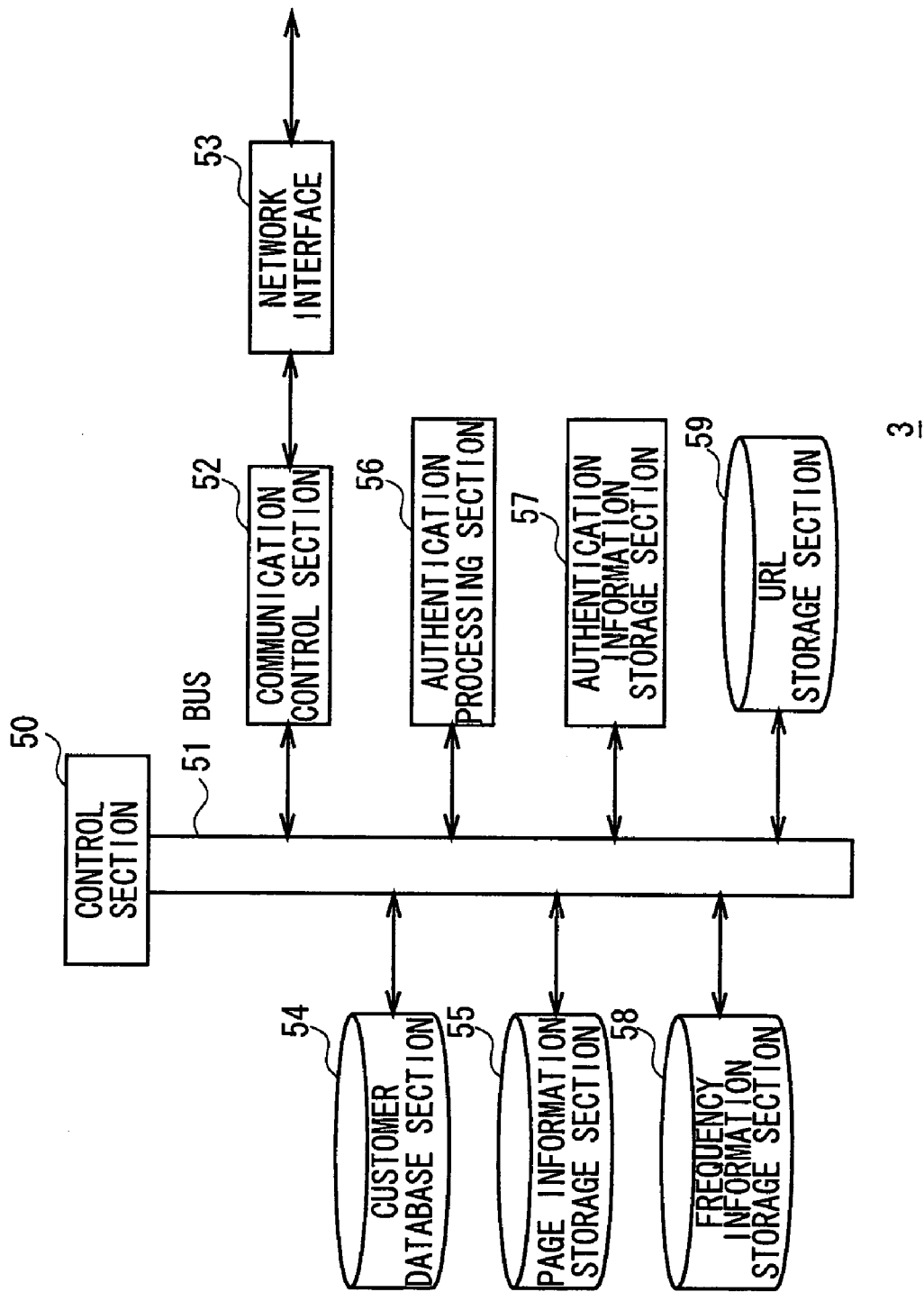
FIG. 4 is a block diagram showing the hardware configuration of a portal server using functional circuit blocks.

With reference to FIG. 4, the functional circuit block configuration of the portal server 3 will be described. The control section 50 of the portal server 3 controls operation of each circuit which is connected via a bus 51.

A communication control section 52 under the control of the control section 50 interchanges various kinds of information with the client terminal 2 and other servers SV1 through SV5 via a network interface 53.

A customer database section 54 stores a user's user Identification (ID) with its password information as customer information. The user is under contract with a company operating the music related service provision system 1.

A page information storage section 55 stores page information and the like. The page information is being managed by a company operating the music related service provision system 1.

The page information is described in the XML language or the like. The page information includes Uniform Resource Locators (URLs) for accessing the music data delivery server SV1, the product sales server SV2, the radio broadcast information delivery server SV3, the Internet radio server SV4 and the like.

An authentication processing section 56 receives the user ID information and password information transmitted from the client terminal 2 via the network interface 53 and the communication control section 52 in order, and then performs user authentication processes. In the processes of user authentication, the authentication processing section 56 checks whether or not the received user ID information and password information are stored in the customer database section 54 as customer information.

After completing the user authentication processes, the authentication processing section 56 issues "portal authentication result information (equivalent to "authentication session ID information" described below)" showing the result of the user authentication process. The authentication processing section 56 then temporarily stores the portal authentication result information in an authentication information storage section 57.

If the result of the user authentication processes done by the authentication processing section 56 shows that the user is legitimate, the control section 50 transmits contractor's page information and portal authentication result information to the client terminal 2 via the communication control section 52 and the network interface 53 in order. The contractor's page information has been stored in a page information storage section 55.

If the result of the user authentication processes done by the authentication processing section 56 shows that the user is not legitimate, the control section 50 may transmit authentication error information and authentication failure notification page information to the client terminal 2 via the communication control section 52 and the network interface 53 in order. In this case, the authentication failure notification page information has been stored in the page information storage section 55, and showing the failure of authentication.

The client terminal 2 may obtain "portal authentication result information (equivalent to "authentication ticket" described below)" from the music data delivery server SV1, the product sales server SV2 or the radio broadcast information delivery server SV3, after the music data delivery server SV1, the product sales server SV2 or the radio broadcast information delivery server SV3 performs authentication processes for a user. In this case, the authentication processing section 56 receives the portal authentication result information from the user's client terminal 2 via the network interface 53 and the communication control section 52 in order, and compares it with the one which corresponds to the user and which is temporarily stored in the authentication information storage section 57.

That is to say, the authentication processing section 56 performs authentication processes for the portal authentication result information that the client terminal 2 received from the music data delivery server SV1, the product sales server SV2 or the radio broadcast information delivery server SV3. In the authentication processes, the authentication processing section 56 performs a check process to check whether or not the received portal authentication result information is legitimate, and then transmits check result information showing the check result via the communication control section 52 and the network interface 53 to the music data delivery server SV1, the product sales server SV2 or the radio broadcast information delivery server SV3.

A frequency information storage section 58 associates the followings together and stores them: a regional code identifying a region, such as a postal code; frequency information showing radio broadcast frequencies receivable in the region; a name of a radio station (which is also referred to as "radio station name") which broadcasts the radio programs; and a call sign which is unique to the radio station. The call sign is identification information to identify each radio station.

A URL storage section 59 associates each call sign with corresponding URL information, and stores them. The call sign is unique to each radio station which broadcasts radio programs. The URL information is utilized to acquire radio broadcast information. The radio broadcast information includes information relating to a radio program being broadcast from a radio station which corresponds to the associated call sign. The radio broadcast information for example includes a title of a radio program, an artist name and title of music being played in the radio program. The radio broadcast information is also referred to as "now-on-air information".

(1-4) Functional Circuit Block Configuration of Music Data Delivery Server SV1

Figure 5:
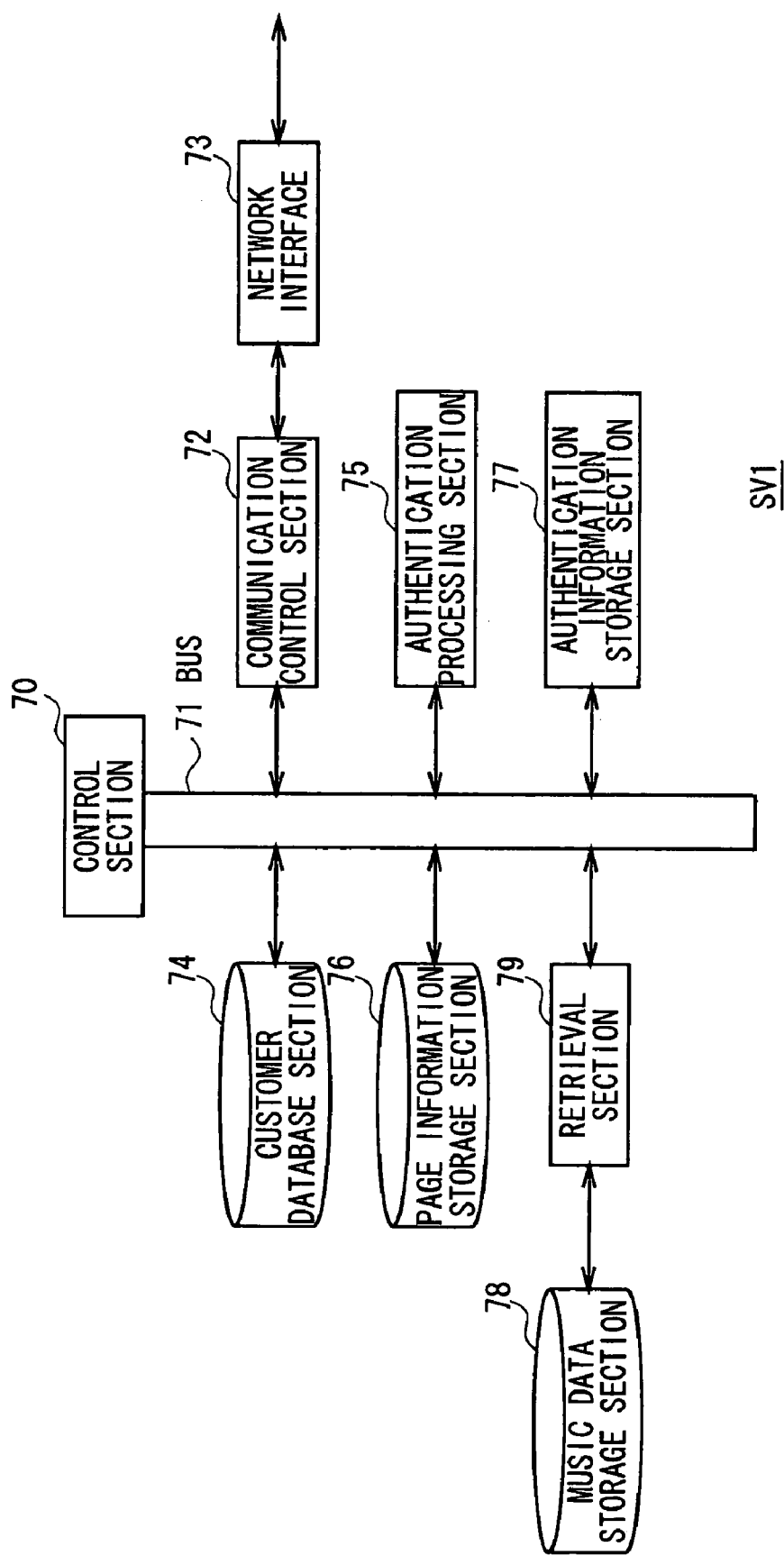
FIG. 5 is a block diagram showing the hardware configuration of a music data delivery server using functional circuit blocks.

With reference to FIG. 5, the functional circuit block configuration of the music data delivery server SV1 will be described. The control section 70 of the music data delivery server SV1 controls operation of each circuit which is connected via a bus 71.

A communication control section 72 under the control of the control section 70 interchanges various kinds of information and various kinds of data such as content data with the client terminal 2, the portal server 3, and the like via a network interface 73.

A customer database section 74 stores a user's user ID information with its password information as customer information. The user is under contract with a company operating the music data delivery server SV1. By the way, an authentication processing section 75 may have functions to authenticate a user based on portal authentication result information (this information is issued by the portal server 3 to the client terminal 2 and transmitted from the client terminal 2 to the music data delivery server SV1). In this case, the customer database section 74 can be omitted.

A page information storage section 76 stores page information and the like. The page information is utilized for music data distribution, and presenting downloadable music data (this page information is also referred to as "music-data-distribution page information"). The page information is being managed by the music data delivery server SV1.

The music-data-distribution page information, described in the XML language or the like, has a structure in which a user of the client terminal 2 can select music data which the user wants to be downloaded.

When the client terminal 2 transmits a page information acquisition request signal which requests music-data-distribution page information, the control section 70 receives the page information acquisition request signal via the network interface 73 and the communication control section 72 in order. The control section 70 then transmits music-data-distribution page information stored in the page-information storage section 76 to the client terminal 2 via the communication control section 72 and the network interface 73 in order, in response to the page information acquisition request signal.

When the client terminal 2 transmits its user's user ID information and password information, the authentication processing section 75 receives the user ID information and the password information via the network interface 73 and the communication control section 72 in order. The authentication processing section 75 then performs a user authentication process. In the user authentication process, the authentication processing section 75 checks whether or not the received user ID information and password information has been registered with the customer database section 74 as customer information.

The authentication processing section 75 may perform another user authentication process. This user authentication process is different from the one which uses user ID information and password information. In this case, the client terminal 2 transmits portal authentication result information (equivalent to an "authentication ticket" described below) issued by the portal server 3. The authentication processing section 75 receives the portal authentication result information via the network interface 73 and the communication control section 72 in order, and then transmits it to the portal server 3 via the communication control section 72 and the network interface 73 in order.

In this manner, the portal authentication result information is transmitted from the authentication processing section 75 to the portal server 3. The portal server 3 then performs authentication processes for the portal authentication result information (i.e. the check process described above), and then transmits check results information. The authentication processing section 75 receives the check results information via the network interface 73 and the communication control section 72 in order, and then checks whether or not the user is legitimate based on the check results information. In this case, a legitimate user means someone who has contracted with a company operating the music related service provision system 1.

When completing the user authentication process, the authentication processing section 75 issues server authentication result information (equivalent to a "service session ID information" described below). The server authentication result information shows the result of the user authentication process.

If the result of the user authentication process done by the authentication processing section 75 shows that the user is legitimate, the control section 70 transmits music-data-distribution page information and the server authentication result information to the client terminal 2 via the communication control section 72 and the network interface 73 in order. The music-data-distribution page information has been prepared for contractors, and stored in the page information storage section 76.

Whereas if the result of the user authentication process done by the authentication processing section 75 shows that the user is not legitimate, the control section 70 transmits authentication error information and authentication failure notification page information to the client terminal 2 via the communication control section 72 and the network interface 73 in order. In this case, the authentication failure notification page information has been stored in the page information storage section 76, and showing the failure of authentication.

An authentication information storage section 77 temporarily stores the server authentication result information issued by the authentication processing section 75. The authentication information storage section 77 also stores other authentication information which is necessary for the authentication processing section 75 to perform user authentication processes. In the user authentication process, a user of the client terminal 2 is authenticated.

A music data storage section 78 associates each compressed-coded music data with its retrieval key, and stores them. The music data has been compressed/coded by the ATRAC3, the MP3, or the like. The retrieval key is equivalent to content ID information and the like.

By the way, after the music-data-distribution page information is transmitted to the client terminal 2, the client terminal 2 may transmits a download request signal. The download request signal requests download of music data which a user wants to be downloaded, and includes a retrieval key for searching the music data. A retrieval section 79 receives the download request signal via the network interface 73 and the communication control section 72 in order, and obtains the retrieval key from it.

The retrieval section 79 then searches a plurality of music data stored in the music data storage section 78 for the music data which meet retrieval conditions shown in the retrieval key. That is to say, the retrieval section 79 searches for the music data which a user wants to be downloaded.

As a result, the control section 70 transmits the searched music data (which a user wants to be downloaded) to the client terminal 2 via the communication control section 72 and the network interface 73 in order.

At this time, the control section 7.0 transmits fee-charging information to the fee-charging server SV5 via the communication control section 72 and the network interface 73 in order. The fee-charging information is used for charging users a fee for the music data downloaded to the client terminal 2. The fee-charging server SV5 performs fee-charging processes for charging users a fee for the downloaded music data.

(1-5) Functional Circuit Block Configuration of Product Sales Server SV2

Figure 6:
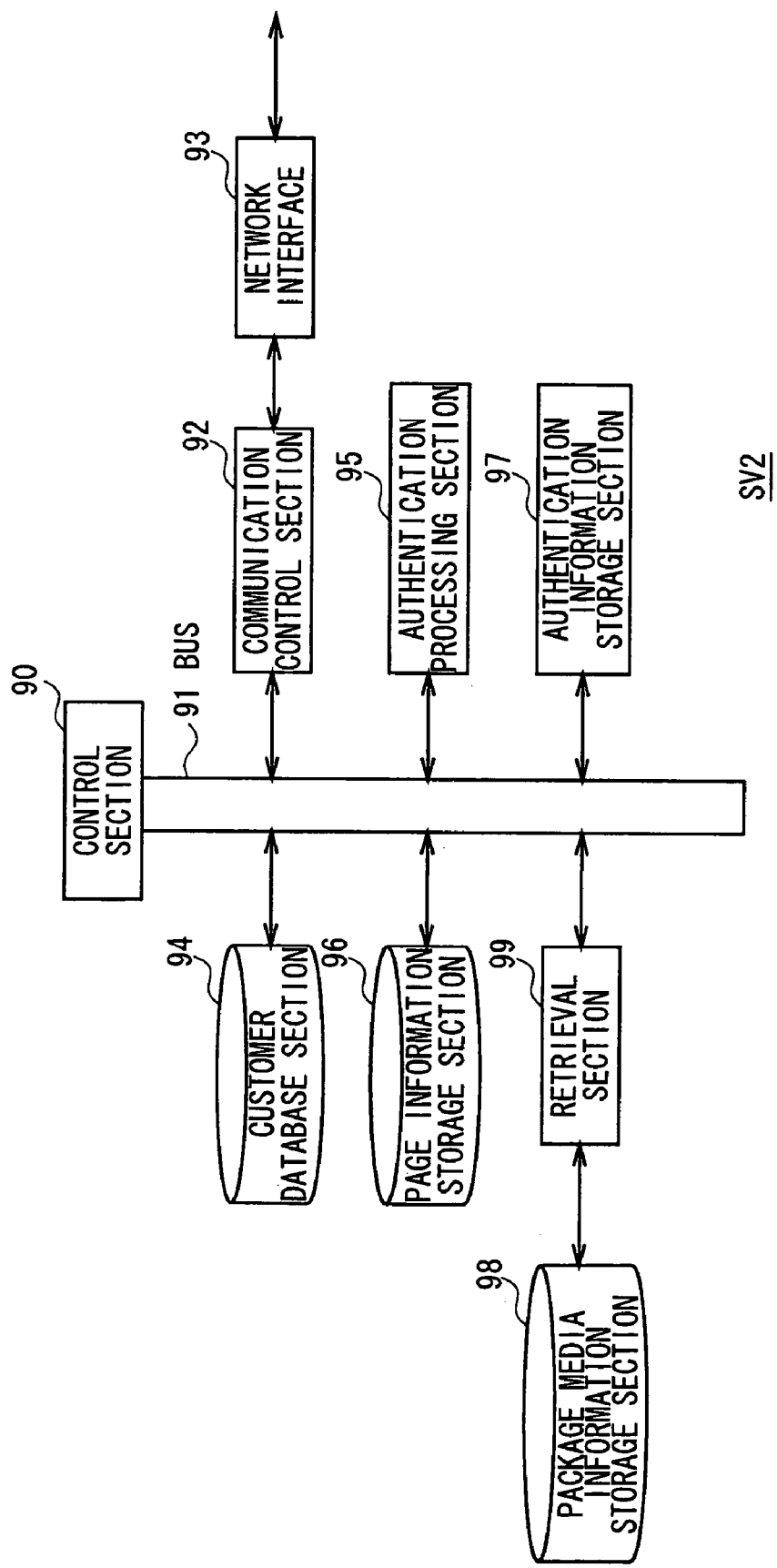
FIG. 6 is a block diagram showing the hardware configuration of a product sales server using functional circuit blocks.

With reference to FIG. 6, the functional circuit block configuration of the product sales server SV2 will be described. The control section 90 of the product sales server SV2 controls operation of each circuit which is connected via a bus 91.

A communication control section 92 under the control of the control section 90 interchanges various kinds of information with the client terminal 2, the portal server 3, and the like via a network interface 93.

A customer database section 94 stores a user's user ID information with its password information as customer information. The user is under contract with a company operating the product sales server SV2. By the way, an authentication processing section 95 may have functions to authenticate a user based on portal authentication result information (this information is issued by the portal server 3 to the client terminal 2 and transmitted from the client terminal 2 to the product sales server SV2). In this case, the customer database section 94 can be omitted.

A page information storage section 96 stores page information and the like. The page information is utilized for sales of package media, and presenting package media such as CDs and DVDs for sale (this page information is also referred to as "package-media-sales page information"). The page information is being managed by the product sales server SV2.

The package-media-sales page information, described in the XML language or the like, has a structure in which a user of the client terminal 2 can select package media such as CDs and DVDs which the user wants to buy.

When the client terminal 2 transmits a page information acquisition request signal which requests package-media-sales page information, the control section 90 receives the page information acquisition request signal via the network interface 93 and the communication control section 92 in order. The control section 90 then transmits package-media-sales page information stored in the page information storage section 96 to the client terminal 2 via the communication control section 92 and the network interface 93 in order, in response to the page information acquisition request signal.

When the client terminal 2 transmits its user's user ID information and password information, the authentication processing section 95 receives the user ID information and the password information via the network interface 93 and the communication control section 92 in order. The authentication processing section 95 then performs a user authentication process. In the user authentication process, the authentication processing section 95 checks whether or not the received user ID information and password information has been registered with the customer database section 94 as customer information.

The authentication processing section 95 may perform another user authentication process. This user authentication process is different from the one which uses user ID information and password information. In this case, the client terminal 2 transmits portal authentication result information (equivalent to an "authentication ticket" described below) issued by the portal server 3. The authentication processing section 95 receives the portal authentication result information via the network interface 93 and the communication control section 92 in order, and then transmits it to the portal server 3 via the communication control section 92 and the network interface 93 in order.

In this manner, the portal authentication result information is transmitted from the authentication processing section 95 to the portal server 3. The portal server 3 then performs authentication processes for the portal authentication result information (i.e. the check process described above), and then transmits check results information. The authentication processing section 95 receives the check results information via the network interface 93 and the communication control section 92 in order, and then checks whether or not the user is legitimate based on the check results information. In this case, a legitimate user means someone who has contracted with a company operating the music related service provision system 1.

When completing the user authentication process, the authentication processing section 95 issues server authentication result information (equivalent to a "service session ID information" described below). The server authentication result information shows the result of the user authentication process.

If the result of the user authentication process done by the authentication processing section 95 shows that the user is legitimate, the control section 90 transmits package-media-sales page information and the server authentication result information to the client terminal 2 via the communication control section 92 and the network interface 93 in order. The package-media-sales page information has been prepared for contractors, and stored in the page information storage section 96.

Whereas if the result of the user authentication process done by the authentication processing section 95 shows that the user is not legitimate, the control section 90 transmits authentication error information and authentication failure notification information to the client terminal 2 via the communication control section 92 and the network interface 93 in order. In this case, the authentication failure notification information has been stored in the page information storage section 96, and showing the failure of authentication.

An authentication information storage section 97 temporarily stores the server authentication result information issued by the authentication processing section 95. The authentication information storage section 97 also stores other authentication information which is necessary for the authentication processing section 95 to perform user authentication processes. In the user authentication process, a user of the client terminal 2 is authenticated.

A package media information storage section 98 associates each piece of package media information with a corresponding retrieval key, and stores them. Each piece of package media information relates to a package medium such as CD and DVD for sale. The retrieval key is equivalent to package medium ID information and the like.

By the way, after the package-media-sales page information is transmitted to the client terminal 2, the client terminal 2 may transmits a media information request signal. The media information request signal requests package media information relating to package media such as CDs and DVDs. A retrieval section 99 receives the media information request signal via the network interface 93 and the communication control section 92 in order, and obtains a retrieval key from it. The retrieval key is used for searching specific package media information.

The retrieval section 99 then searches a plurality of piece of package media information stored in the package media information storage section 98 for the piece of package media information which meets retrieval conditions shown in the retrieval key.

As a result, the control section 90 transmits the searched package media information to the client terminal 2 via the communication control section 92 and the network interface 93 in order, to show a user the package media information relating to a specific package medium.

When the client terminal 2 transmits a purchase request signal which requests the purchase of the package medium, the control section 90 receives the purchase request signal via the network interface 93 and the communication control section 92 in order, and then performs sale processes. In the sale processes, the control section 90 for example does shipping procedures to ship the package medium to a user of the client terminal 2.

At this time, the control section 90 transmits fee-charging information to the fee-charging server SV5 via the communication control section 92 and the network interface 93 in order. The fee-charging information is used for charging users a fee for the purchased package medium. The fee-charging server SV5 performs fee-charging processes to charge users a fee for the purchased package medium.

After the fee-charging server SV5 completes the fee-charging processes for the user, the control section 90 subsequently transmits sale completion page information to the client terminal 2 via the communication control section 92 and the network interface 93 in order. The sale completion page information shows that the sale process of the package medium has been completed.

(1-6) Functional Circuit Block Configuration of Radio Broadcast Information Delivery Server SV3

Figure 7:
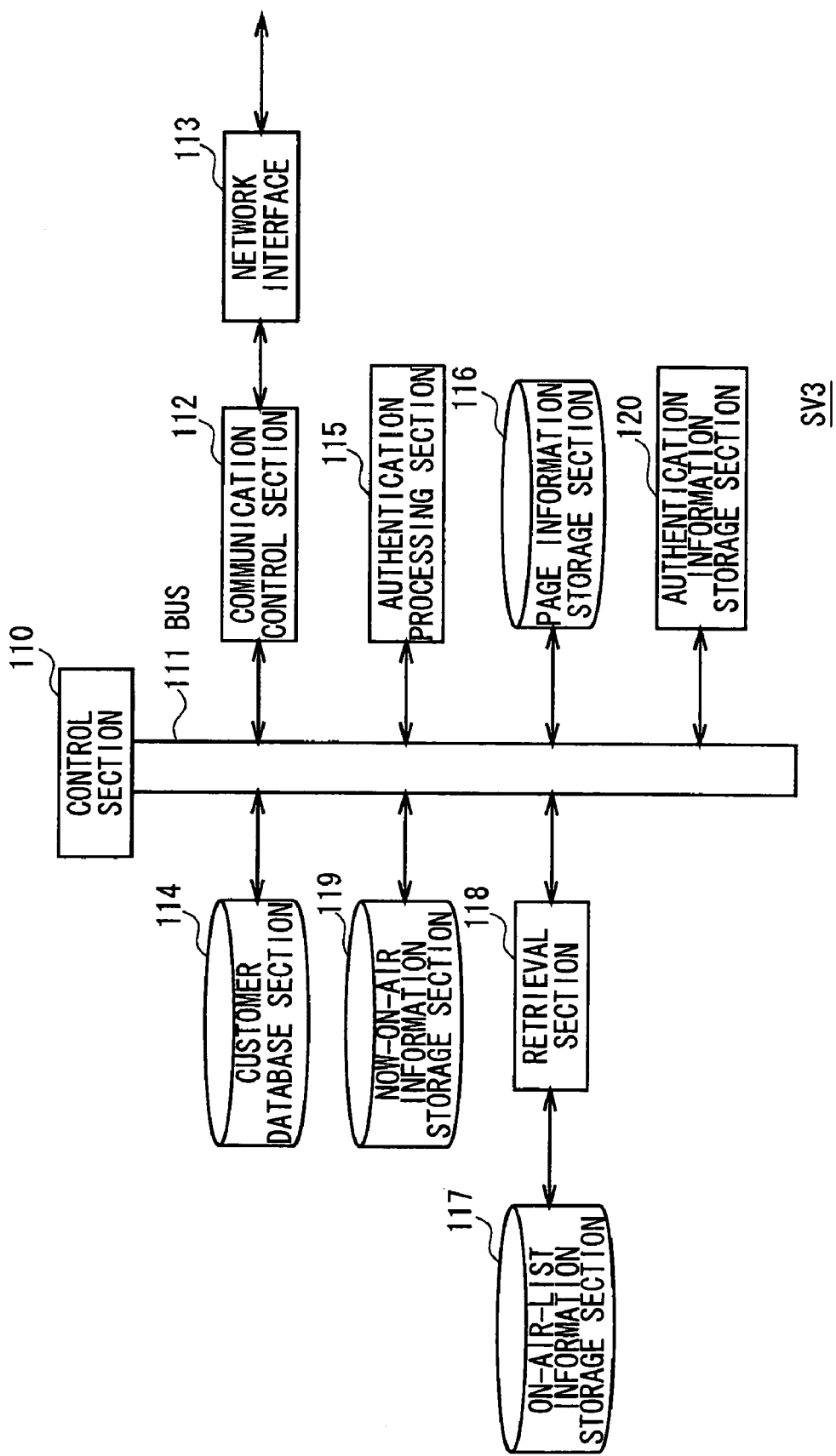
FIG. 7 is a block diagram showing the hardware configuration of a radio broadcast information delivery server using functional circuit blocks.

With reference to FIG. 7, the functional circuit block configuration of the radio broadcast information delivery server SV3 will be described. The control section 110 of the radio broadcast information delivery server SV3 controls operation of each circuit which is connected via a bus 111.

A communication control section 112 under the control of the control section 110 interchanges various kinds of information with the client terminal 2, the portal server 3, and the like via a network interface 113.

A customer database section 114 stores a user's user ID information with its password information as customer information. The user is under contract with a company operating the radio broadcast information delivery server SV3. By the way, an authentication processing section 115 may have functions to authenticate a user based on portal authentication result information (this information is issued by the portal server 3 to the client terminal 2 and transmitted from the client terminal 2 to the radio broadcast information delivery server SV3). In this case, the customer database section 114 can be omitted.

A page information storage section 116 stores page information and the like. The page information is used for acquisition of radio broadcast information. In this case, the radio broadcast information relates to radio programs which have already been broadcast from a radio station that corresponds to the radio broadcast information delivery server SV3. The radio broadcast information is also referred to as "on-air-list information", and the page information used for acquisition of on-air-list information is also referred to as "on-air-list-information-distribution page information". The page information is being managed by the radio broadcast information delivery server SV3.

The on-air-list-information-distribution page information, described in the XML language or the like, provides an input box and the like in which a user of the client terminal 2 can input retrieval keys of on-air-list information which the user wants to obtain. Radio program titles, the date and time of broadcast of the radio program, and the like could be the retrieval key.

An on-air-list information storage section 117 stores on-air-list information. The on-air-list information is generated by listing the following information: a title of a radio program which has already been broadcast from a radio station that corresponds to the radio broadcast information delivery server SV3; the start and end time of broadcast of the program; an artist name and title of music played in the program; the start time of broadcast of the music, and the like.

When the client terminal 2 transmits a page information acquisition request signal which requests on-air-list-information-distribution page information, the control section 110 receives the page information acquisition request signal via the network interface 113 and the communication control section 112 in order. The control section 110 then transmits on-air-list-information-distribution page information which was stored in the page information storage section 116 to the client terminal 2 via the communication control section 112 and the network interface 113 in order, in response to the page information acquisition request signal.

When a user input a retrieval key of on-air-list information which the user wants to obtain into the on-air-list-information-distribution page information, the client terminal 2 transmits an on-air-list information request signal which includes the retrieval key. The on-air-list information request signal requests the download of the on-air-list information. A retrieval section 118 receives the on-air-list information request signal via the network interface 113 and the communication control section 112 in order, and obtains the retrieval key from the on-air-list information request signal.

The retrieval section 118 then searches the whole on-air-list information stored in the on-air-list information storage section 117 based on the retrieval key to extract the part of on-air-list information which meets retrieval conditions shown in the retrieval key. In this manner, the part of on-air-list information which a user wants to acquire is obtained.

The control section 110 subsequently transmits the obtained on-air-list information to the client terminal 2 via the communication control section 112 and the network interface 113 in order.

A now-on-air information storage section 119 stores now-on-air information. The now-on-air information consists of the following information: a title of a radio program which is currently being broadcast from a radio station that corresponds to the radio broadcast information delivery server SV3; the start and end time of broadcast of the program; an artist name and title of music being currently played in the program; the start time of broadcast of the music, and the like.

When the client terminal 2 transmits its user's user ID information and password information with a now-on-air information request signal which requests now-on-air information, the authentication processing section 115 receives the user ID information and the password information via the network interface 113 and the communication control section 112 in order. The authentication processing section 115 then performs a user authentication process. In the user authentication process, the authentication processing section 115 checks whether or not the received user ID information and password information has been registered with the customer database section 114 as customer information.

The authentication processing section 115 may perform another user authentication process. This user authentication process is different from the one which uses user ID information and password information. In this case, the client terminal 2 transmits portal authentication result information (equivalent to an "authentication ticket" described below) issued by the portal server 3. The authentication processing section 115 receives the portal authentication result information via the network interface 113 and the communication control section 112 in order, and then transmits it to the portal server 3 via the communication control section 112 and the network interface 113 in order.

In this manner, the portal authentication result information is transmitted from the authentication processing section 115 to the portal server 3. The portal server 3 then performs authentication processes for the portal authentication result information (i.e. the check process described above), and then transmits check results information. The authentication processing section 115 receives the check results information via the network interface 113 and the communication control section 112 in order, and then checks whether or not the user is legitimate based on the check results information. In this case, a legitimate user means someone who has contracted with a company operating the music related service provision system 1.

When completing the user authentication process, the authentication processing section 115 issues server authentication result information (equivalent to a "service session ID information" described below). The server authentication result information shows the result of the user authentication process.

If the result of the user authentication process done by the authentication processing section 115 shows that the user is legitimate, the control section 110 transmits the server authentication result information and the now-on-air information stored in the now-on-air information storage section 119 to the client terminal 2 via the communication control section 112 and the network interface 113 in order.

Whereas if the result of the user authentication process done by the authentication processing section 115 shows that the user is not legitimate, the control section 110 transmits authentication error information and authentication failure notification page information to the client terminal 2 via the communication control section 112 and the network interface 113 in order. In this case, the authentication failure notification page information has been stored in the page information storage section 116, and showing the failure of authentication.

As described above, when the control section 110 receives a request for now-on-air information from a user, the control section 110 supplies now-on-air information, if the authentication result shows that the user is legitimate. Whereas if the authentication result shows that the user is not legitimate, the control section 110 does not provide radio broadcast information delivery services, i.e., it does not supply now-on-air information. The radio broadcast information delivery service is a service which is provided by the radio broadcast information delivery server SV3.

An authentication information storage section 120 temporarily stores the server authentication result information issued by the authentication processing section 115. The authentication information storage section 120 also stores other authentication information which is necessary for the authentication processing section 115 to perform user authentication processes. In the user authentication process, a user of the client terminal 2 is authenticated.

(1-7) Brief Overview of Processes of Each Server

With reference to sequence charts shown in FIG. 8 through FIG. 13, brief overview of processes between the client terminal 2 and the portal server 3 will be described. Also, brief overview of processes between the client terminal 2 and other servers such as the music data delivery server SV1, the product sales server SV2, and the radio broadcast information delivery server SV3 will be described.

(1-7-1) User Authentication Process Between Client Terminal 2 and Portal Server 3

Figure 8:
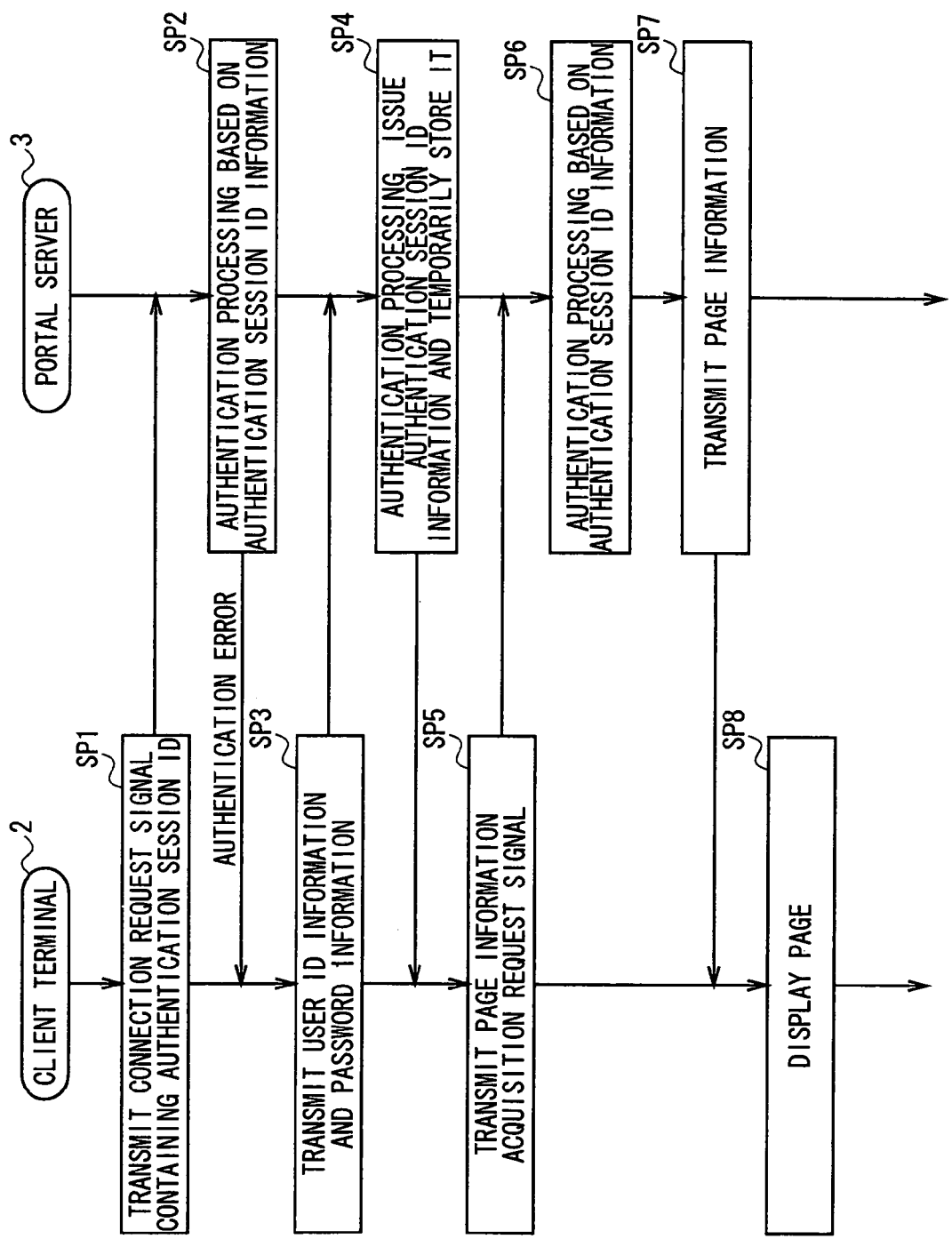
FIG. 8 is a sequence chart showing a user authentication process between the client terminal and the portal server.

With reference to FIG. 8, user authentication processes between the client terminal 2 and the portal server 3 will be described.

When a user under contract with a company operating the music related service provision system 1 operates the client terminal 2 to turn it on, the operation input section 20 of the client terminal 2 detects an operation input signal. Alternatively, when a user pushes a particular operation button of the operation input section 20, the operation input section 20 detects an operation input signal. The input processing section 21 converts the operation input signal to an operation command, and supplies it to the control section 23. The control section 23 therefore starts authentication request processes.

At step SP1, the control section 23 of the client terminal 2 which has started authentication request processes generates a connection request signal, and transmits the connection request signal to the portal server 3 via the communication control section 32 and the network interface 33 in order. The connection request signal contains authentication session ID information which was temporarily stored in the authentication information storage section 38, and the like.

The authentication session ID information is issued by the portal server 3 each time when the communication connection between the client terminal 2 and the portal server 3 is established to perform various kinds of processes such as the user authentication process. The authentication session ID information identifies each communication connection state (i.e., session).

The authentication session ID information has a certain period of validity for the user authentication processes and the like. The period of validity starts when the portal server 3 issues it. The period of validity for example is one minute.

In cases in which the client terminal 2 that already obtained authentication session ID information from the portal server 3 can not submit the authentication session ID information to the portal server 3 within the period of validity, the portal server 3 determines that the communication connection identified by the authentication session ID information has been broken.

In this manner, the portal server 3 prevents the issued authentication session ID information from being used improperly by someone who has not contracted with a company operating the music related service provision system 1 for the purpose of user authentication processes or the like.

In this case, the authentication information storage section 38 temporarily stores the authentication session ID information, which was issued by the portal server 3 when the communication connection between the client terminal 2 and the portal server 3 was established for the purpose of user authentication processes or the like at a time in the past.

When the client terminal 2 transmits connection request signal, the control section 50 of the portal server 3 receives the connection request signal via the network interface 53 and the communication control section 52 in order, at step SP2. The control section 50 then transmits authentication session ID information and the like in the connection request signal to the authentication processing section 56.

The authentication processing section 56 under the control of the control section 50 performs authentication processes based on the authentication session ID information and the like. This authentication session ID information was received as the connection request signal from the client terminal 2.

As a result, if the authentication processing section 56 determines that a user of the client terminal 2 is not legitimate, the control section 50 transmits authentication error information showing authentication error to the client terminal 2 via the communication control section 52 and the network interface 53 in order. In this case, the authentication processing section 56 determines that the user is not legitimate, when the authentication session ID information and the like received from the client terminal 2 have expired, or when there are other reasons.

At step SP3, the control section 23 of the client terminal 2 receives the authentication error information transmitted from the portal server 3 via the network interface 33 and the communication control section 32 in order. The control section 23 subsequently obtains user ID information, password information, and the like from the authentication information storage section 38, and then transmits the user ID information, the password information, and the like to the portal server 3 via the communication control section 32 and the network interface 33 in order.

At step SP4, the control section 50 of the portal server 3 receives the user ID information, the password information, and the like transmitted from the client terminal 2 via the network interface 53 and the communication control section 52 in order, and then supplies the user ID information, the password information, and the like to the authentication processing section 56.

The authentication processing section 56 under the control of the control section 50 performs user authentication processes. In the user authentication process, the authentication processing section 56 checks whether or not the user ID information, the password information, and the like received from the client terminal 2 exist in customer information registered with the customer database section 54.

As a result, if the authentication processing section 56 determines that a user of the client terminal 2 is legitimate, the authentication processing section 56 under the control of the control section 50 issues portal authentication result information for the client terminal 2. In this case, the portal authentication result information is equivalent to authentication session ID information which identifies the communication connection being maintained between the client terminal 2 and the portal server 3, and the like. The authentication processing section 56 then temporarily stores the issued authentication session ID information and the like in the authentication information storage section 57.

The control section 50 then transmits the authentication session ID information and the like to the client terminal 2 via the communication control section 52 and the network interface 53 in order. The authentication session ID information and the like were issued by the authentication processing section 56 for the client terminal 2.

At step SP5, the control section 23 of the client terminal 2 receives the authentication session ID information and the like transmitted from the portal server 3 via the network interface 33 and the communication control section 32 in order, and then supplies the authentication session ID information and the like to the authentication processing section 37.

The authentication processing section 37 under the control of the control section 23 temporarily stores the authentication session ID information and the like received from the portal server 3 in the authentication information storage section 38.

The control section 23 then transmits a page information acquisition request signal with the authentication session ID information and the like (which were received from the portal server 3 and temporarily stored in the authentication information storage section 38) to the portal server 3 via the communication control section 32 and the network interface 33 in order. The page information acquisition request signal requests page information from the portal server 3.

At step SP6, the control section 50 of the portal server 3 receives the page information acquisition request signal, the authentication session ID information, and the like transmitted from the client terminal 2 via the network interface 53 and the communication control section 52 in order, and then supplies the authentication session ID information, and the like to the authentication processing section 56.

The authentication processing section 56 under the control of the control section 50 then performs user authentication processes. In the user authentication process, the authentication processing section 56 compares the authentication session ID information and the like received from the client terminal 2 with the ones temporarily stored in the authentication information storage section 57. The information temporarily stored in the authentication information storage section 57 was issued for the client terminal 2 at step SP4.

At step SP7, if the authentication result shows that a user of the client terminal 2 is legitimate, the authentication processing section 56 determines that the request for page information received from the client terminal 2 is legitimate. The authentication processing section 56 then extends the period of validity of authentication session ID information and the like.

The control section 50 therefore reads the page information requested by a user from the page information storage section 55, and transmits the page information, the authentication session ID information, and the like to the client terminal 2 via the communication control section 52 and the network interface 53 in order. The authentication session ID information and the like have their period of validity extended by the authentication processing section 56.

At step SP8, the control section 23 of the client terminal 2 receives the page information, authentication session ID information and the like transmitted from the portal server 3 via the network interface 33 and the communication control section 32 in order. The authentication session ID information and the like have their period of validity extended. The control section 23 of the client terminal 2 then supplies the page information to the page information generation section 36. The control section 23 of the client terminal 2 also supplies the authentication session ID information and the like to the authentication processing section 37.

The page information generation section 36 generates video data of page based on the page information supplied from the control section 23. The video data of page contains links to the music data delivery server SV1, the product sales server SV2, and the radio broadcast information delivery server SV3. The page information generation section 36 subsequently supplies the video data to the display control section 24.

The display control section 24 performs digital-to-analog conversion for the video data supplied from the page information generation section 36 to generate analog video signals. The display control section 24 then supplies the analog video signals to the display section 25 which displays images of page of the portal server 3 based on the analog video signals.

The authentication processing section 37 under the control of the control section 23 temporarily stores the authentication session ID information and the like in the authentication information storage section 38. The authentication session ID information and the like which have their period of validity extended were received from the portal server 3. In this case, the authentication session ID information and the like overwrite the ones previously and temporarily stored in the authentication information storage section 38. The information previously and temporarily stored in the authentication information storage section 38 does not have the period of validity extended. In this manner, the authentication session ID information and the like temporarily stored by the above-noted step SP5 are updated to the ones having their period of validity extended.

(1-7-2) User Authentication Process Between Client Terminal 2 and Servers SV1 Through SV3

Figure 9:
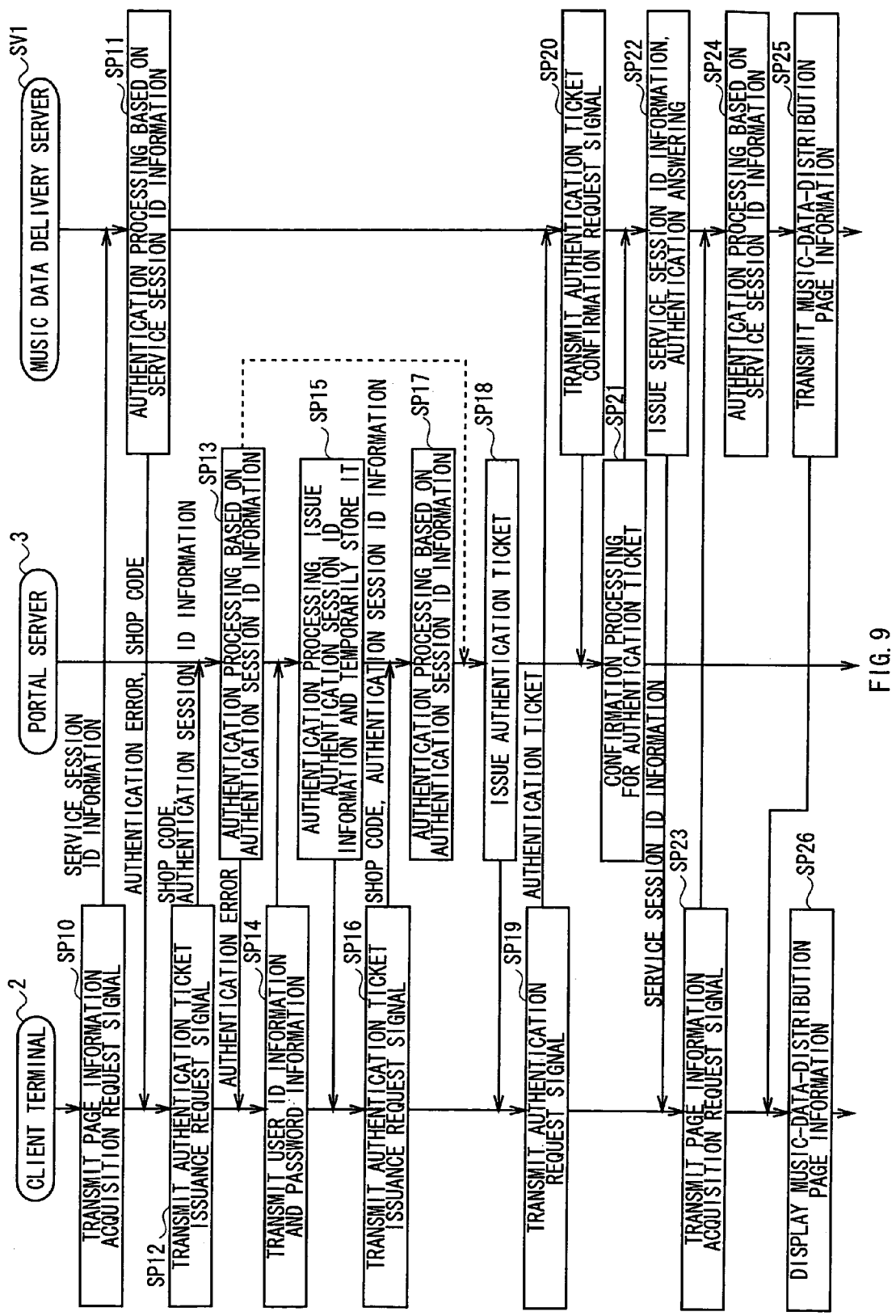
FIG. 9 is a sequence chart showing a user authentication process between the client terminal and the music data delivery server.

With reference to FIG. 9, user authentication processes will be described. The user authentication process is executed between the client terminal 2 and the music data delivery server SV1, the product sales server SV2, or the radio broadcast information delivery server SV3.

The user authentication process may be executed after the client terminal 2 obtains page information from the portal server 3 as described above (FIG. 8). In this case, the user authentication process is executed, when the client terminal 2 accesses the music data delivery server SV1, the product sales server SV2, or the radio broadcast information delivery server SV3 based on links embedded in the page information. This user authentication process is also referred to as an "indirect access authentication process".

The user authentication process may be executed when the client terminal 2 directly accesses the music data delivery server SV1, the product sales server SV2, or the radio broadcast information delivery server SV3 based on URL information and the like previously bookmarked (registered). In this case, the client terminal 2 does not have to obtain page information from the portal server 3. This user authentication process is also referred to as a "direct access authentication process".

The indirect access authentication process can be executed in any combination of the following: the client terminal 2 and the music data delivery server SV1; the client terminal 2 and the product sales server SV2; and, the client terminal 2 and the radio broadcast information delivery server SV3.

The direct access authentication process also can be executed in any combination of the following: the client terminal 2 and the music data delivery server SV1; the client terminal 2 and the product sales server SV2; and, the client terminal 2 and the radio broadcast information delivery server SV3.

The only difference between the indirect access authentication process and the direct access authentication process is the way to obtain URL information which the client terminal 2 uses to access the music data delivery server SV1, the product sales server SV2, and the radio broadcast information delivery server SV3. The indirect access authentication process and the direct access authentication process perform the same procedures after obtaining the URL information.

Accordingly, the situation in which the client terminal 2 accesses the music data delivery serve SV1 will be described to avoid repeatedly explaining. Both the indirect access authentication process and the direct access authentication process will be collectively described as amuser authentication process.

At step SP10, the control section 23 of the client terminal 2 transmits a page information acquisition request signal, service session ID information read from the authentication information storage section 38, and the like to the music data delivery server SV1 via the communication control section 32 and the network interface 33 in order. At this time, the control section 23 of the client terminal 2 uses URL information which is embedded in page information as links, or which is previously bookmarked (registered). The page information acquisition request signal requests music-data-distribution page information (if the client terminal 2 accesses the product sales server SV2 or the radio broadcast information delivery server SV3, the page information acquisition request signal requests package-media-sales page information or on-air-list-information-distribution page information).

Each time when the communication connection between the client terminal 2 and the music data delivery server SV1, the product sales server SV2 or the radio broadcast information delivery server SV3 is established to perform various kinds of processes such as the user authentication process, the service session ID information is issued by the connected server SV1, SV2 or SV3. The service session ID information identifies each communication connection state (i.e., session).

The service session ID information has a certain period of validity for the user authentication processes and the like, in the same way as the above-noted authentication session ID information. The period of validity starts when the music data delivery server SV1, the product sales server SV2 or the radio broadcast information delivery server SV3 issues it. The period of validity for example is one minute.

In cases in which the client terminal 2 that already has service session ID information issued by the server SV1, SV2 or SV3 can not submit the service session ID information to the issued server SV1, SV2 or SV3 within the period of validity, the issued server SV1, SV2 or SV3 determines that the communication connection identified by the service session ID information has been broken.

In this manner, the music data delivery server SV1, the product sales server SV2 or the radio broadcast information delivery server SV3 prevents the issued authentication session ID information from being used improperly by someone who has not contracted with a company operating the music related service provision system 1 for the purpose of user authentication processes or the like.

In this case, the authentication information storage section 38 temporarily stores the service session ID information, which was issued by the music data delivery server SV1, the product sales server SV2 or the radio broadcast information delivery server SV3 when the communication connection between the client terminal 2 and the server SV1, SV2 or SV3 was established for the purpose of user authentication processes or the like at a time in the past.

At step SP11, the control section 70 of the music data delivery server SV1 receives the page information acquisition request signal, service session ID information, and the like transmitted by the client terminal 2 via the network interface 73 and the communication control section 72 in order. The control section 70 of the music data delivery server SV1 then supplies the service session ID information and the like to the authentication processing section 75.

The authentication processing section 75 under the control of the control section 70 performs user authentication processes. In the user authentication process, the authentication processing section 75 compares the service session ID information and the like received from client terminal 2 with the ones temporarily stored in the authentication information storage section 77.

As a result, if the authentication result shows that a user of the client terminal 2 is not legitimate, the authentication processing section 75 determines that the request for music-data-distribution page information received from the client terminal 2 is not legitimate. For example, the authentication result shows that a user of the client terminal 2 is not legitimate, when the service session ID information received from the client terminal 2 has expired.

The control section 70 subsequently transmits authentication error information showing authentication error, and a shop code identifying the music data delivery server SV1 to the client terminal 2 via the communication control section 72 and the network interface 73 in order, because the authentication processing section 75 determines that a user of the client terminal 2 is not legitimate.

At step SP12, the control section 23 of the client terminal 2 receives the authentication error information and shop code transmitted from the music data delivery server SV1 via the network interface 33 and the communication control section 32 in order. The control section 23 of the client terminal 2 then recognizes that the user is not authenticated as legitimate based on the authentication error information, and temporarily stores the shop code received from the music data delivery server SV1 in the authentication information storage section 38.

The control section 23 subsequently generates an authentication ticket issuance request signal. The authentication ticket issuance request signal requests the issue of an authentication ticket which is used for accessing the music data delivery server SV1. The control section 23 then transmits the authentication ticket issuance request signal, a shop code of the music data delivery server SV1, authentication session ID information temporarily stored in the authentication information storage section 38, and the like to the portal server 3 via the communication control section 32 and the network interface 33 in order.

At step SP13, the control section 50 of the portal server 3 receives the authentication ticket issuance request signal, shop code, authentication session ID information, and the like transmitted from the client terminal 2 via the network interface 53 and the communication control section 52 in order, and supplies them to the authentication processing section 56.

The authentication processing section 56 under the control of the control section 50 performs user authentication processes. In the user authentication process, the authentication processing section 56 compares the authentication session ID information and the like received from the client terminal 2 with the ones temporarily stored in the authentication information storage section 57.

As a result, the authentication result shows that a user of the client terminal 2 is not legitimate, the authentication processing section 56 determines that the request for authentication ticket received from the client terminal 2 is not legitimate. For example, the authentication result shows that a user of the client terminal 2 is not legitimate, when the authentication session ID information received from the client terminal 2 has expired.

The control section 50 subsequently transmits authentication error information showing authentication error to the client terminal 2 via the communication control section 52 and the network interface 53 in order, because the authentication processing section 56 determines that a user of the client terminal 2 is not legitimate.

Whereas if the authentication result shows that a user of the client terminal 2 is legitimate, the authentication processing section 56 determines that the request for authentication ticket received from the client terminal 2 is legitimate. For example, the authentication result shows that a user of the client terminal 2 is legitimate, when the authentication session ID information received from the client terminal 2 has not expired.

In cases in which the authentication result by the authentication processing section 56 shows that a user of the client terminal 2 is legitimate, the control section 50 proceeds to step SP18 which is described below.

At step SP14, the control section 23 of the client terminal 2 receives the authentication error information transmitted from the portal server 3 via the network interface 33 and the communication control section 32 in order. The control section 23 of the client terminal 2 then reads user ID information, password information and the like from the authentication information storage section 38, and transmits the user ID information, the password information and the like to the portal server 3 via the communication control section 32 and the network interface 33 in order.

At step SP15, the control section 50 of the portal server 3 receives the user ID information, password information and the like transmitted from the client terminal 2 via the network interface 53 and the communication control section 52 in order, and supplies the user ID information, the password information and the like to the authentication processing section 56.

Therefore, the authentication processing section 56 under the control of the control section 50 performs user authentication processes. In the user authentication process, the authentication processing section 56 checks whether or not the user ID information, password information and the like received from the client terminal 2 exists in customer information registered with the customer database section 54.

As a result, if the authentication result shows that a user of the client terminal 2 is legitimate, the authentication processing section 56 under the control of the control section 50 issues authentication session ID information (portal authentication result information) for the communication connection being currently maintained between the client terminal 2 and the portal server 3, and the like. The authentication processing section 56 then temporarily stores the authentication session ID information and the like issued to the client terminal 2 in the authentication information storage section 57.

The control section 50 subsequently transmits the authentication session ID information and the like issued to the client terminal 2 by the authentication processing section 56 to the client terminal 2 via the communication control section 52 and the network interface 53 in order.

At step SP16, the control section 23 of the client terminal 2 receives the authentication session ID information and the like transmitted from the portal server 3 via the network interface 33 and the communication control section 32 in order, and temporarily stores the authentication session ID information and the like in the authentication information storage section 38 using the authentication processing section 37.

The control section 23 then regenerate an authentication ticket issuance request signal which requests the issue of authentication tickets. The control section 23 subsequently transmits the authentication ticket issuance request signal, the shop code temporarily stored in the authentication information storage section 38, the authentication session ID information and the like being temporarily stored, to the portal server 3 via the communication control section 32 and the network interface 33 in order.

In the present embodiment, the client terminal 2 temporarily stores the shop code in the authentication information storage section 38. However, this invention is not limited to this. The client terminal 2 may interchange again the shop code with the portal server 3 while performing the steps of SP12 through SP16. This allows the client terminal 2 to transmit the shop code to the portal server 3 at step SP16 without temporarily storing it in the authentication information storage section 38.

At step SP17, the control section 50 of the portal server 3 receives the authentication ticket issuance request signal, shop code, authentication session ID information and the like transmitted from the client terminal 2 via the network interface 53 and the communication control section 52 in order, and supplies them to the authentication processing section 56.

The authentication processing section 56 under the control of the control section 50 performs user authentication processes. In the user authentication process, the authentication processing section 56 compares the authentication session ID information and the like received from the client terminal 2 with the ones temporarily stored in the authentication information storage section 57.

If the authentication result shows that a user of the client terminal 2 is legitimate, the authentication processing section 56 determines that the request for authentication tickets received from the client terminal 2 is legitimate. For example, the authentication result shows that a user of the client terminal 2 is legitimate, when the authentication session ID information and the like received from the client terminal 2 have not expired yet.

Then, the control section 50 proceeds to step SP18, as a user of the client terminal 2 is authenticated as legitimate by the authentication processing section 56.

At step SP18, the authentication processing section 56 under the control of the control section 50 issues an authentication ticket (portal authentication result information) and the like based on the shop code and authentication ticket issuance request signal received from the client terminal 2 by the above-noted step SP17. The authentication ticket allows the client terminal 2 to access the music data delivery server SV1 which corresponds to the shop code.

The authentication processing section 56 under the control of the control section 50 temporarily stores the issued authentication ticket and the like in the authentication information storage section 57, and extends the period of validity of authentication session ID information and the like issued to the client terminal 2.

The control section 50 then transmits the authentication ticket, the authentication session ID information having its period of validity extended by the authentication processing section 56, and the like to the client terminal 2 via the communication control section 52 and the network interface 53 in order.

At step SP19, the control section 23 of the client terminal 2 receives the authentication ticket, authentication session ID information having its period of validity extended, and the like transmitted from the portal server 3 via the network interface 33 and the communication control section 32 in order, and supplies the authentication session ID information to the authentication processing section 37.

The control section 23 transmits the authentication ticket received from the portal server 3, an authentication request signal, and the like to the music data delivery server SV1 via the communication control section 32 and the network interface 33 in order.

At this time, the authentication processing section 37 under the control of the control section 23 temporarily stores the authentication session ID information and the like in the authentication information storage section 38. The authentication session ID information and the like which have their period of validity extended were received from the portal server 3. In this case, the authentication session ID information and the like overwrite the ones previously and temporarily stored in the authentication information storage section 38. The information previously and temporarily stored in the authentication information storage section 38 does not have the period of validity extended. In this manner, the authentication session ID information and the like temporarily stored by the above-noted step SP16 are updated to the ones having their period of validity extended.

At step SP20, the control section 70 of the music data delivery server SV1 receives the authentication request signal, authentication ticket and the like transmitted from the client terminal 2 via the network interface 73 and the communication control section 72 in order.

The control section 70 then transmits the authentication ticket received from the client terminal 2, an authentication ticket confirmation request signal which requests the confirmation of the authentication ticket, and the like to the portal server 3 via the communication control section 72 and the network interface 73 in order.

At step SP21, the control section 50 of the portal server 3 receives the authentication ticket confirmation request signal, authentication ticket, and the like transmitted from the music data delivery server SV1 via the network interface 53 and the communication control section 52 in order. The control section 50 of the portal server 3 then supplies the authentication ticket confirmation request signal, authentication ticket, and the like to the authentication processing section 56.

In response to the authentication ticket confirmation request signal, the authentication processing section 56 under the control of the control section 50 performs confirmation processes to confirm the authentication ticket received from the music data delivery server SV1. In the confirmation process, the authentication processing section 56 compares the authentication ticket and the like received from the music data delivery server SV1 with the ones temporarily stored in the authentication information storage section 57.

If the confirmation result shows that the authentication ticket and the like received from the music data delivery server SV1 are legitimate, the control section 50 transmits confirmation result information to the music data delivery server SV1 via the communication control section 52 and the network interface 53 in order, the confirmation result information showing that the authentication ticket and the like are legitimate.

At step SP22, the control section 70 of the music data delivery server SV1 receives the confirmation result information transmitted from the portal server 3 via the network interface 73 and the communication control section 72 in order, and supplies the confirmation result information to the authentication processing section 75.

In response to the confirmation result information, the authentication processing section 75 under the control of the control section 70 issues service session ID information (server authentication result information) for the communication connection being currently maintained between the client terminal 2 and the music data delivery server SV1, and the like. The authentication processing section 75 then temporarily stores the issued service session ID information and the like in the authentication information storage section 77.

The control section 70 transmits the service session ID information and the like issued to the client terminal 2 by the authentication processing section 75 to the client terminal 2 via the communication control section 72 and the network interface 73 in order.

At step SP23, the control section 23 of the client terminal 2 receives the service session ID information and the like transmitted from the music data delivery server SV1 via the network interface 33 and the communication control section 32 in order, and temporarily stores the service session ID information and the like in the authentication information storage section 38 using the authentication processing section 37.

Therefore, the control section 23 transmits a page information acquisition request signal which requests music-data-distribution page information, the service session ID information and the like to the music data delivery server SV1 via the communication control section 32 and the network interface 33 in order. The service session ID information was received from the music data delivery server SV1 and temporarily stored in the authentication information storage section 38.

At step SP24, the control section 70 of the music data delivery server SV1 receives the page information acquisition request signal, service session ID information and the like transmitted from the client terminal 2 via the network interface 73 and the communication control section 72 in order, and supplies the service session ID information and the like to the authentication processing section 75.

The authentication processing section 75 under the control of the control section 70 performs user authentication processes. In the user authentication process, the authentication processing section 75 compares the service session ID information and the like received from the client terminal 2 with the ones temporarily stored in the authentication information storage section 77. The information temporarily stored in the authentication information storage section 77 was issued to the client terminal 2 by the above-noted step SP22.

If the authentication result shows that a user of the client terminal 2 is legitimate, the authentication processing section 75 determines that the request for music-data-distribution page information received from the client terminal 2 is legitimate. For example, the authentication result shows that a user of the client terminal 2 is legitimate, when the service session ID information and the like received from the client terminal 2 have not expired yet.

Then, the control section 70 proceeds to step SP25, as a user of the client terminal 2 is authenticated as legitimate by the authentication processing section 75.

At step SP25, the control section 70 reads the music-data-distribution page information which is requested by a user from the page information storage section 76. The control section 70 also extends the period of validity of the service session ID information and the like issued to the client terminal 2 using the authentication processing section 75.

The control section 70 subsequently transmits the music-data-distribution page information read from the page information storage section 76, the service session ID information having its period of validity extended by the authentication processing section 75, and the like to the client terminal 2 via the communication control section 72 and the network interface 73 in order.

At step SP26, the control section 23 of the client terminal 2 receives the music-data-distribution page information, the service session ID information having its period of validity extended, and the like transmitted from the music data delivery server SV1 via the network interface 33 and the communication control section 32 in order. The control section 23 of the client terminal 2 then supplies the music-data-distribution page information to the page information generation section 36. The control section 23 of the client terminal 2 also supplies the service session ID information and the like received from the music data delivery server SV1 to the authentication processing section 37.

The authentication processing section 37 under the control of the control section 23 temporarily stores the service session ID information and the like in the authentication information storage section 38. The service session ID information and the like which have their period of validity extended were received from the music data delivery server SV1. In this case, the service session ID information and the like overwrite the ones previously and temporarily stored in the authentication information storage section 38. The information previously and temporarily stored in the authentication information storage section 38 does not have the period of validity extended. In this manner, the service session ID information and the like temporarily stored by the above-noted step SP23 are updated to the ones having their period of validity extended.

The page information generation section 36 generates video data based on the music-data-distribution page information, and supplies the video data to the display control section 24.

The display control section 24 performs digital-to-analog conversion for the video data supplied from the page information generation section 36 to generate analog video signals. The display control section 24 then supplies the analog video signals to the display section 25. The display section 25 displays images of the music-data-distribution page based on the analog video signals.

(1-7-3) Music Related Service Provision Processes

After completing the user authentication process (FIG. 9) between the client terminal 2 and the music data delivery server SV1 or the product sales server SV2 or the radio broadcast information delivery server SV3, the music related service provision process is executed. With reference to FIG. 10 through FIG. 13, the music related service provision process will be described in the following situation: the client terminal 2 receives music data distribution services using music-data-distribution page information obtained during the user authentication processing from the music data delivery server SV1; the client terminal 2 receives sales services using package-media-sales page information obtained during the user authentication processing from the product sales server SV2; and the client terminal 2 receives radio broadcast information distribution services using on-air-list-information-distribution page information obtained during the user authentication processing from the radio broadcast information delivery server SV3.

(1-7-3-1) Music Data Distribution Service Provision Process

Figure 10:
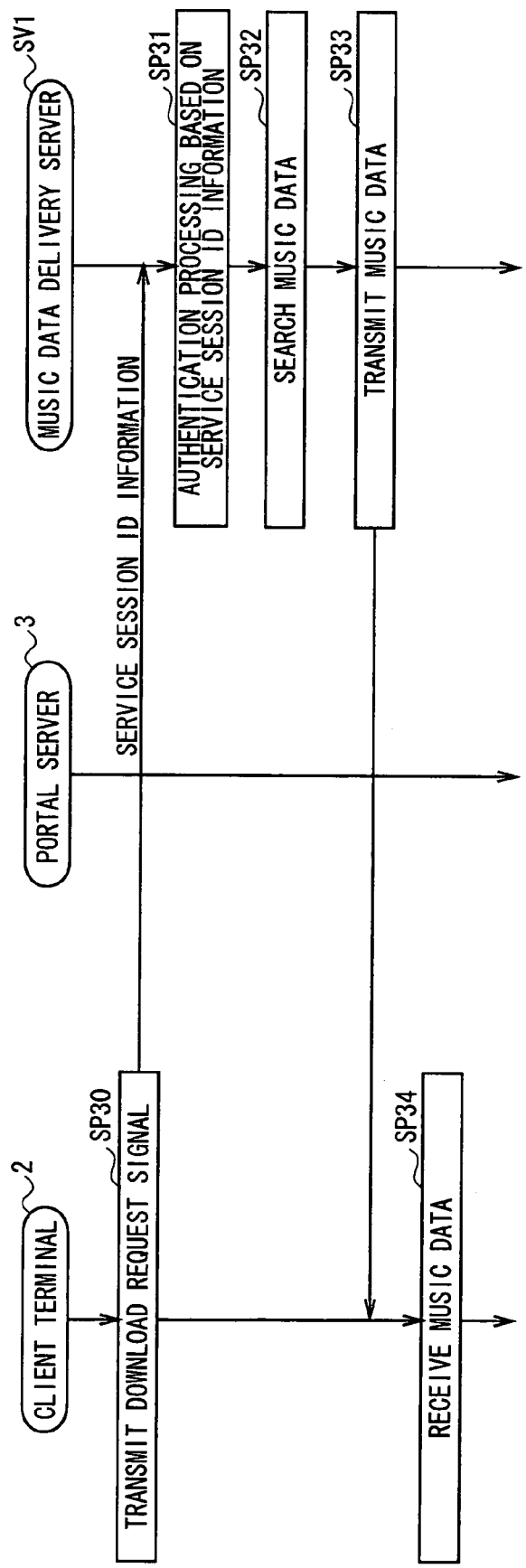
FIG. 10 is a sequence chart showing a music data distribution service provision process.

With reference to FIG. 10, the music data distribution service provision process will be described. In the music data distribution service provision process, the client terminal 2 receives the music data distribution service from the music data delivery server SV1.

At step SP30, if control commands which select a part of the music-data-distribution page displayed as images on the display section 25 are input from the input processing section 21, the control section 23 of the client terminal 2 generates a download request signal. The download request signal requests the download of music data which a user wants to be downloaded.

The control section 23 then transmits the download request signal, the service session ID information, and the like to the music data delivery server SV1 via the communication control section 32 and the network interface 33 in order. The service session ID information was issued by the music data delivery server SV1 and temporarily stored in the authentication information storage section 38.

At step SP31, the control section 70 of the music data delivery server SV1 receives the download request signal, service session ID information and the like transmitted from the client terminal 2 via the network interface 73 and the communication control section 72 in order, and supplies the service session ID information and the like to the authentication processing section 75.

The authentication processing section 75 under the control of the control section 70 performs user authentication processes. In the user authentication process, the authentication processing section 75 compares the service session ID information and the like received from the client terminal 2 with the ones temporarily stored in the authentication information storage section 77.

If the authentication processing section 75 authenticates that a user is legitimate, the control section 70 proceeds to step SP32. In this case, the user has requested the download of music data using the client terminal 2.

At step SP32, the retrieval section 79 performs search processes based on a retrieval key in the download request signal. In the search process, the retrieval section 79 searches a plurality of music data stored in the music data storage section 78 for the music data corresponding to the retrieval conditions shown in the retrieval key, which a user wants to be downloaded.

When the retrieval section 79 has the music data found, the control section 70 extends the period of validity of the service session ID information and the like issued to the client terminal 2 using the authentication processing section 75, and then proceeds to step SP33.

At step SP33, the control section 70 reads the music data (which a user wants to be downloaded) found by the retrieval section 79 from the music data storage section 78. The control section 70 then transmits the music data, the service session ID information having its period of validity extended by the authentication processing section 75, and the like to the client terminal 2 via the communication control section 72 and the network interface 73 in order.

At step SP34, the control section 23 of the client terminal 2 receives the music data (which a user wants to be downloaded), the service session ID information having its period of validity extended, and the like transmitted from the music data delivery server SV1 via the network interface 33 and the communication control section 32 in order. The control section 23 of the client terminal 2 then stores the music data in the storage medium 29. The control section 23 of the client terminal 2 also supplies the service session ID information and the like received from the music data delivery server SV1 to the authentication processing section 37.

The authentication processing section 37 under the control of the control section 23 temporarily stores the service session ID information and the like in the authentication information storage section 38. The service session ID information and the like which have their period of validity extended were received from the music data delivery server SV1. In this case, the service session ID information and the like overwrite the ones previously and temporarily stored in the authentication information storage section 38. The information previously and temporarily stored in the authentication information storage section 38 does not have the period of validity extended. In this manner, the service session ID information and the like temporarily stored are updated to the ones having their period of validity extended.

As described above, the client terminal 2 is capable of downloading the music data which a user wants to obtain using music data distribution services provided by the music data delivery server SV1.

(1-7-3-2) Sales Service Provision Process

Figure 11:
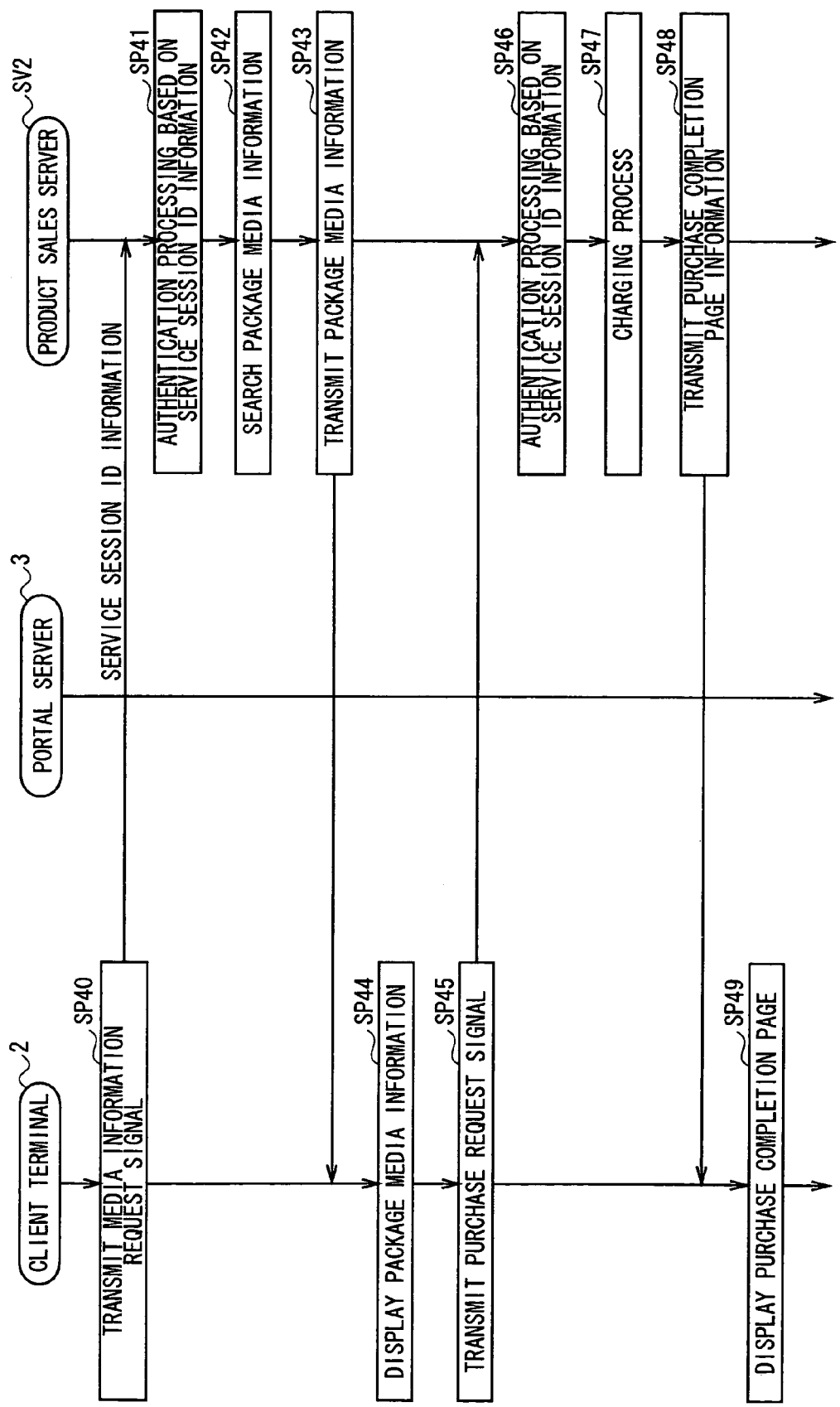
FIG. 11 is a sequence chart showing a sales service provision process.

With reference to FIG. 11, the sales service provision process will be described. In the sales service provision process, the client terminal 2 receives sales services from the product sales server SV2.

At step SP40, if control commands which selects a part of the package-media-sales page information displayed as images on the display section 25 are input from the input processing section 21, the control section 23 of the client terminal 2 generates a media information request signal. The media information request signal requests package media information relating to a specific package media which corresponds to the control commands.

The control section 23 then transmits the media information request signal, the service session ID information and the like to the product sales server SV2 via the communication control section 32 and the network interface 33 in order. The service session ID information was issued by the product sales server SV2 and temporarily stored in the authentication information storage section 38.

At step SP41, the control section 90 of the product sales server SV2 receives the media information request signal, the service session ID information and the like transmitted from the client terminal 2 via the network interface 93 and the communication control section 92 in order, and then supplies the service session ID information and the like to the authentication processing section 95.

The authentication processing section 95 under the control of the control section 90 performs user authentication processes. In the user authentication process, the authentication processing section 95 compares the service session ID information and the like received from the client terminal 2 with the ones temporarily stored in the authentication information storage section 97.

If the authentication processing section 95 authenticates that a user is legitimate, the control section 90 proceeds to step SP42. In this case, the user has requested the package media information relating to the package media using the client terminal 2.

At step SP42, the retrieval section 99 performs search processes based on a retrieval key in the media information request signal. In the search process, the retrieval section 99 searches a plurality of pieces of package media information stored in the package media information storage section 98 for a certain piece of package media information which corresponds to retrieval conditions shown in the retrieval key.

When the retrieval section 99 has the piece of package media information found, the control section 90 extends the period of validity of the service session ID information and the like issued to the client terminal 2 using the authentication processing section 95, and then proceeds to step SP43.

At step SP43, the control section 90 reads the package media information found by the retrieval section 99 from the package media information storage section 98. The control section 90 then transmits the package media information, the service session ID information having its period of validity extended by the authentication processing section 95, and the like to the client terminal 2 via the communication control section 92 and the network interface 93 in order.

At step SP44, the control section 23 of the client terminal 2 receives the package media information, the service session ID information having its period of validity extended, and the like transmitted from the product sales server SV2 via the network interface 33 and the communication control section 32 in order, and supplies the package media information to the page information generation section 36. The control section 23 of the client terminal 2 also supplies the service session ID information and the like received from the product sales server SV2 to the authentication processing section 37.

The authentication processing section 37 under the control of the control section 23 temporarily stores the service session ID information and the like in the authentication information storage section 38. The service session ID information and the like which have their period of validity extended were received from the product sales server SV2. In this case, the service session ID information and the like overwrite the ones previously and temporarily stored in the authentication information storage section 38. The information previously and temporarily stored in the authentication information storage section 38 does not have the period of validity extended. In this manner, the service session ID information and the like temporarily stored are updated to the ones having their period of validity extended.

The page information generation section 36 generates video data based on the package media information supplied from the control section 23. The page information generation section 36 then converts the video data to analog video signals using the display control section 24, and supplies the analog video signals to the display section 25.

After the display section 25 starts to display images of the package media information based on the analog video signals, the control section 23 proceeds to step SP45.

At step SP45, if control commands that request the purchase of the package media corresponding to the package media information displayed as images on the display section 25 are input from the input processing section 21, the control section 23 generates a purchase request signal in response to the control commands. The purchase request signal requests the purchase of the package media.

The control section 23 then transmits the purchase request signal, the service session ID information having its period of validity extended, and the like to the product sales server SV2 via the communication control section 32 and the network interface 33 in order. The service session ID information was received from the product sales server SV2 and temporarily stored in the authentication information storage section 38.

At step SP46, the control section 90 of the product sales server SV2 receives the purchase request signal, the service session ID information and the like transmitted from the client terminal 2 via the network interface 93 and the communication control section 92 in order, and supplies the service session ID information and the like to the authentication processing section 95.

The authentication processing section 95 under the control of the control section 90 performs user authentication processes. In the user authentication process, the authentication processing section 95 compares the service session ID information and the like received from the client terminal 2 with the ones temporarily stored in the authentication information storage section 97.

As a result, if the authentication processing section 95 authenticates that the user who requests the purchase of package media using the client terminal 2 is legitimate, the control section 90 proceeds to step SP47.

At step SP47, the control section 90 performs sales processes. In the sales process, the control section 90 executes procedures to deliver the requested package media to the user of the client terminal 2. The control section 90 also transmits fee-charging information to the fee-charging server SV5 via the communication control section 92 and the network interface 93 in order. The fee-charging information is used for charging the user a fee for the purchased package media.

Therefore, the fee-charging server SV5 performs fee-charging processes to charge the user a fee for the purchased package media.

The control section 90 also extends the period of validity of service session ID information and the like issued to the client terminal 2 using the authentication processing section 95.

At step SP48, after completing the fee-charging process, the control section 90 transmits purchase completion page information showing the completion of the purchase of package media, the service session ID information having its period of validity extended by the authentication processing section 95, and the like to the client terminal 2 via the communication control section 92 and the network interface 93 in order.

At step SP49, the control section 23 of the client terminal 2 receives the purchase completion page information, the service session ID information having its period of validity extended, and the like transmitted from the product sales server SV2 via the network interface 33 and the communication control section 32 in order, and supplies the purchase completion page information to the page information generation section 36. The control section 23 also supplies the service session ID information and the like received from the product sales server SV2 to the authentication processing section 37.

The authentication processing section 37 under the control of the control section 23 temporarily stores the service session ID information and the like in the authentication information storage section 38. The service session ID information and the like which have their period of validity extended were received from the product sales server SV2. In this case, the service session ID information and the like overwrite the ones previously and temporarily stored in the authentication information storage section 38. The information previously and temporarily stored in the authentication information storage section 38 does not have the period of validity extended. In this manner, the service session ID information and the like temporarily stored are updated to the ones having their period of validity extended.

The page information generation section 36 generates video data based on the purchase completion page information supplied from the control section 23. The page information generation section 36 then converts the video data to analog video signals using the display control section 24, and supplies the analog video signals to the display section 25.

Therefore, the control section 23 can display images of the purchase completion page based on the analog video signals on the display section 25.

As described above, the client terminal 2 allows a user to purchase package media he/she wants using the sales services provided by the product sales server SV2.

(1-7-3-3) On-Air-List Information Distribution Service Provision Process

Figure 12:
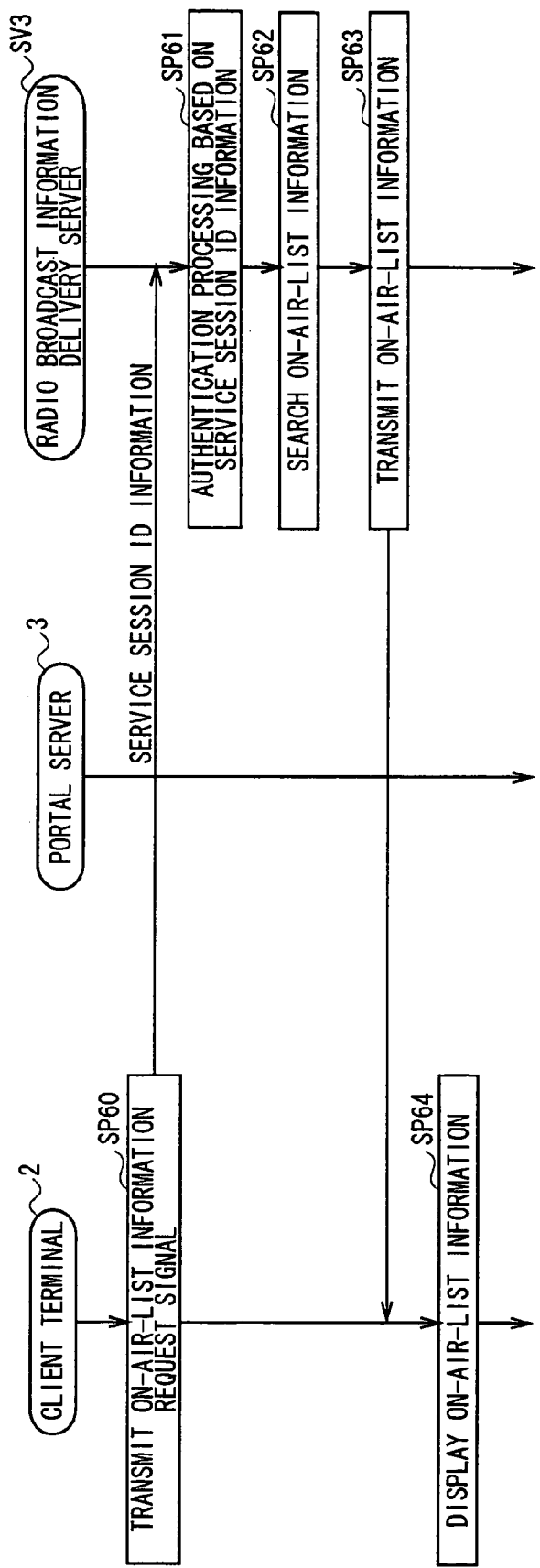
FIG. 12 is a sequence chart showing a radio broadcast information (on-air list information) distribution service provision process (1).

With reference to FIG. 12, radio broadcast information distribution service provision processes will be described. In the radio broadcast information distribution service provision process, the client terminal 2 receives the radio broadcast information distribution service, especially the on-air-list information distribution service from the radio broadcast information delivery server SV3.

At step SP60, a user input a retrieval key in an input box disposed on the on-air-list-information-distribution page being displayed as images on the display section 25. The retrieval key is a character string which corresponds to on-air-list information the user wants to obtain, and is used for retrieving the on-air-list information. At this time, control commands corresponding to the character string are input from the input processing section 21. The control section 23 of the client terminal 2 generates an on-air-list information request signal based on the inputted control commands. The on-air-list information request signal requests the download of the on-air-list information which the user wants to obtain.

The control section 23 then transmits the on-air-list information request signal, the service session ID information temporarily stored in the authentication information storage section 38, and the like to the radio broadcast information delivery server SV3 via the communication control section 32 and the network interface 33 in order. The service session ID information was issued by the radio broadcast information delivery server SV3.

At step SP61, the control section 110 of the radio broadcast information delivery server SV3 receives the on-air-list information request signal, the service session ID information and the like transmitted from the client terminal 2 via the network interface 113 and the communication control section 112 in order, and supplies the service session ID information and the like to the authentication processing section 115.

The authentication processing section 115 under the control of the control section 110 performs user authentication processes. In the user authentication process, the authentication processing section 115 compares the service session ID information and the like received from the client terminal 2 with the ones temporarily stored in the authentication information storage section 120.

As a result, if the authentication processing section 115 authenticates that a user who requests on-air-list information using the client terminal 2 is legitimate, the control section 110 proceeds to step SP62.

At step SP62, the retrieval section 118 performs search processes based on a retrieval key in the on-air-list information request signal. In the search process, the retrieval section 118 searches the whole on-air-list information in the on-air-list information storage section 117 for a certain part of the on-air-list information which meets retrieval conditions shown by the retrieval key to obtain the desired on-air-list information.

When the retrieval section 118 has the on-air-list information found, the control section 110 extends the period of validity of the service session ID information and the like issued to the client terminal 2 using the authentication processing section 115. The control section 110 then proceeds to step SP63.

At step SP63, the control section 110 reads the on-air-list information found by the retrieval section 118 from the on-air-list information storage section 117. The control section 110 then transmits the on-air-list information, the service session ID information having its period of validity extended by the authentication processing section 115, and the like to the client terminal 2 via the communication control section 112 and the network interface 113 in order.

At step SP64, the control section 23 of the client terminal 2 receives the on-air-list information, the service session ID information having its period of validity extended, and the like transmitted from the radio broadcast information delivery server SV3 via the network interface 33 and the communication control section 32 in order, and supplies the on-air-list information to the page information generation section 36. The control section 23 of the client terminal 2 also supplies the service session ID information and the like received from the radio broadcast information delivery server SV3 to the authentication processing section 37.

The authentication processing section 37 under the control of the control section 23 temporarily stores the service session ID information and the like in the authentication information storage section 38. The service session ID information and the like which have their period of validity extended were received from the radio broadcast information delivery server SV3. In this case, the service session ID information and the like overwrite the ones previously and temporarily stored in the authentication information storage section 38. The information previously and temporarily stored in the authentication information storage section 38 does not have the period of validity extended. In this manner, the service session ID information and the like temporarily stored are updated to the ones having their period of validity extended.

The page information generation section 36 generates video data based on the on-air-list information supplied from the control section 23. The page information generation section 36 then converts the video data to analog video signals using the display control section 24, and supplies the analog video signals to the display section 25. The display section 25 therefore displays images based on the analog video signals, i.e., it displays the on-air-list information.

As described above, the client terminal 2 allows a user to obtain the desired on-air-list information using the radio broadcast information distribution service provided by the radio broadcast information delivery server SV3.

(1-7-3-4) Now-On-Air Information Distribution Service Provision Process

Figure 13:
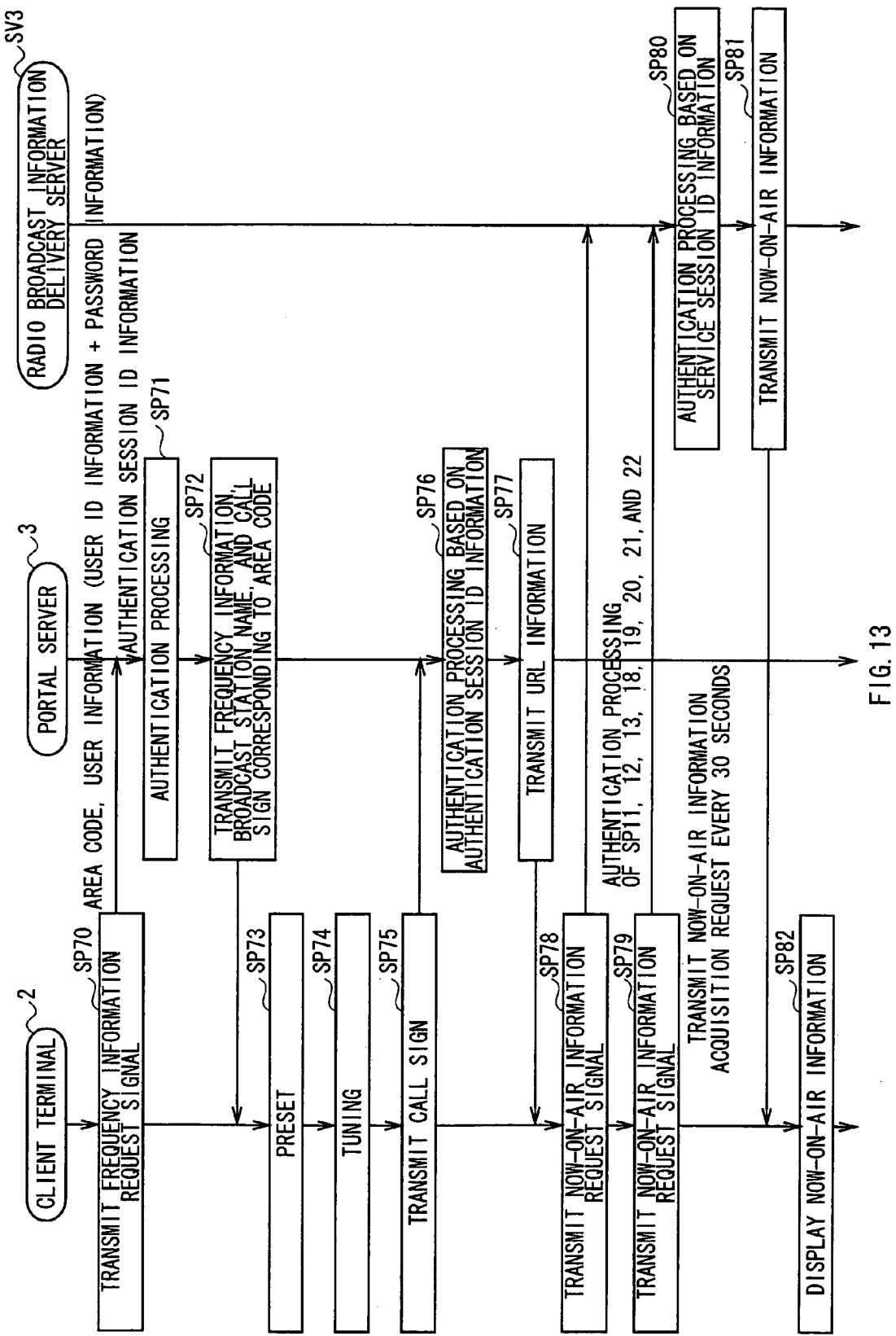
FIG. 13 is a sequence chart showing a radio broadcast information (now-on-air information) distribution service provision process (2).

With reference to FIG. 13, the radio broadcast information distribution service provision process will be described. In the radio broadcast information distribution service provision process, the client terminal 2 receives the radio broadcast information distribution service, especially the now-on-air information distribution service from the radio broadcast information delivery server SV3.

There is a plurality of radio broadcast information delivery servers SV3 providing now-on-air information, each of which corresponds to a different radio station (call sign).

At initial state, the client terminal 2 may not store URL information of these radio broadcast information delivery servers SV3 corresponding to each radio station.

With the radio broadcast information distribution service provision process described below, the situation in which the portal server 3 manages URL information of each radio broadcast information delivery server SV3 will be described. Specifically, in this case, the portal server 3 manages a plurality of pieces of URL information, each of which corresponds to a call sign of a radio station.

In addition, with the radio broadcast information distribution service provision process described below, the client terminal 2 does not have authentication session ID information and the like temporarily stored in the authentication information storage section 38, when requesting frequency information from the portal server 3 to automatically preset broadcast frequencies of radio stations. The frequency information includes the broadcast frequencies. In this case, first of all the client terminal 2 transmits user ID information, password information, and the like to the portal server 3.

At step SP70, if operation commands which request auto-preset of broadcast frequencies of radio stations are input from the input processing section 21, the control section 23 of the client terminal 2 transmits a frequency information request signal, an area code input by a user, the user ID information and password information stored in the authentication information storage section 38, and the like to the portal server 3 via the communication control section 32 and the network interface 33 in order. The frequency information request signal requests frequency information about broadcast frequencies of radio stations from which the client terminal 2 can receive their broadcasts.

At step SP71, the control section 50 of the portal server 3 receives the frequency information request signal, the area code, the user ID information, the password information and the like transmitted from the client terminal 2 via the network interface 53 and the communication control section 52 in order, and supplies the user ID information and password information received from the client terminal 2 to the authentication processing section 56.

The authentication processing section 56 under the control of the control section 50 performs user authentication processes. In the user authentication process, the authentication processing section 56 compares the user ID information, password information and the like received from the client terminal 2 with the customer information registered with the customer database section 54.

As a result, if the authentication processing section 56 authenticates that a user of the client terminal 2 is legitimate, the authentication processing section 56 determines that the request for frequency information received from the client terminal 2 is legitimate. Therefore, the authentication processing section 56 under the control of the control section 50 issues authentication session ID information and the like. The authentication session ID information identifies the communication connection being currently maintained between the client terminal 2 and the portal server 3. The authentication processing section 56 then temporarily stores the authentication session ID information and the like in the authentication information storage section 57.

The control section 50 subsequently proceeds to step SP72, as the authentication processing section 56 authenticates that the user is legitimate.

At step SP72, the control section 50 performs retrieving processes based on the area code received from the client terminal 2. In the retrieving process, the control section 50 retrieves a plurality of pieces of frequency information from the frequency information storage section 58. The control section 50 retrieves frequency information corresponding to the area code from lists including radio station names and call signs. The control section 50 also retrieves radio station names and call signs. The control section 50 then reads the retrieved information from the frequency information storage section 58 in list form.

The control section 50 subsequently transmits the listed frequency information, radio station names and call signs read from the frequency information storage section 58 with the authentication session ID information and the like to the client terminal 2 via the communication control section 52 and the network interface 53 in order. The authentication session ID information was issued to the client terminal 2 by the authentication processing section 56 at the above-noted step SP71.

At step SP73, the control section 23 of the client terminal 2 receives lists of the frequency information, radio station names and call signs transmitted from the portal server 3 via the network interface 33 and the communication control section 32 in order. The control section 23 of the client terminal 2 also receives the authentication session ID information and the like transmitted from the portal server 3 via the network interface 33 and the communication control section 32 in order. The control section 23 of the client terminal 2 then supplies the authentication session ID information and the like received from the portal server 3 to the authentication processing section 37. The control section 23 of the client terminal 2 also supplies the lists of the frequency information, radio station names and call signs to the display control section 24.

The authentication processing section 37 under the control of the control section 23 temporarily stores the authentication session ID information and the like received from the portal server 3 in the authentication information storage section 38.

The display control section 24 supplies the lists of the frequency information, radio station names and call signs to the display section 25. The display section 25 therefore displays the lists.

When selection commands are input from the input processing section 21, the control section 23 stores the selected frequency information, radio station names and call signs in the storage medium 29 (i.e. preset), and proceeds to step SP74.

At step SP74, when tuning control commands are input from the input processing section 21, the control section 23 controls the tuner section 31 based on the inputted tuning control commands such that the tuner section 31 extracts radio broadcast signals of a radio broadcast transmitted in a broadcast frequency corresponding to the tuning control commands from radio waves.

The tuner section 31 therefore extracts radio broadcast signals being transmitted in the broadcast frequency from radio waves received by the broadcast signal reception section 30. The tuner section 31 then performs prescribed reception processes such as decoding to generate audio data, and supplies the audio data to audio control section 26.

The audio control section 26 therefore converts the audio data supplied from the tuner section 31 to analog audio signals, and supplies the analog audio signals to the speaker 27. As a result, the speaker 27 outputs audio of the selected radio program.

At step SP75, the radio broadcasting display control section 39 under the control of the control section 23 reads a call sign from the storage medium 29. In this case, the call sign stored in the storage medium 29 has been associated with the frequency information showing the broadcast frequency corresponding to the above-noted tuning control commands. The radio broadcasting display control section 39 then transmits the call sign, the authentication session ID information temporarily stored in the authentication information storage section 38, and the like to the portal server 3 via the communication control section 32 and the network interface 33 in order.

At step SP76, the control section 50 of the portal server 3 receives the call sign, the authentication session ID information and the like transmitted from the client terminal 2 via the network interface 53 and the communication control section 52 in order, and supplies the authentication session ID information and the like to the authentication processing section 56.

The authentication processing section 56 under the control of the control section 50 performs user authentication processes. In the user authentication process, the authentication processing section 56 compares the authentication session ID information and the like received from the client terminal 2 with the ones temporarily stored in the authentication information storage section 57.

As a result, if the authentication processing section 56 authenticates that a user who transmits the call sign using the client terminal 2 is legitimate, the control section 50 proceeds to step SP77. In this case, the authentication processing section 56 authenticates that the user is legitimate, since the authentication session ID information and the like received from the client terminal 2 have not expired yet.

At step SP77, the control section 50 performs retrieving processes based on the call sign received from the client terminal 2. In the retrieving process, the control section 50 retrieves a piece of URL information corresponding to the call sign from among a plurality of pieces of ULR information stored in the URL storage section 59.

The control section 50 also extends the period of validity of the authentication session ID information and the like issued to the client terminal 2 using the authentication processing section 56.

The control section 50 then reads the retrieved URL information from the URL storage section 59, and transmits the URL information, the authentication session ID information having its period of validity extended by the authentication processing section 56, and the like to the client terminal 2 via the communication processing section 52 and the network interface 53 in order.

At step SP78, the control section 23 of the client terminal 2 receives the URL information, the authentication session ID information having its period of validity extended, and the like transmitted from the portal server 3 via the network interface 33 and the communication control section 32 in order, and supplies the authentication-session ID information and the like to the authentication processing section 37. The control section 23 of the client terminal 2 also supplies the URL information to the radio broadcasting display control section 39.

The authentication processing section 37 under the control of the control section 23 temporarily stores the authentication session ID information and the like in the authentication information storage section 38. The authentication session ID information and the like which have their period of validity extended were received from the portal server 3. In this case, the authentication session ID information and the like overwrite the ones previously and temporarily stored in the authentication information storage section 38. The information previously and temporarily stored in the authentication information storage section 38 does not have the period of validity extended. In this manner, the authentication session ID information and the like temporarily stored are updated to the ones having their period of validity extended.

The radio broadcasting display control section 39 under the control of the control section 23 associates the URL information supplied from the control section 23 with the call sign stored in the storage medium 29, and temporarily stores them in the storage medium 29 or the like.

Then, the radio broadcasting display control section 39 under the control of the control section 23 transmits a now-on-air information request signal which requests now-on-air information, the service session ID information temporarily stored in the authentication information storage section 38, and the like to the radio broadcast information delivery server SV3 via the communication control section 32 and the network interface 33 in order. In this case, the radio broadcasting display control section 39 transmits the now-on-air information request signal using the URL information temporarily being stored in the storage medium 29 or the like. The service session ID information stored in the authentication information storage section 38 was received from the radio broadcast information delivery server SV3.

In the radio broadcast information distribution service provision process, the process of step SP78 corresponds to the process of step SP10 illustrated in FIG. 9. In the process of step SP78, now-on-air information request signals, service session ID information and the like are transmitted from the client terminal 2 to the radio broadcast information delivery server SV3.

Accordingly, in the radio broadcast information distribution service provision process, the client terminal 2, the radio broadcast information delivery server SV3 and the portal server 3 performs the same user authentication processes as those of step SP11 through SP13 and step SP18 through SP22 following the process of step SP78, and then proceed to step SP79. By the way, the processes of step SP11 through SP13 and step SP18 through SP22 are illustrated in FIG. 9.

At step SP79, the radio broadcasting display control section 39 of the client terminal 2 under the control of the control section 23 re-transmits a now-on-air information request signal, the service session ID information temporarily stored in the authentication information storage section 38, and the like to the radio broadcast information delivery server SV3 via the communication control section 32 and the network interface 33 in order. The radio broadcasting display control section 39 transmits the now-on-air information request signal using the URL information temporarily being stored in the storage medium 29 or the like. The service session ID information stored in the authentication information storage section 38 was received from the radio broadcast information delivery server SV3.

At step SP80, the control section 110 of the radio broadcast information delivery server SV3 receives the now-on-air information request signal, the service session ID information and the like transmitted from the client terminal 2 via the network interface 113 and the communication control section 112 in order, and supplies the received authentication session ID information and the like to the authentication processing section 115.

The authentication processing section 115 under the control of the control section 110 performs user authentication processes. In the user authentication process, the authentication processing section 115 compares the service session ID information and the like received from the client terminal 2 with the ones temporarily stored in the authentication information storage section 120.

As a result, if the authentication processing section 115 authenticates that a user of the client terminal 2 is legitimate, the authentication processing section 115 determines that the request for now-on-air information received from the client terminal 2 is legitimate.

After the authentication processing section 115 authenticates that a user of the client terminal 2 is legitimate, the control section 110 extends the period of validity of the service session ID information and the like issued to the client terminal 2 using the authentication processing section 115, and proceeds to step SP81.

At step SP81, the control section 110 reads now-on-air information from the now-on-air information storage section 119, and transmits the now-on-air information, the service session ID information having its period of validity extended by the authentication processing section 115, and the like to the client terminal 2 via the communication control section 112 and the network interface 113 in order.

At step SP82, the control section 23 of the client terminal 2 receives the now-on-air information, the service session ID information having its period of validity extended and the like transmitted from the radio broadcast information delivery server SV3 via the network interface 33 and the communication control section 32 in order, and supplies the service session ID information and the like to the authentication processing section 37. The control section 23 of the client terminal 2 also supplies the now-on-air information to the radio broadcasting display control section 39.

The authentication processing section 37 under the control of the control section 23 temporarily stores the service session ID information and the like in the authentication information storage section 38. The service session ID information and the like which have their period of validity extended were received from the radio broadcast information delivery server SV3. In this case, the service session ID information and the like overwrite the ones previously and temporarily stored in the authentication information storage section 38. The information previously and temporarily stored in the authentication information storage section 38 does not have the period of validity extended. In this manner, the service session ID information and the like temporarily stored are updated to the ones having their period of validity extended.

The radio broadcasting display control section 39 supplies the now-on-air information supplied from the control section 23 to the display section 25 via the display control section 24. The display section 25 therefore displays the now-on-air information relating to radio programs currently being received.

After that, in the radio broadcast information distribution service provision process, the client terminal 2 repeats the request of now-on-air information (step SP79) at a certain interval of time. When receiving the request from the client terminal 2, the radio broadcast information delivery server SV3 sequentially performs the processes of step SP80 and SP81.

In this manner, the client terminal 2 can update now-on-air information being displayed on the display section 25 every second. The now-on-air information includes the following: a title of a radio program currently being received by the client terminal 2; a start time of the radio program; an end time of the radio program; an artist name and title of music currently being played in the radio program; and a start time of the broadcast of the music.

(1-8) Configuration of Hardware Circuit Blocks of Client Terminal 2

(1-8-1) Circuit Configuration

The configuration of hardware circuit block of the client terminal 2 will be described. According to the configuration of hardware circuit of the client terminal 2, a part of functions of the client terminal 2 is performed by software modules as further described below.

Figure 14:
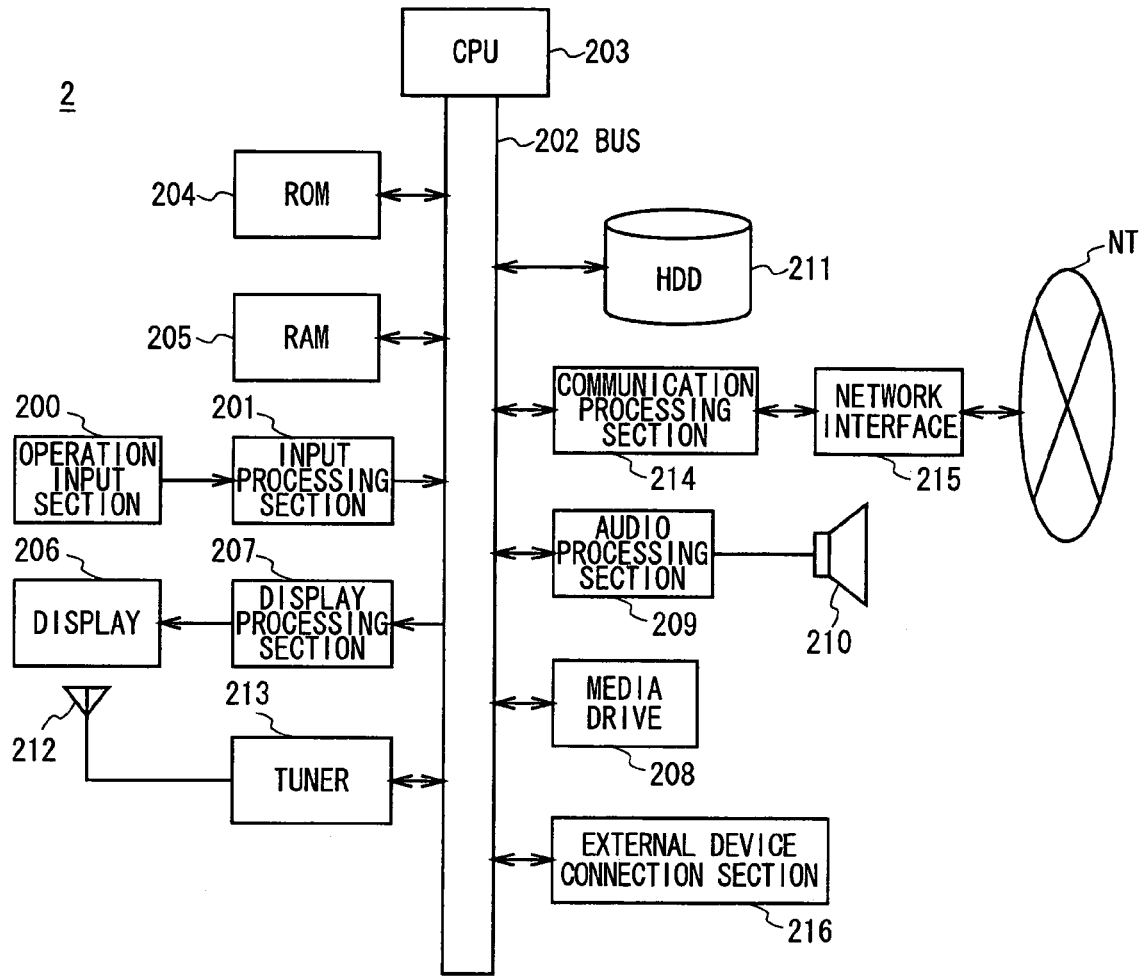
FIG. 14 is a block diagram showing the hardware configuration of a client terminal using the hardware circuit blocks.

Referring to FIG. 14, the client terminal 2 has an operation input section 200 on its body surface or a remote control (not shown). The operation input section 200 provides various operation buttons. When users operate the operation input section 200, the operation input section 200 detects the operation and supplies an operation input signal corresponding to the operation to an input processing section 201.

The input processing section 201 performs a prescribed process for the supplied operation input signal to convert the signal to an operation command. The input processing section 201 then supplies the command via a bus 202 to a Central Processing Unit (CPU) 203.

A Read Only Memory (ROM) 204 pre-stores various programs, such as basic programs and application programs. The CPU 203 reads these programs from the ROM 204 via the bus 202, and loads them into a Random Access Memory (RAM) 205. The CPU 203 takes overall control of the client terminal 2 based on the programs, and performs prescribed arithmetic processes and various processes corresponding to the operation commands supplied from the input processing section 201.

For example, a display 206 is a display device such as a liquid crystal display. The display 206 may be directly or externally disposed on the body surface.

Processing results generated by the CPU 203 and various video data are supplied to the display 206 via a display processing section 207 as analog video signals. The display 206 displays images based on the analog video signals.

For example, CDs and MEMORY STICK (Registered Trademark of Sony Corporation) store content data. The MEMORY STICK consists of flash memories covered with exterior cases. A media drive 208, for example, reads content data from the CDs and the MEMORY STICK, and then reproduces them. Alternatively, the media drive 208 records record-target content data on the CDs or the MEMORY STICK.

If the media drive 208 reads video data (content data) from CDs or MEMORY STICK, the media drive 208 then supplies the video data to the display processing section 207 via the bus 202.

If the media drive 208 reads audio data (content data) from CDs or MEMORY STICK, the media drive 208 then supplies the audio data to an audio processing section 209.

The display processing section 207 performs digital-to-analog conversion for the video data supplied via the bus 202 to generate analog video signals. The display processing section 207 then supplies the analog video signals to the display 206. The display 206 displays images based on the analog video signals.

The audio processing section 209 performs digital-to-analog conversion for the audio data supplied via the bus 202 to generate analog audio signals. The audio processing section 209 then supplies the analog audio signals to a 2-channel speaker 210. The speaker 210 outputs sound on stereo based on the analog audio signals.

In addition, the CPU 203 is able to supply content data read by the media drive 208 via the bus 202 to a hard disk drive 211. The hard disk drive 211 stores the content data as content files.

The CPU 203 manages the content data stored in the hard disk drive 211 using the directory configuration illustrated by FIG. 3.

Also, the CPU 203 is capable of reading the content files stored in the hard disk drive 211 from the hard disk drive 211 as content data.

If the CPU 203 reads video data (content data) from the hard disk drive 211, the CPU 203 then supplies the video data to the display processing section 207 via the bus 202.

If the CPU 203 reads audio data (content data) from the hard disk drive 211, the CPU 203 then supplies the audio data to the audio processing section 209.

An antenna 212 receives radio broadcast waves broadcast from each radio station. The antenna 212 then supplies the radio broadcast waves to a tuner 213 such as AM/FM tuner.

For example, a user selects a certain radio station using the operation input section 200. The tuner 213 under the control of the CPU 203 extracts radio broadcast signals of the broadcast frequency that corresponds to the selected radio station from the radio broadcast waves received by the antenna 212. The tuner 213 then performs prescribed reception processes for the radio broadcast signals to generate audio data, and supplies the audio data via the bus 202 to the audio processing section 209.

The audio processing section 209 converts the audio data supplied from the tuner 213 to analog audio signals, then supplies the analog audio signals to the speaker 210. The speaker 210 therefore outputs sound of a radio program broadcast from a radio station. This allows users to listen to sound of the radio program.

The CPU 203 also may supply the audio data obtained by the tuner 213 to the hard disk drive 211 to record them on the hard disk drive 211. In this manner, the CPU 203 is able to record sound of radio programs.

The CPU 203 connects with a network NT via a communication processing section 214 and a network interface 215 in order. The CPU 203 therefore can accesses the portal server 3 and other servers SV1 through SV4 on the network NT, and interchanges various data with the portal server 3 and other servers SV1 through SV4.

In the present embodiment, the client terminal 2 has an external device connection section 216. The client terminal 2 connects via the external device connection section 216 to external devices such as a portable music player. Therefore the client terminal 2 can output various kinds of data to the connected external devices.

(1-8-2) Configuration of Program Modules

Figure 15:
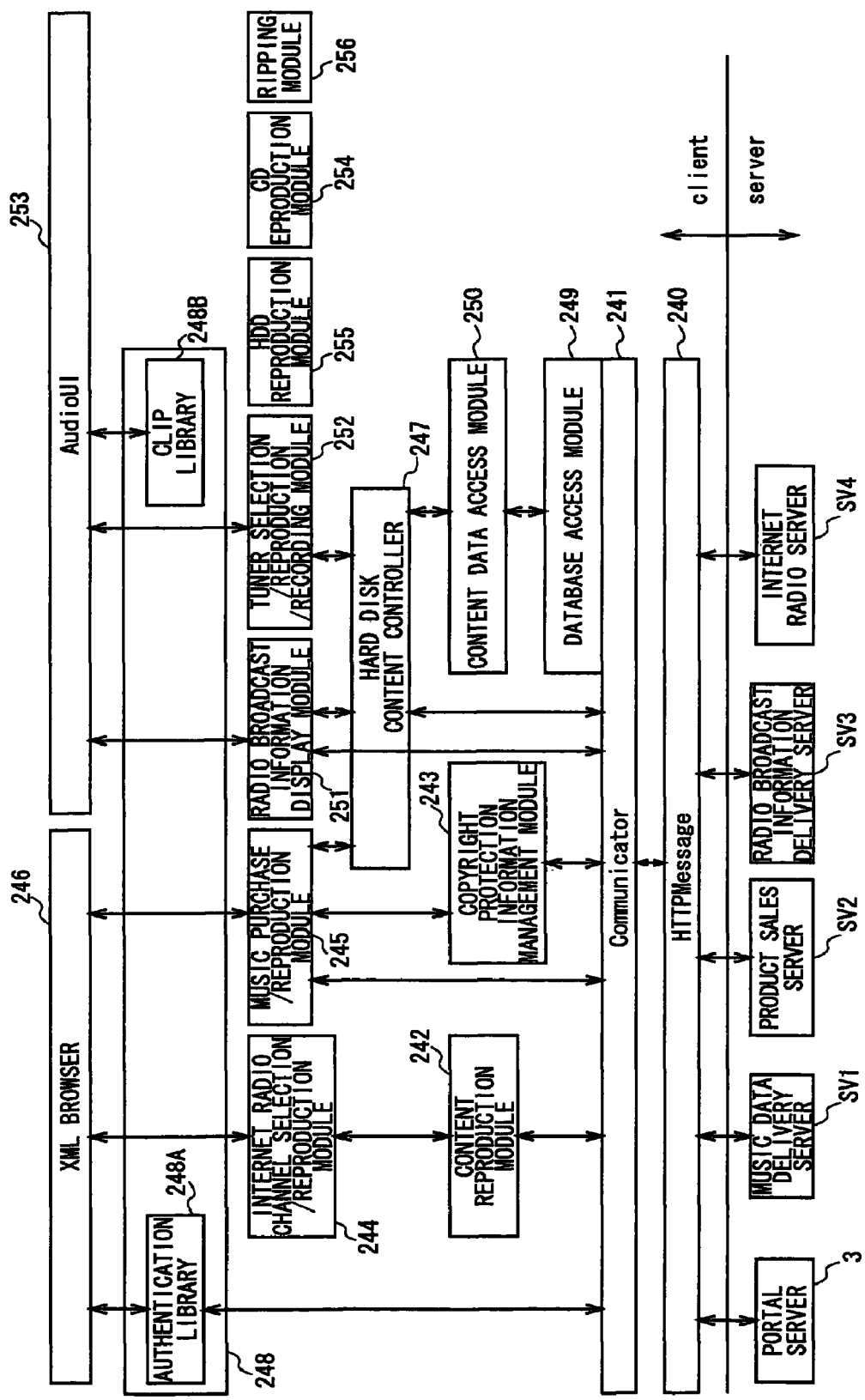
FIG. 15 is a schematic diagram showing program modules of the client terminal.

Program modules are applied to the client terminal 2 that has the hardware configuration described by the hardware circuit blocks shown in FIG. 14. As shown in FIG. 15, the program modules operate on OS, and interchanges with the portal server 3 and other servers SV1 through SV4.

A Hyper Text Transfer Protocol (HTTP) message program 240 interchanges with the portal server 3 and other servers SV1 through SV4 in HTTP communication. A communicator program 241 interchanges data with the HTTP message program 240.

A content reproduction module 242 and a copyright protection information management module 243 are disposed above the communicator program 241. The content reproduction module 242 interprets the codec of contents, and reproduces them. The copyright protection information management module 243 deals with information relating to copyright protection. An Internet radio channel selection/reproduction module 244 and a music purchase/reproduction module 245 are disposed on the content reproduction module 242 and the copyright protection information management module 243 respectively. The Internet radio channel selection/reproduction module 244 selects channels of Internet radio and plays the selected channels. The music purchase/reproduction module 245 controls the purchase of music and the reproduction of demo music.

The Internet radio channel selection/reproduction module 244 and the music purchase/reproduction module 245 perform reproduction process to generate audio data. The audio data is transferred to the audio processing section 209 to output audio from the speaker 210.

A XML browser 246 is disposed above the Internet radio channel selection/reproduction module 244 and the music purchase/reproduction module 245. The XML browser 246 interprets XML files received from various servers, and then displays images on the display 206.

For example, a user selects a piece of music using the XML browser 246. The music purchase/reproduction module 245 therefore performs purchasing processes for purchasing the piece of music. The purchased piece of music is supplied via a hard disk content controller 247 to the hard disk drive 211 to stores it on the hard disk drive 211.

The communicator program 241 connects with an authentication library 248A of a library 248. The authentication library 248A performs various kinds of authentication processes in association with the portal server 3 and the like.

A database access module 249, a content data access module 250, and the hard disk content controller 247 are disposed above the communicator program 241.

The database access module 249 accesses various kinds of databases disposed in the hard disk drive 211. The content data access module 250 accesses content data stored in the hard disk drive 211. The hard disk content controller 247 manages content data stored in the hard disk drive 211.

A radio broadcast information display module 251 and a tuner selection/reproduction/recording module 252 are disposed above the hard disk content controller 247. The radio broadcast information display module 251 performs processes for displaying a title and artist name of music broadcast from radio stations. The tuner selection/reproduction/recording module 252 selects radio stations. The tuner selection/reproduction/recording module 252 also records content data (music) received from a radio station on the hard disk drive 211.

For example, a user selects a radio station using an audio user interface 253 to receive music from the radio station. The received music is supplied via the content data access module 250 to the hard disk drive 211 to stores it in the hard disk drive 211.

The tuner selection/reproduction/recording module 252 performs reproduction processes to generate audio data (content data). The audio data is supplied to the audio processing section 209 to output audio from the speaker 210.

The radio broadcast information display module 251 uses the tuner selection/reproduction/recording module 252 to receive radio broadcast information from the radio broadcast information delivery server SV3 via the HTTP message program 240. For example, the received radio broadcast information is now-on-air information about a title and artist name of music being broadcast by a radio station. The radio broadcast information display module 251 then transmits the information via the audio user interface (UI) 253 to the display 206 which displays the information.

The radio broadcast information, transmitted via the audio user interface 253 and displayed on the display 206, may be temporarily stored in a clip library 248B of the library 248. In response to user's instruction, the radio broadcast information is finally transferred via the database access module 249 to the hard disk drive 211 to be recorded on the hard disk drive 211.

A CD reproduction module 254 controls the media drive 208 to play back CDs.

Audio data played back from CDs by the CD reproduction module 254 are transferred to the audio processing section 209 to output audio from the speaker 210.

A HDD reproduction module 255 connects with the hard disk content controller 247 and the copyright protection information management module 243 (the connection is not shown here).

The HDD reproduction module 255 under the control of the hard disk content controller 247 reads audio data (content data) from the hard disk drive 211. The HDD reproduction module 255 then reproduces the audio data based on copyright management information supplied from the copyright protection information management module 243.

Audio data, reproduced by the HDD reproduction module 255 based on the copyright management information, is supplied to the audio processing section 209 to output audio from the speaker 210.

A ripping module 256 connects with the hard disk content controller 247 and the copyright protection information management module 243 (the connection is not shown here).

The ripping module 256 controls the CD reproduction module 254, the copyright protection information management module 243, and the hard disk content controller 247 to store (i.e., rip) audio data played back from CDs by the CD reproduction module 254 and its copyright management information in the hard disk drive 211. Specifically, the copyright management information is supplied from the copyright protection information management module 243 to control the audio data. The storage process of the audio data and copyright management information is also controlled by the hard disk content controller 247.

As for the program modules described above, the HTTP message program 240 and the communicator program 241 can perform the same function as the communication control section 32 of the client terminal 2 (FIG. 2) does.

The content reproduction module 242 can perform the same function as the encoder/decoder section 34 of the client terminal 2 (FIG. 2) does.

The copyright protection information management module 243 can perform the same function as the copyright management section 35 of the client terminal 2 (FIG. 2) does.

The Internet radio channel selection/reproduction module 244 can perform the same function as the control section 23 and audio control section 26 of the client terminal 2 (FIG. 2) do.

The music purchase/reproduction module 245 can perform the same function as the control section 23 and audio control section 26 of the client terminal 2 (FIG. 2) do.

The XML browser 246 can perform the same function as the input processing section 21 and page information generation section 36 of the client terminal 2 (FIG. 2) do.

The hard disk content controller 247, the database access module 249, and the content data access module 250 can perform the same function as the control section 23 of the client terminal 2 (FIG. 2) does.

The authentication library 248A of the library 248 can perform the same function as the authentication processing section 37 and the authentication information storage section 38 of the client terminal 2 (FIG. 2) do.

The clip library 248B of the library 248 can perform the same function as the control section 23 of the client terminal 2 (FIG. 2) does.

The radio broadcast information display module 251 can perform the same function as the radio broadcasting display control section 39 of the client terminal 2 (FIG. 2) does.

The tuner selection/reproduction/recording module 252 can perform the same function as the control section 23, audio control section 26 and tuner section 31 of the client terminal 2 (FIG. 2) do.

The audio user interface 253 can perform the same function as the input processing section 21, control section 23 and display control section 24 of the client terminal 2 (FIG. 2) do.

The CD reproduction module 254 can perform the same function as the audio control section 26 and external recording media recording and reproducing section 28 of the client terminal 2 (FIG. 2) do.

The HDD reproduction module 255 can perform the same function as the control section 23 and audio control section 26 of the client terminal 2 (FIG. 2) do.

The Ripping module 256 can perform the same function as the control section 23, external recording media recording and reproducing section 28 and encoder/decoder section 34 of the client terminal 2 (FIG. 2) do.

Accordingly, the client terminal 2 illustrated by FIG. 14 (which has the hardware configuration of hardware circuit blocks) can perform the same processes as the client terminal 2 illustrated by FIG. 2 (which has the hardware configuration of functional circuit blocks) does, as the CPU 203 performs processes based on the above-noted-program modules.

(1-9) Configuration of Each Server

The portal server 3, the music data delivery server SV1, the product sales server SV2, and the radio broadcast information delivery server SV3 consist of hardware circuit blocks. The hardware configuration of these servers 3, SV1, SV2, and SV3 will be described.

In this case, the portal server 3, the music data delivery server SV1, the product sales server SV2, and the radio broadcast information delivery server SV3 consist of hardware circuit blocks. Therefore, these servers 3, SV1, SV2, and SV3 use software to provide various kinds of functions. Accordingly, in this case, each server 3, SV1, SV2, and SV3 has the same hardware configuration.

Figure 16:
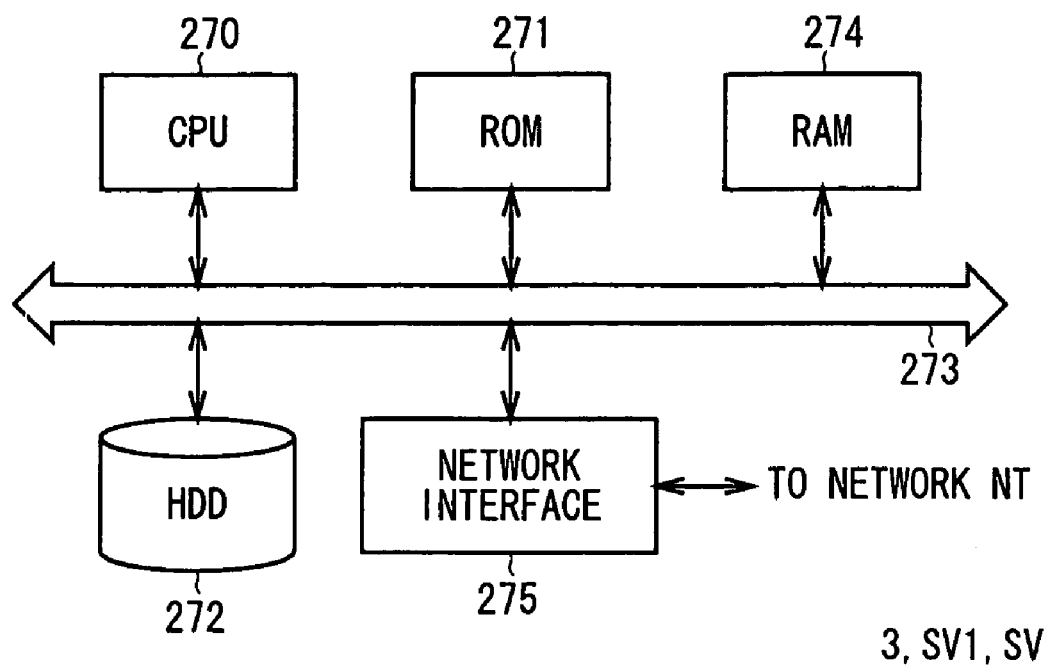
FIG. 16 is a block diagram showing the hardware configuration of servers using hardware circuit blocks.

Referring to FIG. 16, the basic hardware configuration of a server consisting of hardware circuit blocks will be described. This server configuration can be applied to any one of the portal server 3, the music data delivery server SV1, the product sales server SV2, and the radio broadcast information delivery server SV3.

The server has a CPU 270. The CPU 270 takes overall control of the server. A ROM 271 or a hard disk drive 272 stores various kinds of programs such as basic programs and application programs. The CPU 270 loads these programs into a RAM 274 via a bus 273 and performs various kinds of processes based on the programs.

The hard disk drive 272 temporarily or permanently stores various kinds of data and information including page information which is to be published. The hard disk drive 272 may have a database on its hard disk to store various kinds of registration information such as customer information.

The CPU 270 reads from the hard disk drive 272 various kinds of data, information and registration information to perform various kinds of processes using them.

A network interface 275 connects with the client terminal 2 and various kinds of servers via the network NT to interchange various kinds of data and information.

In the server, the CPU 270 essentially performs various kinds of processes using various kinds of programs stored in the ROM 271 or the hard disk drive 272.

Therefore, this server's CPU 270 can perform the same functions as the control section 50, communication control section 52, and authentication processing section 56 of the portal server 3 illustrated by FIG. 4, if the programs stored in the ROM 271 or the hard disk drive 272 are selected properly in dependence upon the functions provided by the portal server 3 (FIG. 4). And this server's hard disk drive 272 can work as the customer database section 54, page information storage section 55, authentication information storage section 57, frequency information storage section 58, and URL storage section 59 of the portal server 3 (FIG. 4). By the way, the portal server 3 illustrated by FIG. 4 consists of functional circuit blocks.

This server's CPU 270 also can perform the same functions as the control section 70, communication control section 72, authentication processing section 75, and retrieval section 79 of the music data delivery server SV1 illustrated by FIG. 5, if the programs stored in the ROM 271 or the hard disk drive 272 are selected properly in dependence upon the functions provided by the music data delivery server SV1 (FIG. 5). And this server's hard disk drive 272 can work as the customer database section 74, page information storage section 76, authentication information storage section 77, and music data storage section 78 of the music data delivery, server SV1 (FIG. 5). By the way, the music data delivery server SV1 illustrated by FIG. 5 consists of functional circuit blocks.

This server's CPU 270 also can perform the same functions as the control section 90, communication control section 92, authentication processing section 95, and retrieval section 99 of the product sales server SV2 illustrated by FIG. 6, if the programs stored in the ROM 271 or the hard disk drive 272 are selected properly in dependence upon the functions provided by the product sales server SV2 (FIG. 6). And this server's hard disk drive 272 can work as the customer database section 94, page information storage section 96, authentication information storage section 97, and package media information storage section 98 of the product sales server SV2 (FIG. 6).

By the way, the product sales server SV2 illustrated by FIG. 6 consists of functional circuit blocks.

This server's CPU 270 also can perform the same functions as the control section 110, communication control section 112, authentication processing section 115, and retrieval section 118 of the radio broadcast information delivery server SV3 illustrated by FIG. 7, if the programs stored in the ROM 271 or the hard disk drive 272 are selected properly in dependence upon the functions provided by the radio broadcast information delivery server SV3 (FIG. 7). And this server's hard disk drive 272 can work as the customer database section 114, page information storage section 116, on-air-list information storage section 117, now-on-air information storage section 119 and authentication information storage section 120 of the radio broadcast information delivery server SV3 (FIG. 7). By the way, the radio broadcast information delivery server SV3 illustrated by FIG. 7 consists of functional circuit blocks.

In this manner, if the programs stored in the ROM 271 or the hard disk drive 272 are selected properly, the server consisting of hardware circuit blocks can provide the same functions as the portal server 3, music data delivery server SV1, product sales server SV2, and radio broadcast information delivery server SV3 consisting of functional circuit blocks as illustrated by FIG. 4 through FIG. 7.

In the above-noted embodiments, the client terminal 2 receives radio broadcasts from radio stations. However, the present invention is not limited to this. For example, the client terminal 2 can receive television broadcasts from television stations, and acquire various kinds of broadcast information relating to television programs from servers on the network NT.

In the above-noted embodiments, the client terminal 2 is equipped with the hardware circuit blocks, the functional circuit blocks, and the program modules. However, the present invention is not limited to this. For example, other terminals such as mobile phones and personal computers also can be equipped with the hardware circuit blocks, the functional circuit blocks, and the program modules. The terminals consisting of the hardware circuit blocks, the functional circuit blocks, and the program modules can perform the same processes as the above-mentioned client terminal 2.

(2) Output-Prohibited Music Data Service (2-1) Contents of the Service

Music data downloaded from the music data delivery server SV1 (FIG. 1) to the client terminal 2 (FIG. 14) is associated with attribute information.

This attribute information shows each one of the following: that this music data is prohibited from being output from the client terminal 2 to external devices; that this music data is allowed to be output from the client terminal 2 to external devices as if it is lent out (i.e., "Checkout"); or that this music data is allowed to be output from the client terminal 2 to external devices and at the same time this music data is deleted from the hard disk drive 211 (i.e., "Move").

The music data with the attribute information directing the client terminal 2 to not output this music data will also be referred to as "output-prohibited music data". The music data with the attribute information allowing the client terminal 2 to checkout this music data will also be referred to as "checkout-able music data". The music data with the attribute information allowing the client terminal 2 to move this music data will also be referred to as "move-able music data". The music data with the attribute information allowing the client terminal 2 to checkout and move this music data will also be referred to as "checkout-able/move-able music data".

In the present embodiment, the music data delivery server SV1 has a number of output-prohibited music data to be downloaded to the client terminal 2. If a user of the client terminal 2 regularly pays a predetermined fixed charge to a company operating the music data delivery server SV1, he/she can use a service in which he/she can freely download and reproduce the output-prohibited music data. This service will also be referred to as "Output-prohibited music data service".

To use the output-prohibited music data service, a user of the client terminal 2 inputs registration information using the operation input section 200. At this time, the client terminal 2 transmits the registration information to the music data delivery server SV1.

In the present embodiment, the registration information includes the following: the user's user name; terminal identification information identifying the client terminal 2; a credit card number which is utilized for collecting the fixed charge from the user; and the like.

The music data delivery server SV1 registers the registration information received from the client terminal 2 with an internal database. The music data delivery server SV1 regularly performs fee-charging process based on the registration information registered with the database. This fee-charging process collects the predetermined fixed charges from users in association with the fee-charging server SV5.

In this manner, a user of the client terminal 2 is registered with the music data delivery server SV1 as a user who can use the output-prohibited music data service.

After the registration is done, the music data delivery server SV1 transmits to the client terminal 2 service usage permission information. The service usage permission information informs that a user of the client terminal 2 can use the output-prohibited-music data service.

When receiving the service usage permission information, the client terminal 2 goes into a service available mode. The client terminal 2 in the service available mode downloads output-prohibited music data from the music data delivery server SV1 in response to user's download operation. The client terminal 2 in the service-available mode also reproduces the output-prohibited music data in response to user's reproduction operation.

Before receiving the service usage permission information from the music data delivery server SV1, the client terminal 2 had been in a service unavailable mode. In the service unavailable mode, the client terminal 2 does not download any output-prohibited music data from the music data delivery server SV1 even if a user performs the download operation. Even if the client terminal 2 in the service unavailable mode already has in the hard disk drive 211 output-prohibited music data which was downloaded by the previous download operation, the client terminal 2 does not reproduce the output-prohibited music data.

Each time the client terminal 2 is powered on, the client terminal 2 perform a registration inquiry process to inquire from the music data delivery server SV1 whether or not a user of the client terminal 2 has been registered as a user who can use the output-prohibited music data service. In response to that, the music data delivery server SV1 checks whether or not the user has been registered as a user who can use the output-prohibited music data service, and then notifies the client terminal 2 of the check result.

If the client terminal 2 recognizes that the user has not been registered as a user who can use the output-prohibited music data service based on the notification from the music data delivery server SV1, the client terminal 2 goes into the service unavailable mode. By contrast, if the client terminal 2 recognizes that the user has been registered as a user who can use the output-prohibited music data service based on the notification from the music data delivery server SV1, the client terminal 2 goes into the service available mode.

In this manner, a user who has been registered on the output-prohibited music data service and regularly paying the predetermined fixed charges can freely download output-prohibited music data from the music data delivery server SV1 by using his/her own client terminal 2, and can reproduce the output-prohibited music data. By contrast, a user who has not been registered on the output-prohibited music data service and not paying the fixed charges cannot download output-prohibited music data from the music data delivery server SV1 by using his/her own client terminal 2, and even if its hard disk drive 211 already stores output-prohibited music data which was downloaded before, he/she cannot reproduce them.

As a result, only a user who has been paying the predetermined fixed charges can freely download various kinds of music data (output-prohibited music data) from the music data delivery server SV1, and can reproduce them for a trial listen.

By the way, when a user operates the operation input section 200 of the client terminal 2 to output output-prohibited music data to external devices, the client terminal 2 checks the attribute information associated with the output-prohibited music data, and recognizes the fact that the outputting of this output-prohibited music data is prohibited. By the way, this user's operation for example is equivalent to checkout operation and move operation. The client terminal 2 therefore does not perform processes of outputting the output-prohibited music data to external devices.

In this manner, the output-prohibited music data, which was downloaded by a user who has been registered on the output-prohibited music data service and paying the predetermined fixed charges, cannot be output to the outside of the client terminal 2.

After that, when the user performs formal purchase operation for the operation input section 200 to formally purchase the output-prohibited music data stored in the hard disk drive 211 of the client terminal 2, the client terminal 2 transmits to the music data delivery server SV1 formal purchase notification information to notify the music data delivery server SV1 of his/her intention to formally purchase the output-prohibited music data.

When receiving the formal purchase notification information from the client terminal 2, the music data delivery server SV1 performs fee-charging process in association with the fee-charging server SV5 to charge the user a predetermined fee for the output-prohibited music data. If the fee-charging process is successfully completed, the music data delivery server SV1 notifies the client terminal 2 of the results.

Based on the notification from the music data delivery server SV1, the client terminal 2 recognizes that the predetermined fee has been collected from the user. The client terminal 2 therefore rewrites the attribute information of the output-prohibited music data to change the output-prohibited data into checkout-able/move-able music data.

In this manner, the formal purchase process in which the user pays the predetermined fee changes the output-prohibited music data which was downloaded from the music data delivery server SV1 into the checkout-able/move-able music data.

For example, when the user performs move operation to move the checkout-able/move-able music data, the client terminal 2 checks the attribute information associated with the checkout-able/move-able music data, and recognizes that the move of the checkout-able/move-able music data is permitted. The client terminal 2 therefore performs move process in which the client terminal 2 outputs the checkout-able/move-able music data to external devices and deletes this data from the hard disk drive 211.

In addition, when the user performs operation (i.e., ripping operation) for the operation input section 200 to acquire music data from a music CD, the client terminal 2 controls the media drive 208 (FIG. 14) to read music data from the music CD, and stores it in the hard disk drive 211.

In the present embodiment, the music data which was read from the music CD and stored in the hard disk drive 211 is associated with the attribute information showing that only checkout is permitted. This means that this music data is "checkout-able music data." For example, when the user performs checkout operation to checkout this checkout-able music data, the client terminal 2 checks the attribute information associated with this music data, and recognizes that the checkout of this music data is permitted. The client terminal 2 therefore performs checkout process in which the client terminal 2 outputs the checkout-able music data to external devices as if it lends it out.

As described above, the music related service provision system 1 includes the client terminal 2 which has a function to reproduce music data, and the music data delivery server SV1 which provides output-prohibited music data to the client terminal 2.

The client terminal 2 inquires of the music data delivery server SV1 about the registration at a certain timing (this is when the client terminal 2 is powered on, in this embodiment). In response to that, the music data delivery server SV1 checks whether or not a user of the client terminal 2 has been registered to pay the fixed charges, and notifies the client terminal 2 of the check result.

If the client terminal 2 recognizes that the user has been registered to pay the fixed charges based on the notification from the music data delivery server SV1, the client terminal 2 allows the output-prohibited music data stored in the hard disk drive 211 to be reproduced. By contrast, if the user has not been registered to pay the fixed charges, the client terminal 2 does not allow the output-prohibited music data to be reproduced.

In this manner, the output-prohibited music data downloaded to the client terminal 2 cannot be output to external devices. In addition, if the user of the client terminal 2 has not been paying the fixed charges, the client terminal 2 does not reproduce this music data. This prevents from hurting the interests of copyright owners or the like.

After acquiring output-prohibited music data from the music data delivery server SV1, the client terminal 2 continues to store it in the hard disk drive 211. And then, when the user performs the formal purchase operation, the client terminal 2 rewrites the attribute information associated with the output-prohibited music data being stored in the hard disk drive 211 to change this output-prohibited music data into checkout-able/move-able music data.

Accordingly, even if the user performs the formal purchase operation, the client terminal 2 does not have to perform acquisition process of acquiring formal music data (checkout-able/move-able music data) from the music data delivery server SV1. As a result, the client terminal 2 can acquire music data more efficiently than the conventional methods.

(2-2) Registration Process

Figure 17:
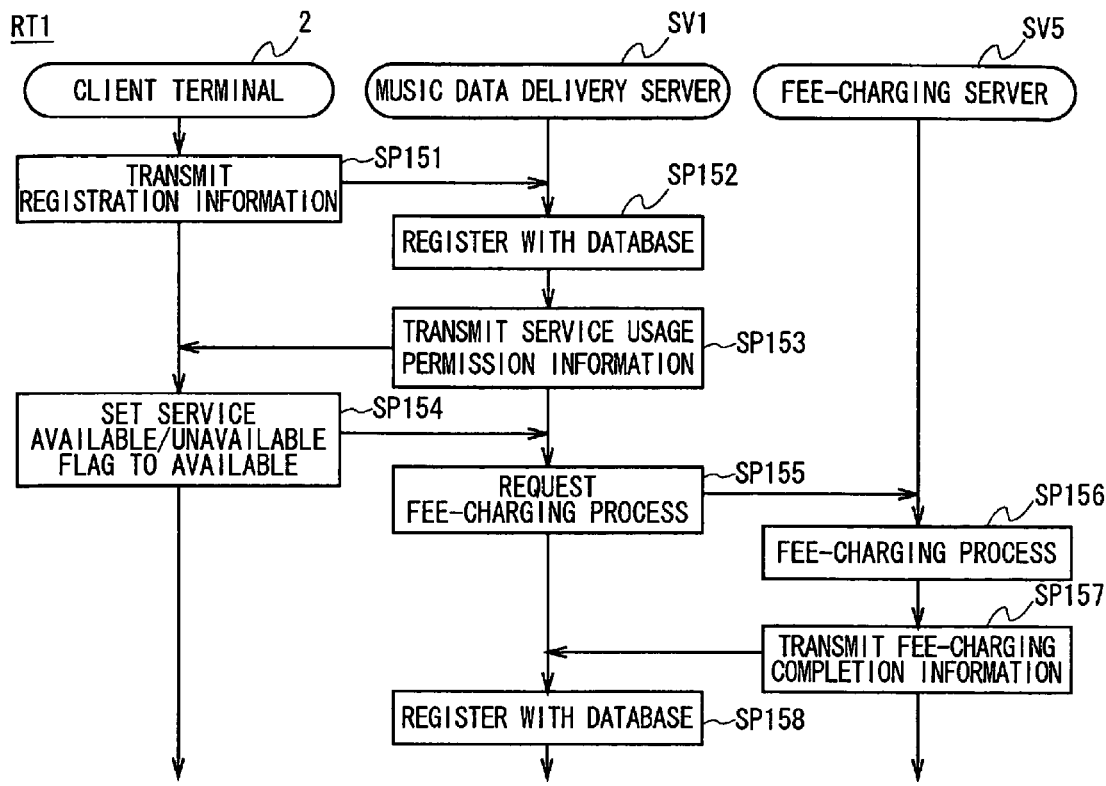
FIG. 17 is a sequence chart showing a registration process.

Referring to a sequence chart shown in FIG. 17, the procedure RT1 of the registration process will be described. This registration process performs the registration of output-prohibited music data service.

When a user who hopes to use the output-prohibited music data service inputs the registration information, the CPU 203 of the client terminal 2 proceeds to step SP151, and then transmits the registration information to the music data delivery server SV1.

When receiving the registration information from the client terminal 2, the CPU 270 of the music data delivery server SV1 proceeds to step SP152, and registers the information with the internal database. In this embodiment, this database is disposed on the hard disk drive 272 of the music data delivery server SV1.

The CPU 270 of the music data delivery server SV1 then proceeds to step SP153, and transmits to the client terminal 2 the service usage permission information which permits the user to use the output-prohibited music data service.

When receiving the service usage permission information from the music data delivery server SV1, the CPU 203 of the client terminal 2 proceeds to step SP154. At step SP154, the CPU 203 of the client terminal 2 sets a service available/unavailable flag to "available", and goes into the service available mode. This service available/unavailable flag shows whether the output-prohibited music data service is available or not. In this embodiment, this flag is provided as software.

When a predetermined day (this is the time when the user of the client terminal 2 should be charged the predetermined fixed charge, and this is for example an end of month) comes, the CPU 270 of the music data delivery server SV1 proceeds to step SP155. And then the CPU 270 of the music data delivery server SV1 reads the user's registration information from the internal database, and transmits it to the fee-charging server SV5. The transmission of the registration information requests the fee-charging server SV5 to perform fee-charging process.

When receiving the registration information from the music data delivery server SV1, the fee-charging server SV5 proceeds to step SP156, and then performs fee-charging process based on the received registration information to charge the user of the client terminal 2 the predetermined fixed charge.

After the fee-charging process is successfully completed, the fee-charging server SV5 proceeds to step SP157 to transmit to the music data delivery server SV1 fee-charging completion information which informs that the predetermined fixed charge was successfully collected from the user.

When receiving the fee-charging completion information from the fee-charging server SV5, the CPU 270 of the music data delivery server SV1 proceeds to step SP158 to register the fee-charging completion information along with the user's registration information in the internal database.

In this manner, the user of the client terminal 2 is registered with the music data delivery server SV1 so that he/she can use the output-prohibited music data service.

(2-3) Registration Inquiry Process

Figure 18:
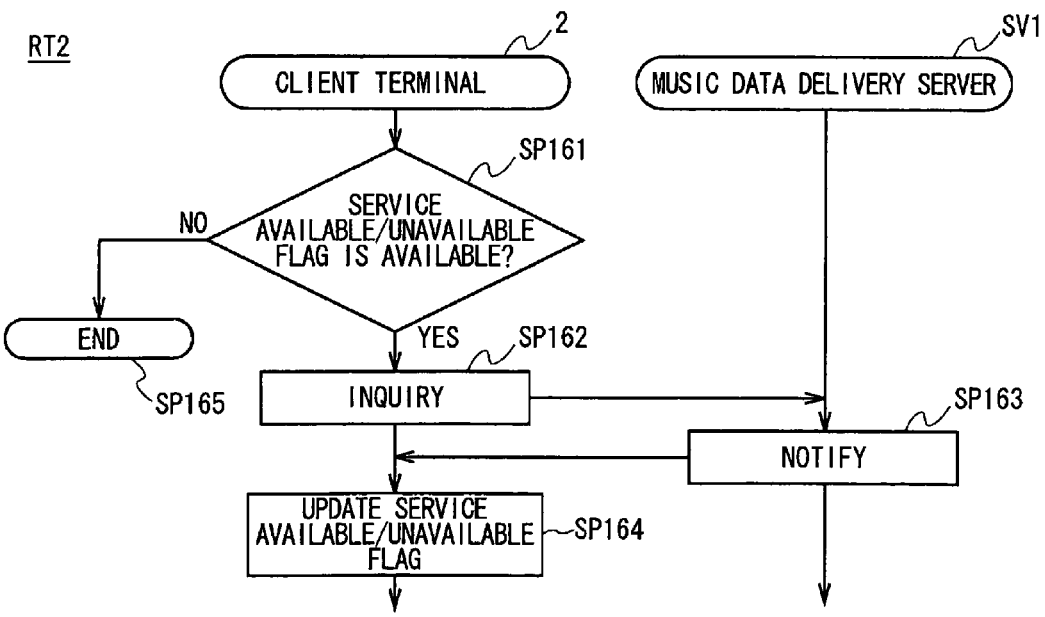
FIG. 18 is a sequence chart showing a registration inquiry process.

Referring to a sequence chart shown in FIG. 18, the procedure RT2 of the registration inquiry process will be described.

When the client terminal 2 which had been powered off is powered on by the user, the CPU 203 of the client terminal 2 proceeds to step SP161. The CPU 203 of the client terminal 2 then checks whether or not the service available/unavailable flag is set to "available".

Affirmative result at step SP161 means that the user was being registered with the music data delivery server SV1 as a user who can use the output-prohibited music data service during the previous period of the client terminal 2 being powered on. In this case, the CPU 203 of the client terminal 2 proceeds to step SP162.

Negative result at step SP161 means that the user was not being registered with the music data delivery server SV1 as a user who can use the output-prohibited music data service during the previous period of the client terminal 2 being powered on. In this case, the CPU 203 of the client terminal 2 proceeds to step SP165 to end the registration inquiry process.

The CPU 203 of the client terminal 2 at step 162 inquires of the music data delivery server SV1 whether or not the user has currently been registered to use the output-prohibited music data service. At this time, the CPU 203 of the client terminal 2 according to the present embodiment transmits terminal identification information identifying the client terminal 2 to the music data delivery server SV1.

When receiving from the client terminal 2 the terminal identification information as the result of the inquiry process, the CPU 270 of the music data delivery server SV1 proceeds to step SP163. The CPU 270 of the music data delivery server SV1 then checks the internal database to confirm whether or not the registration information of the user corresponding to the received terminal identification information is being registered.

As the result of the confirmation, for example, if the CPU 270 of the music data delivery server SV1 recognizes that the user's registration information has currently been registered, it notifies the client terminal 2 that the output-prohibited music data service is available for the user, because it can collect the predetermined fixed charge from the user.

By contrast, for example, if the CPU 270 of the music data delivery server SV1 recognizes that the user's registration information has not been registered, it notifies the client terminal 2 that the output-prohibited music data service is not available for the user, because it cannot collect the predetermined fixed charge from the user.

When receiving the notification from the music data delivery server SV1, the CPU 203 of the client terminal 2 proceeds to step SP 164. And then, if the CPU 203 of the client terminal 2 recognizes that the output-prohibited music data service is available for the user based on the notification, the CPU 203 of the client terminal 2 leaves the service available/unavailable flag as "available". By contrast, if the CPU 203 of the client terminal 2 recognizes that the output-prohibited music data service is not available for the user based on the notification, the CPU 203 of the client terminal 2 switches the contents of the service available/unavailable flag to "unavailable".

(2-4) Output-Prohibited Music Data Download Process

Figure 19:
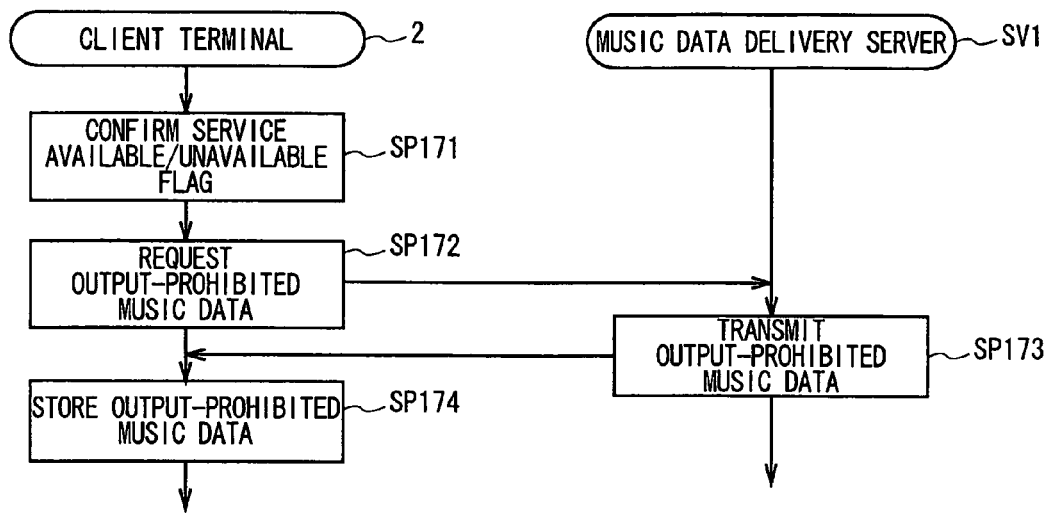
FIG. 19 is a sequence chart showing an output-prohibited music data download process.

Referring to a sequence chart shown in FIG. 19, the procedure RT3 of the output-prohibited music data download process will be described.

When the user performs download operation for the operation input section 200 to download output-prohibited music data from the music data delivery server SV1, the CPU 203 of the client terminal 2 proceeds to step SP171, and confirms whether or not the service available/unavailable flag is set to "available".

As a result, if the CPU 203 of the client terminal 2 recognizes that the service available/unavailable flag is set to "available", it determines that it is in the service available mode. Therefore, the CPU 203 of the client terminal 2 proceeds to step SP172 to request the output-prohibited music data from the music data delivery server SV1.

At this time, the CPU 270 of the music data delivery server SV1 proceeds to step SP173. The CPU 270 of the music data delivery server SV1 then reads from the hard disk drive 272 the output-prohibited music data corresponding to the request, and transmits it to the client terminal 2.

When receiving the output-prohibited music data from the music data delivery server SV1, the CPU 203 of the client terminal 2 proceeds to step SP174 to store it in the hard disk drive 211.

In this manner, the user who can use the output-prohibited music data service can acquire output-prohibited music data from the music data delivery server SV1 by using his/her own client terminal 2.

(2-5) Formal Purchase Process

Figure 20:
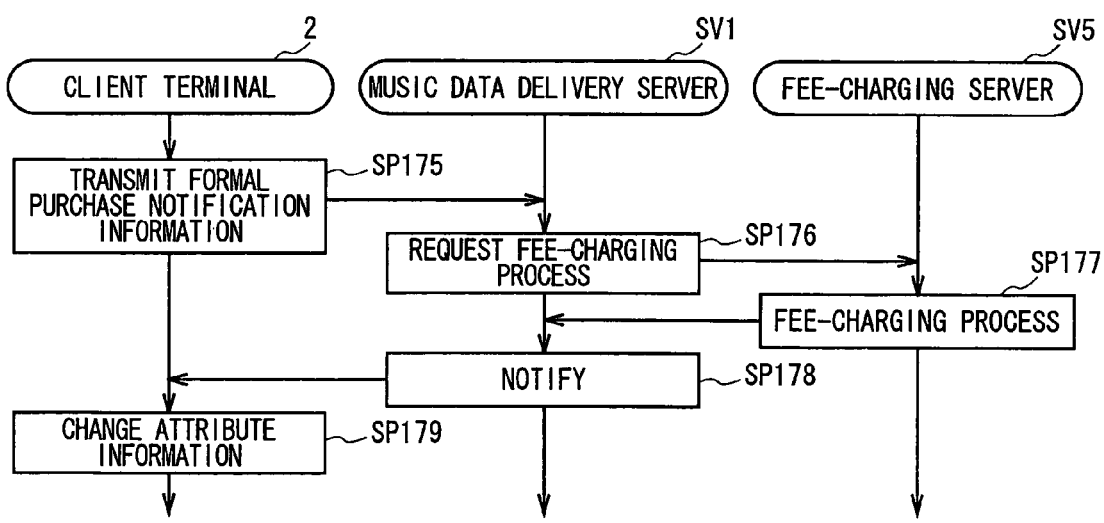
FIG. 20 is a sequence chart showing a formal purchase process.

Referring to a sequence chart shown in FIG. 20, the procedure RT4 of the formal purchase process will be described. The formal purchase process is executed to formally purchase the output-prohibited music data stored in the client terminal 2.

When the user performs formal purchase operation for the operation input section 200 to formally purchase the output-prohibited music data stored in the hard disk drive 211, the CPU 203 of the client terminal 2 proceeds to step SP175 to transmit to the music data delivery server SV1 formal purchase notification information to notify the music data delivery server SV1 of his/her intention to formally purchase the output-prohibited music data.

When receiving the formal purchase notification information from the client terminal 2, the music data delivery server SV1 proceeds to step SP176, and then requests the fee-charging server SV5 to perform fee-charging process based on the received information to collect the predetermined fee for the output-prohibited music data from the user.

At this time, the fee-charging server SV5 proceeds to step SP177, and performs fee-charging process in response to the request form the music data delivery server SV1. After the fee-charging process is successfully completed, the fee-charging server SV5 notifies the music data delivery server SV1 of this result. The CPU 270 of the music data delivery server SV1 then proceeds to step SP178, and recognizes based on the notification from the fee-charging server SV5 that the predetermined fee was collected from the user. The CPU 270 of the music data delivery server SV1 subsequently notifies the client terminal 2 of this result.

When the CPU 203 of the client terminal 2 at step SP179 recognizes based on the notification from the music data delivery server SV1 that the predetermined fee was collected from the user, it rewrites the attribute information associated with the output-prohibited music data. In this manner, the CPU 203 of the client terminal 2 changes the output-prohibited music data into checkout-able/move-able music data.

In this manner, if the user pays the predetermined fee for the formal purchase, the output-prohibited music data downloaded from the music data delivery server SV1 changes into the checkout-able/move-able music data.

(2-6) Reproduction Process

Figure 21:
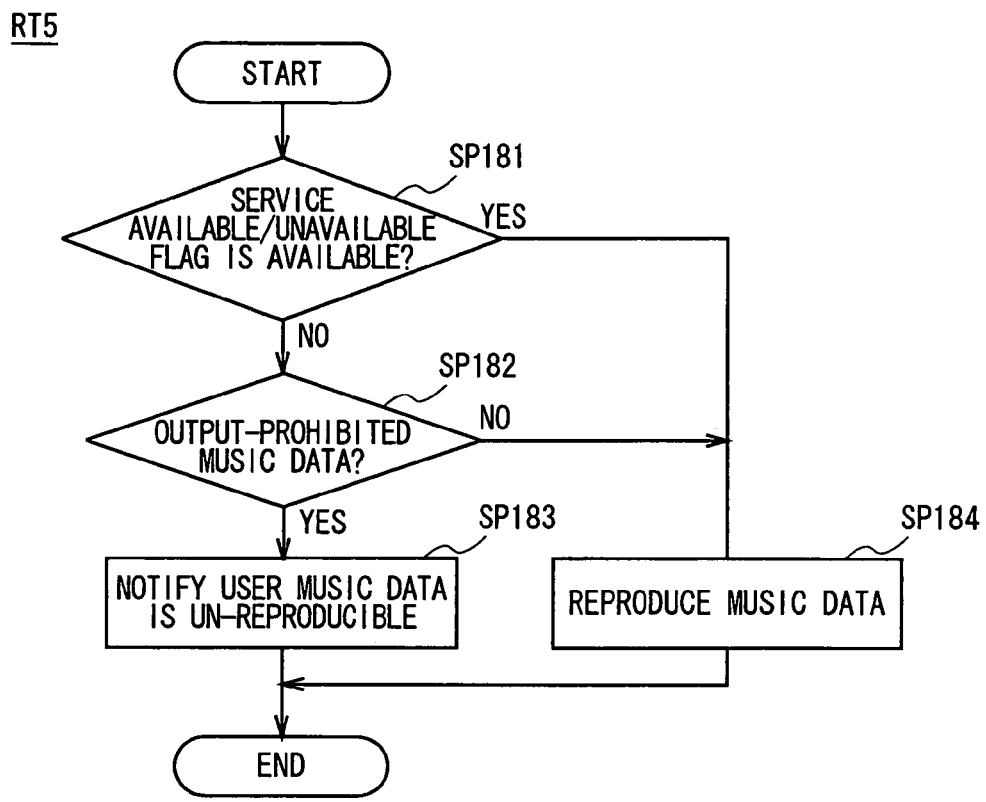
FIG. 21 is a flowchart showing a reproduction process.

Referring to a flowchart shown in FIG. 21, the procedure RT5 of the reproduction process of music data will be described.

The CPU 203 of the client terminal 2 proceeds to step SP181 to confirm whether or not the service available/unavailable flag is set to "available", when the user performs reproduction operation for the operation input section 200 to reproduce each one of the following: the output-prohibited music data downloaded from the music data delivery server SV1; the checkout-able/move-able music data obtained by the user's formal purchase operation; and the checkout-able music data ripped from a music CD.

Negative result at step SP181 means that the client terminal 2 is in the service unavailable mode. In this case, the CPU 203 of the client terminal 2 recognizes that it cannot reproduce the output-prohibited music data because it is in the service unavailable mode. And then the CPU 203 of the client terminal 2 proceeds to step SP182.

The CPU 203 of the client terminal 2 at step SP182 checks whether or not the music data specified by the user's reproduction operation is output-prohibited music data. If affirmative result is obtained at step SP182, the CPU 203 of the client terminal 2 proceeds to step SP183 to display on the display 206 messages informing the user that the client terminal 2 cannot reproduce this output-prohibited music data.

Negative result at step SP182 means that the music data specified by the user's reproduction operation is checkout-able/move-able music data obtained by the formal purchase operation, or checkout-able music data ripped from a music CD. In this case, the CPU 203 of the client terminal. 2 proceeds to step SP184, and performs reproduction process for the checkout-able/move-able music data or the checkout-able music data to output sound from the speaker 30.

In this manner, even if the client terminal 2 is in the service unavailable mode, it performs reproduction process only for the checkout-able/move-able music data obtained by the formal purchase operation and the checkout-able music data ripped from a music CD.

By contrast, affirmative result at step SP181 means that the client terminal 2 can also reproduce output-prohibited music data because it is in the service available mode. In this case, the CPU 203 of the client terminal 2 performs reproduction process for the music data (output-prohibited music data, checkout-able/move-able music data, or checkout-able music data) specified by the user's reproduction operation to output sound from the speaker 30.

(2-7) Checkout Process

Figure 22:
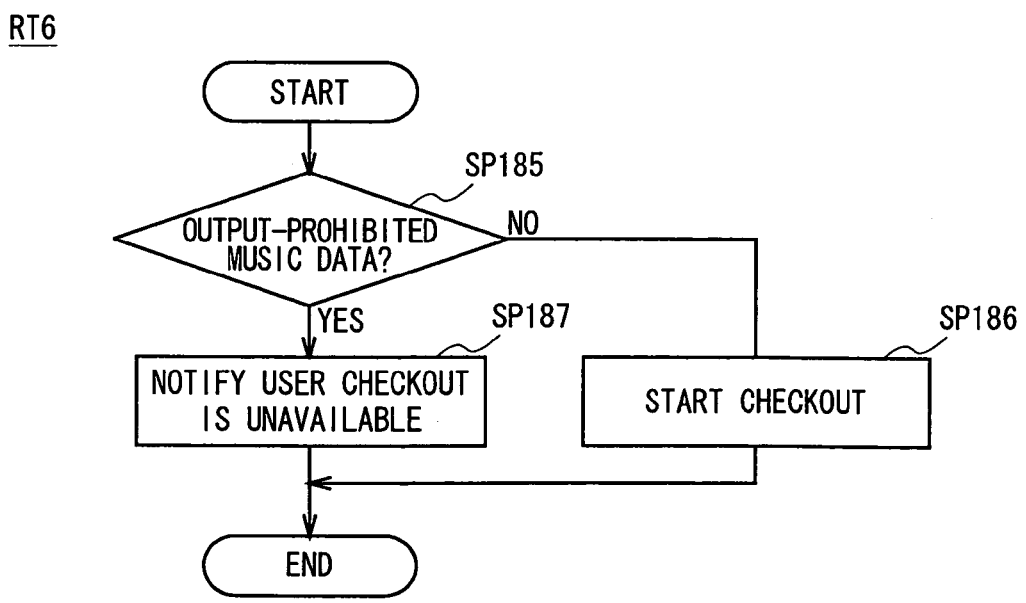
FIG. 22 is a flowchart showing a checkout process.

Referring to a flowchart shown in FIG. 22, the procedure RT6 of the checkout process will be described.

When the user performs checkout operation for the operation input section 200, the CPU 203 of the client terminal 2 proceeds to step SP 185, and confirms whether or not the music data specified by the checkout operation is output-prohibited music data.

Negative result at step SP185 means that the music data specified by the checkout operation is checkout-able, i.e., this is checkout-able/move-able music data or checkout-able music data. In this case, the CPU 203 of the client terminal 2 proceeds to step SP186, and performs checkout process to output (checkout) the music data specified by the checkout operation to external devices.

Affirmative result at step SP185 means that the music data specified by the checkout operation is output-prohibited music data. In this case, the CPU 203 of the client terminal 2 proceeds to step SP187, and does not output (checkout) the music data specified by the checkout operation to external devices.

(2-8) Move Process

Figure 23:
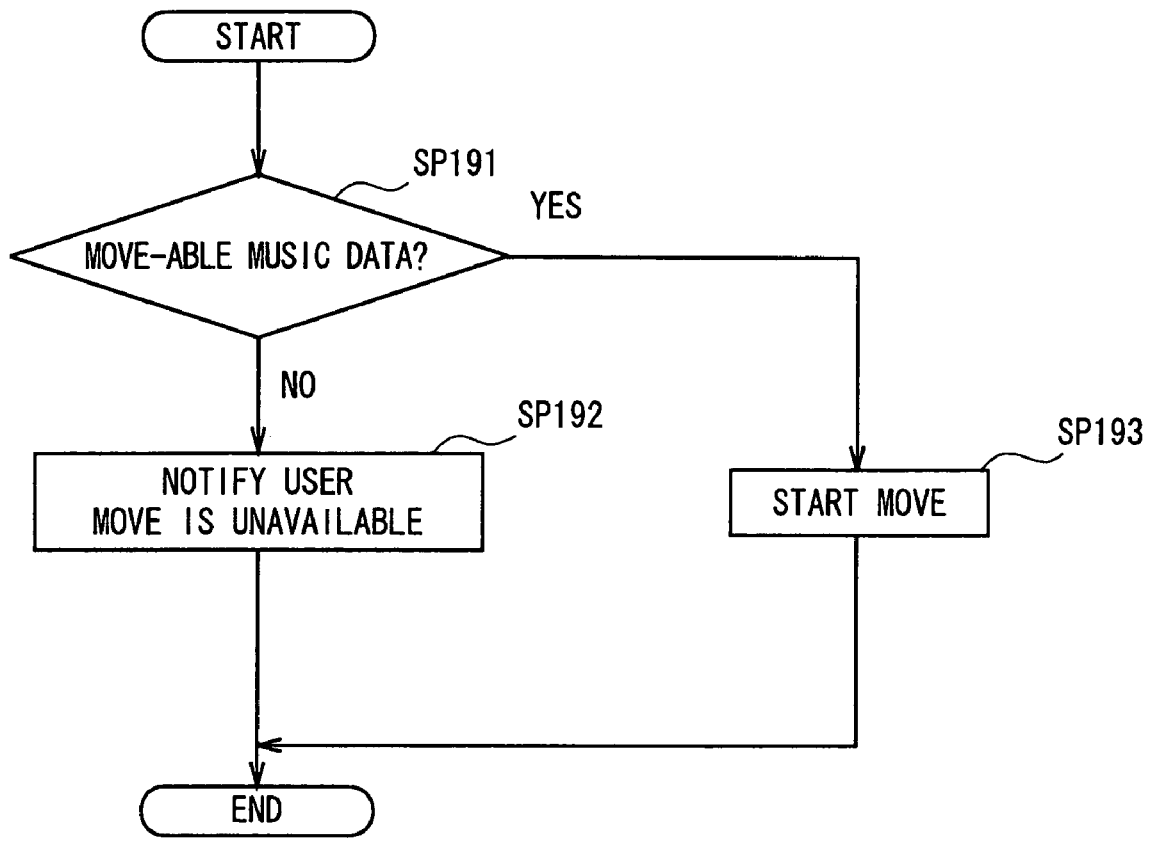
FIG. 23 is a flowchart showing a move process.

Referring to a flowchart shown in FIG. 23, the procedure RT7 of the move process will be described.

When the user performs move operation for the operation input section 200, the CPU 203 of the client terminal 2 proceeds to step SP191, and confirms whether or not the music data specified by the move operation is move-able.

Negative result at step SP191 means that the music data specified by the move operation is not move-able, such as the output-prohibited music data. In this case, the CPU 203 of the client terminal 2 proceeds to step SP192 to display on the display 206 messages informing the user that it cannot move the music data.

Affirmative result at step SP191 means that the music data specified by the move operation is move-able, such as checkout-able/move-able music data. In this case, the CPU 203 of the client terminal 2 proceeds to step SP193, and moves the music data to external devices.

In this embodiment, during the move process for the move-able music data, the client terminal 2 deletes the music data from the hard disk drive 211, while outputting it to external devices. However, this invention is not limited to this. For example, in the move process for the music data, the client terminal 2 may rewrite the attribute information associated with it to change it into output-prohibited music data, and save it in the hard disk drive 211.

(2-9) Operation and Effect

In the above-noted configuration, the music related service provision system 1 includes the client terminal 2 which has a function to reproduce music data, and the music data delivery server SV1 which provides the client terminal 2 with output-prohibited music data.

When the client terminal 2 performs the registration inquiry process at a certain timing (this is the time when the client terminal 2 is powered on, in this embodiment), the music data delivery server SV1 confirms whether or not the user of the client terminal 2 has been registered to pay the fixed charges. And then the music data delivery server SV1 notifies the client terminal 2 of the confirmation result.

If the client terminal 2 recognizes based on the notification from the music data delivery server SV1 that the user has been registered to pay the fixed charges, the client terminal 2 allows output-prohibited music data stored in the hard disk drive 211 to be reproduced. By contrast, if the client terminal 2 recognizes that the user has not been registered to pay the fixed charges, the client terminal 2 prohibits the output-prohibited music data from being reproduced.

In this manner, the output-prohibited music data downloaded to the client terminal 2 cannot be output. In addition, if the user of the client terminal 2 has not been paying the fixed charges, he/she cannot reproduce this music data. This prevents from hurting the interests of copyright owners or the like.

The client terminal 2 saves in the hard disk drive 211 the output-prohibited music data acquired from the music data delivery server SV1. And then, if the user performs formal purchase operation, the client terminal 2 rewrites the attribute information associated with the output-prohibited music data saved in the hard disk drive 211 to change this music data into checkout-able/move-able music data.

Accordingly, even if the user performs formal purchase operation, the client terminal 2 does not have to perform a process of downloading formal music data (checkout-able/move-able music data) from the music data delivery server SV1. As a result, the client terminal 2 can acquire music data more efficiently.

According to the above-noted configuration, the music data (output-prohibited music data) downloaded to the client terminal 2 cannot be output until it is formally purchased. In addition, this music data can be reproduced only while the user is being registered to pay the fixed charges. Therefore, this prevents from hurting the interests of copyright owners or the like. And the client terminal 2 can acquire music data more efficiently, since it does not have to repeat a process of downloading music data.

Figure 24:
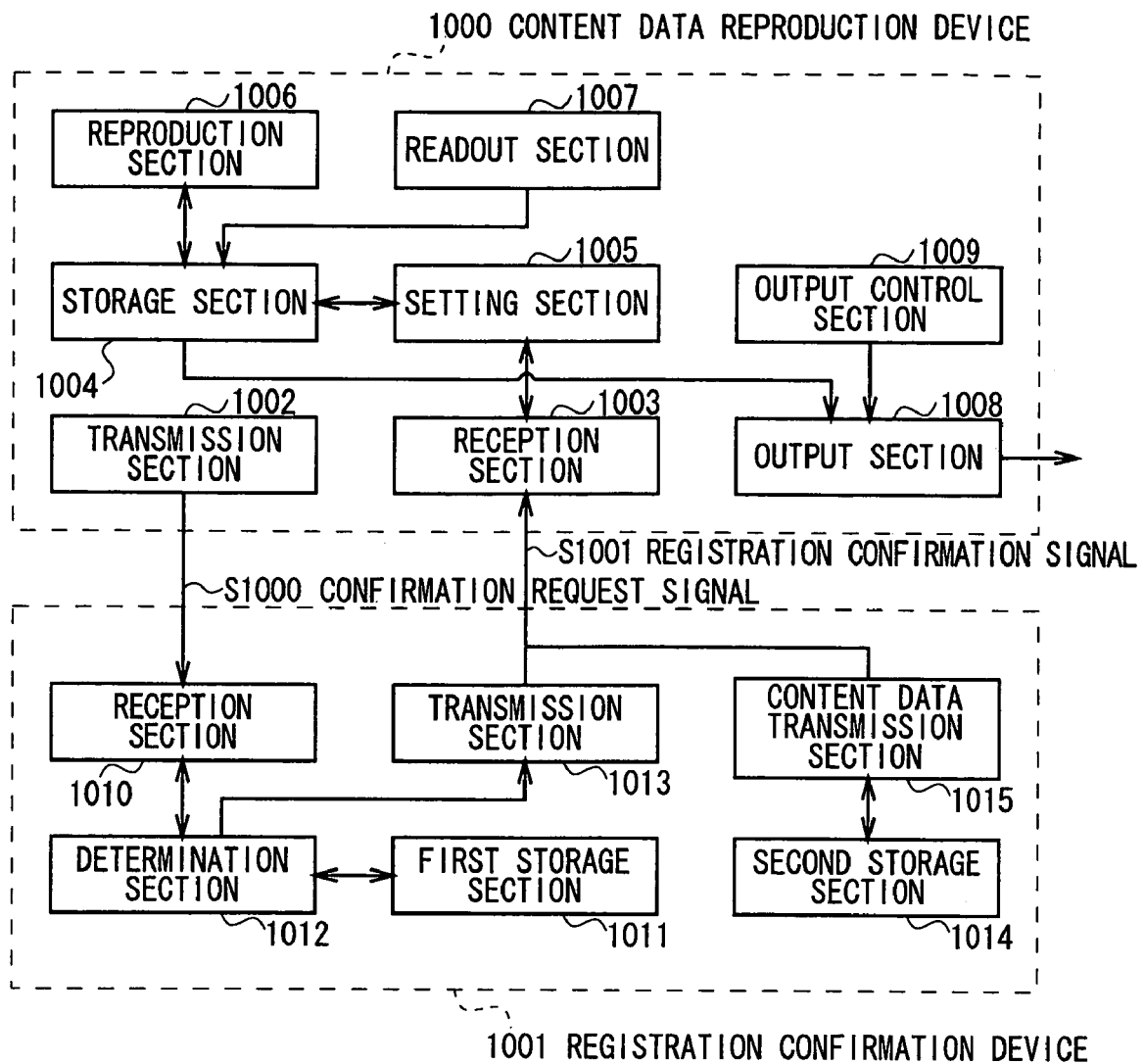
FIG. 24 is a schematic diagram showing the configuration of a content data reproduction device and a registration confirmation device.

With reference to FIG. 24, the outline of the above-noted embodiment will be described. For example, the client terminal 2 is equivalent to a content data reproduction device 1000, and the music data delivery server SV1 and the fee-charging server SV5 are equivalent to a registration confirmation device 1001.

The content data reproduction device 1000 which is capable of reproducing content data (music data, for example) includes a transmission section 1002 for transmitting to the registration confirmation device 1001 a confirmation request signal S1000 which requests the registration confirmation device 1001 to confirm whether or not the content data reproduction device 1000 or a user thereof has been registered.

The content data reproduction device 1000 also includes a reception section 1003 for receiving from the registration confirmation device 1001 a registration confirmation signal S1001 which informs that the content data reproduction device 1000 or a user thereof has been registered.

The content data reproduction device 1000 also includes a storage section 1004 for storing content data acquired from a content data provision device (the music data delivery server SV1, for example), the content data provision device providing the content data which is prohibited from being stored in an external section.

The content data reproduction device 1000 further includes a setting section 1005 for setting the content data stored in the storage section 1004 to reproducible if the reception section 1003 receives the registration confirmation signal S1001. And the content data reproduction device 1000 also includes a reproduction section 1006 for reproducing the content data if a reproduction command for the content data is input via an input section while the content data is being set to reproducible by the setting section 1005.

In addition, if an operation to purchase the content data which is associated with attribute information informing that the content data is prohibited from being stored in an external device is performed, the content data reproduction device 1000 transmits to a content data sales device (the fee-charging server SV5 or the like, for example) a purchase notification signal which notifies the content data sales device of the intention to purchase the content data, and then when receiving from the content data sales device a sale notification signal which notifies the content data reproduction device 1000 that a sale of the content data is completed, the content data reproduction device 1000 changes the attribute information of the content data-such that the attribute information informs that the content data is allowed to be stored in an external section.

With the content data reproduction device 1000, the attribute information informing that the content data is allowed to be stored in an external section shows permission of outputting the content data to an external section as if the content data is lent out, or permission of outputting the content data to an external section as well as deleting the content data from the storage section 1004.

In the content data reproduction device 1000, the transmission section 1002 transmits the confirmation request signal S1000 to the registration confirmation device 1001 each time when the content data reproduction device 1000 is powered on.

The content data reproduction device 1000 also includes a readout section 1007 for reading out content data from a storage medium (CD, DVD, semiconductor memory, or the like). The content data reproduction device 1000 stores the content data read by the readout section 1007 in the storage section 1004. Specifically, the content data supplied from the content data provision device is associated with attribute information informing that the outputting of the content data is prohibited.

The content data reproduction device 1000 further includes: an output section 1008 for outputting content data to an external section; and an output control section 1009 for controlling the output section 1008 such that the content data is not output from the output section 1008 when the attribute information of the content data informs that the outputting of the content data is prohibited.

The registration confirmation device 1001 includes a reception section 1010 for receiving from the content data reproduction device 1000 the confirmation request signal S1000 which requests the registration confirmation device 1001 to confirm whether or not the content data reproduction device 1000 or a user thereof has been registered. By the way, the content data reproduction device 1000 is capable of reproducing the content data.

The registration confirmation device 1001 also includes a first storage section 1011 for storing device identification information identifying the content data reproduction device 1000 or user identification information identifying the user, along with payment status information showing the payment status of the content data reproduction device 1000 or the user.

The registration confirmation device 1001 further includes a determination section 1012. The determination section 1012 checks the first storage section 1011 based on the device identification information or the user identification information shown in the received confirmation request signal S1000 to determine whether or not the content data reproduction device 1000 or the user has been properly charged. The registration confirmation device 1001 also includes a transmission section 1013 for transmitting to the content data reproduction device 1000 the registration confirmation signal S1001 which informs that the content data reproduction device 1000 or the user has been registered, in response to the result of the determination section 1012.

The registration confirmation device 1001 further includes: a second storage section 1014 for storing the content data; and a content data transmission section 1015 for transmitting to the content data reproduction device 1000 the content data stored in the second storage section 1014 in response to a request from the content data reproduction device 1000. The content data transmission section 1015 transmits to the content data reproduction device 1000 the content data which is prohibited from being output from the content data reproduction device 1000 to an external section.

For example, in this embodiment, the transmission section 1002, the reception section 1003, and the output section 1008 shown in FIG. 24 are equivalent to the communication control section 32 and the network interface 33 shown in FIG. 2. The storage section 1004 shown in FIG. 24 for example is equivalent to the storage medium 29 shown in FIG. 2. The setting section 1005 and the output control section 1009 shown in FIG. 24 for example are equivalent to the control section 23 shown in FIG. 2. The reproduction section 1006 shown in FIG. 24 for example is equivalent to the encoder/decoder section 34 and the audio control section 26. The readout section 1007 shown in FIG. 24 for example is equivalent to the external recording media recording and reproducing section 28 shown in FIG. 2. The reception section 1010, the transmission section 1013, and the content data transmission section 1015 shown in FIG. 24 for example are equivalent to the communication control section 72 and the network interface 73 shown in FIG. 5. The determination section 1012 shown in FIG. 24 for example is equivalent to the control section 70, shown in FIG. 5. The first storage section 1011 and the second storage section 1014 shown in FIG. 24 for example are equivalent to the customer database section 74 and the music data storage section 78 shown in FIG. 5.

(2-10) Other Embodiments

In the above-noted embodiments, the client terminal 2 downloads from the music data delivery server SV1 the output-prohibited music data which includes the attribute information informing that the outputting of this music data is prohibited. However the present invention is not limited to this. For example, the client terminal 2 may download from the music data delivery server SV1 music data which includes attribute information informing that this music data is allowed only to be output in streaming reproduction format. In this case, the client terminal 2 cannot output a copy of the music data to external devices, and cannot move the music data itself. That is to say, the music data which includes the attribute information informing that this music data is allowed only to be output in streaming reproduction format is the one that is prohibited from being stored in external devices. This music data will be also referred to as "external-storing-prohibited music data". Accordingly, the external-storing-prohibited music data downloaded to the client terminal 2 cannot be stored in external devices until it is formally purchased. This prevents from hurting the interests of copyright owners or the like.

In the above-noted embodiments, music data is equivalent to content data. However, the present invention is not limited to this. Video data, program data, or the like can be content data.

In the above-noted embodiments, when inquired about the registration by the client terminal 2, the music data delivery server SV1 confirms whether or not the registration information of the user of the client terminal 2 is being registered in the database. And then if the confirmation result shows that the registration information of the user is being registered, the music data delivery server SV1 determines that the output-prohibited music data service is available for the user, and notifies the client terminal 2 of the result. However, this invention is not limited to this. For example, while the music data delivery server SV1 is confirming whether or not the registration information of the user is being registered in the database in response to the request from the client terminal 2, it may also check the fee-charging completion information (payment status information) corresponding to the registration information. And then if the check result shows that the user is regularly paying the predetermined fixed charges, the music data delivery server SV1 may determine that the output-prohibited music data service is available for the user.

In the above-noted embodiments, the client terminal 2 is applied as content data reproduction apparatus. However, this invention is not limited to this. Devices which can reproduce content data and communicate with the music data delivery server SV1 and the like, such as mobile phones and Personal Digital Assistance (PDA), can be applied as content data reproduction apparatus.

In the above-noted embodiments, the communication processing section 214 and the network interface 215 are applied to the following: transmission means for transmitting to registration confirmation apparatus (the music data delivery server SV1) a confirmation request signal (the terminal identification information) which requests the registration confirmation apparatus to confirm whether or not content data reproduction apparatus (the client terminal 2) has been registered; and reception means for receiving from the registration confirmation apparatus a registration confirmation signal which informs that the content data reproduction apparatus has been registered. However, the present invention is not limited to this. For example, the transmission means and the reception means could have other configuration.

In the above-noted embodiments, the hard disk drive 211 is applied to a storage section which is for storing content data (output-prohibited music data) acquired from content data provision apparatus (the music data delivery server SV1), the content data provision apparatus providing the content data which is prohibited from being output to an external section. However, the present invention is not limited to this. For example, a semiconductor memory or the like can be applied to the storage section.

In the above-noted embodiments, the CPU 203 is applied to the following: setting means for setting the content data to reproducible; reproduction means for reproducing the content data if a reproduction command for the content data is input via an input section (the operation input section 200); and output control means for controlling output means (the external device connection section 216) such that the content data is not output from the output means when the attribute information of the content data informs that the outputting of the content data is prohibited. However, the present invention is not limited to this. For example, the setting means, the reproduction means, and the output control means could have other configuration.

In the above-noted embodiments, the network interface 275 of the music data delivery server SV1 is applied to the following: reception means for receiving a confirmation request signal; transmission means for transmitting to the content data reproduction apparatus a registration confirmation signal; and content data transmission means for transmitting to the content data reproduction apparatus the content data. However, the present invention is not limited to this. For example, the reception means, the transmission means, and the content data transmission means could have other configuration.

In the above-noted embodiments, the hard disk drive 272 of the music data delivery server SV1 is applied to the following: first storage means for storing apparatus identification information (the terminal identification information) identifying the content data reproduction apparatus along with payment status information showing the payment status of the user of the content data reproduction apparatus; and second storage means for storing the content data. However, the present invention is not limited to this. For example, the first storage means, and the second storage means could have other configuration.

In the above-noted embodiments, the CPU 203 of the client terminal 2 follows installed programs (a content data reproduction program), and also the music data delivery server SV1 follows installed programs (a registration confirmation program), to perform each process RT1 through RT7 (FIG. 17 through FIG. 23). However, the preset invention is not limited to this. For example, the client terminal 2 and the music data delivery server SV1 can be equipped with hardware which allows the client terminal 2 and the music data delivery server SV1 to perform each process RT1 through RT7.

In the above-noted embodiments, based on the registration information transmitted from the client terminal 2, the music data delivery server SV1 registers a user of the client terminal 2 such that he/she can use the output-prohibited music data service. However, this invention is not limited to this. For example, based on the registration information transmitted from the client terminal 2, the music data delivery server SV1 may register the client terminal 2 such that he/she can use the output-prohibited music data service using the client terminal 2.

INDUSTRIAL APPLICABILITY

The present invention can be utilized for a music data provision system capable of providing various kinds of music data via a communication path such as the Internet to a reproduction device which can reproduce music data, and the like.

DESCRIPTION OF SYMBOLS

1 ... MUSIC RELATED SERVICE PROVISION SYSTEM, 2 ... CLIENT TERMINAL, SV1 ... MUSIC DATA DELIVERY SERVER, SV5 ... FEE-CHARGING SERVER, 203, 270 ... CPU, 214 ... COMMUNICATION PROCESSING SECTION, 215, 275 ... NETWORK INTERFACE

The invention claimed is:

1. A content data reproduction apparatus for reproducing content data, said content data reproduction apparatus comprising:
    transmission means for transmitting to a registration confirmation apparatus a confirmation request signal which requests aid registration confirmation apparatus to confirm whether or not said content data reproduction apparatus or a user thereof has been registered;
    reception means for receiving authentication result information from said registration confirmation apparatus which indicates whether said content data reproduction apparatus or said user thereof has been registered;
    storage means for storing content data acquired from a content data provision apparatus, said content data including a plurality of content data items each including attribute information indicating whether said content data items are prohibited from being stored external to said content data reproduction apparatus;
    setting means for setting said attribute information of said plurality of content data items, based on received sale notification signals; and
    reproduction means for
        checking whether said authentication result information indicates that said content data reproduction apparatus or said user thereof has been registered in response to a reproduction command for one of said plurality of content data items input via an input means, and,
        when said authentication result information indicates that said content data reproduction apparatus or said user thereof has not been registered, checking said attribute information of said one of said plurality of content data items and reproducing said one of said plurality of content data items when said attribute information of said one of said plurality of content data items indicates that external storage of said one of said plurality of content data items is allowed,
    wherein upon determination that said content data reproduction apparatus or said user is not currently registered, content data downloaded to the apparatus when the apparatus was previously registered cannot be reproduced.

2. The content data reproduction apparatus according to claim 1, further comprising:
    transmission means for transmitting a purchase notification signal to a content data sales apparatus which notifies said content data sales apparatus of an intention to purchase at least one of said plurality of content data items, wherein,
    when receiving from said content data sales apparatus a sale notification signal which notifies said content data reproduction apparatus that a sale of said at least one of said plurality of content data items is completed, said setting means sets said attribute information of said at least one of said plurality of content data items to indicate that said at least one of said plurality of content data items is allowed to be stored external to said content data reproduction apparatus.

3. The content data reproduction apparatus according to claim 2, wherein
said attribute information of each of said plurality of content data items indicates whether a content data item of said plurality of content data items is allowed to be stored external to said content data reproduction apparatus while said content data item remains stored in said storage means, or that said content data item is allowed to be stored external to said content data reproduction apparatus and that said content data item is to be deleted from said storage means.

4. The content data reproduction apparatus according to claim 1, wherein
said transmission means transmits said confirmation request signal to said registration confirmation apparatus each time when said content data reproduction apparatus is powered on.

5. The content data reproduction apparatus according to claim 1, further comprising:
readout means for reading out said content data from a storage medium, wherein
said storage means stores said content data read by said readout means.

6. The content data reproduction apparatus according to claim 1, wherein
said content data provided from said content data provision apparatus includes attribute information indicating that said content data is prohibited from being stored external to said content data reproduction apparatus.

7. The content data reproduction apparatus according to claim 6, further comprising:
output means for outputting at least one of said plurality of content data items to a location external to said content data reproduction apparatus; and
output control means for controlling said output means such that said at least one of said plurality of content data items is not output when said attribute information of said at least of one said plurality of content data items indicates that external storage is prohibited.

8. A registration confirmation apparatus, comprising:
reception means for receiving from a content data reproduction apparatus a confirmation request signal which requests said registration confirmation apparatus to confirm whether or not said content data reproduction apparatus or a user thereof has been registered, said content data reproduction apparatus configured to store and reproduce content data including a plurality of content data items;
first storage means for storing apparatus identification information identifying said content data reproduction apparatus or user identification information identifying said user thereof, along with payment status information showing a payment status of said content data reproduction apparatus or said user;
determination means for checking said first storage means based on received apparatus identification information or received user identification information included in said received confirmation request signal, to produce a determination result indicating whether or not said content data reproduction apparatus or said user thereof has been properly charged payment; and
transmission means for transmitting authentication result information to said content data reproduction apparatus indicating that said content data reproduction apparatus or said user thereof has been registered and that said plurality of content data items stored in said content data reproduction apparatus are reproducible, or that said content data reproduction apparatus or said user thereof has not been registered and that said plurality of content data items stored in said content data reproduction apparatus are not reproducible, based on the determination result,
wherein upon determination that said content data reproduction apparatus or said user is not currently registered, content data downloaded to the apparatus when the apparatus was previously registered cannot be reproduced.

9. The registration confirmation apparatus according to claim 8, further comprising:
second storage means for storing content data; and
content data transmission means for transmitting said content data stored in said second storage means to said content data reproduction apparatus, in response to a request from said content data reproduction apparatus.

10. The registration confirmation apparatus according to claim 9, wherein
said content data transmitted to said content data reproduction apparatus includes attribute information indicating that said content data is prohibited from being stored external to said content data reproduction apparatus.

11. A content data reproduction method of a content data reproduction apparatus for reproducing content data, said content data reproduction method comprising:
transmitting to a registration confirmation apparatus a confirmation request signal which requests said registration confirmation apparatus to confirm whether or not said content data reproduction apparatus or a user thereof has been registered;
receiving authentication result information from said registration confirmation apparatus which indicates whether said content data reproduction apparatus or said user thereof has been registered;
storing in a storage means content data acquired from a content data provision apparatus, said content data including a plurality of content data items each including attribute information indicating whether said content data items are prohibited from being stored external to said content data reproduction apparatus;
setting said attribute information based on received sale notification signals; and
checking whether said authentication result information indicates that said content data reproduction apparatus or said user thereof has been registered in response to a reproduction command for one of said plurality of content data items input via an input means and,
when said authentication result information indicates that said content data reproduction apparatus or said user thereof has not been registered, checking said attribute information of said one of said plurality of content data items and reproducing said one of said plurality of content data items when said attribute information of said one of said plurality of content data items indicates that external storage of said one of said plurality of content data items is allowed,
wherein upon determination that said content data reproduction apparatus or said user is not currently registered, content data downloaded to the apparatus when the apparatus was previously registered cannot be reproduced.

12. A registration confirmation method of a registration confirmation apparatus, said registration confirmation method comprising:
- receiving from a content data reproduction apparatus a confirmation request signal which requests said registration confirmation apparatus to confirm whether or not said content data reproduction apparatus or a user thereof has been registered, said content data reproduction apparatus configured to store and reproduce content data including a plurality of content data items;
- determining whether or not said content data reproduction apparatus or said user thereof has been properly charged by checking a storage means based on received apparatus identification information identifying said content data reproduction apparatus or user identification information identifying said user thereof included in said received confirmation request signal to produce a determination result, said storage means storing apparatus identification information or user identification information along with payment status information showing a payment status of said content data reproduction apparatus or said user thereof; and
- transmitting authentication result information to said content data reproduction apparatus indicating that said content data reproduction apparatus or said user thereof has been registered and that said plurality of content data items stored in said content data reproduction apparatus are reproducible, or that said content data reproduction apparatus or said user thereof has not been registered and that said plurality of content data items stored in said content data reproduction apparatus are not reproducible, based on the determination result,
- wherein upon determination that said content data reproduction apparatus or said user is not currently registered, content data downloaded to the apparatus when the apparatus was previously registered cannot be reproduced.

13. A non-transitory computer readable storage medium storing computer executable instructions thereon that, when executed by a processor, cause the processor to perform a method of a content data reproduction apparatus, comprising:
- transmitting to registration confirmation apparatus a confirmation request signal which requests said registration confirmation apparatus to confirm whether or not said content data reproduction apparatus or a user thereof has been registered;
- receiving authenticated result information from said registration confirmation apparatus which indicates whether said content data reproduction apparatus or said user thereof has been registered;
- storing in a storage means content data acquired from a content data provision apparatus, said content data including a plurality of content data items each including attribute information indicating whether said content data items are prohibited from being stored external to said content data reproduction apparatus;
- setting said attribute information based on received sale notification signals;
- checking whether said authentication result information indicates that said content data reproduction apparatus or said user thereof has been registered in response to a reproduction command for one of said plurality of content data items input via an input means; and
- when said authentication result information indicates that said content data reproduction apparatus or said user thereof has not been registered, checking said attribute information of said one of said plurality of content data items and reproducing said one of said plurality of content data items when said attribute information of said one of said plurality of content data items indicates that external storage of said one of said plurality of content data items is allowed,
- wherein upon determination that said content data reproduction apparatus or said user is not currently registered, content data downloaded to the apparatus when the apparatus was previously registered cannot be reproduced.

14. A non-transitory computer readable storage medium storing computer executable instructions thereon that, when executed by a processor, cause the processor to perform a method of a registration confirmation apparatus, comprising:
- receiving from a content data reproduction apparatus a confirmation request signal which requests said registration confirmation apparatus to confirm whether or not said content data reproduction apparatus or a user thereof has been registered, said content data reproduction apparatus configured to store and reproduce content data including a plurality of content data items;
- determining whether or not said content data reproduction apparatus or said user thereof has been properly charged by checking a storage means based on received apparatus identification information identifying said content data reproduction apparatus or user identification information identifying said user thereof included in said received confirmation request signal to produce a determination result, said storage means storing apparatus identification information or user identification information along with payment status information showing payment status of said content data reproduction apparatus or said user thereof; and
- transmitting authentication result information to said content data reproduction apparatus indicating that said content data reproduction apparatus or said user thereof has been registered and that said plurality of content data items stored in said content data reproduction apparatus are reproducible, or that said content data reproduction apparatus or said user has not been registered and that said plurality of content data items stored in said content data reproduction apparatus are not reproducible, based on the determination result,
- wherein upon determination that said content data reproduction apparatus or said user is not currently registered, content data downloaded to the apparatus when the apparatus was previously registered cannot be reproduced.

* * * * *